(12) United States Patent
Raghavan et al.

(10) Patent No.: US 11,862,832 B2
(45) Date of Patent: Jan. 2, 2024

(54) LARGE SITE FUEL CELL SYSTEM AND METHOD OF INSTALLING SAME

(71) Applicant: BLOOM ENERGY CORPORATION, San Jose, CA (US)

(72) Inventors: Srihari Raghavan, Fremont, CA (US); David Trevisan, San Jose, CA (US); Richard Leitch, Beaumont, CA (US); Armando Gomez, Pomona, CA (US); Aaron Ells, Lancaster, CA (US); Jessica Mahler, Palo Alto, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/815,856

(22) Filed: Jul. 28, 2022

(65) Prior Publication Data
US 2023/0037162 A1    Feb. 2, 2023

Related U.S. Application Data

(60) Provisional application No. 63/307,309, filed on Feb. 7, 2022, provisional application No. 63/301,399, filed (Continued)

(51) Int. Cl.
*H01M 8/04* (2016.01)
*H01M 8/249* (2016.01)
(Continued)

(52) U.S. Cl.
CPC ....... *H01M 8/249* (2013.01); *H01M 8/04291* (2013.01); *H01M 8/0675* (2013.01); (Continued)

(58) Field of Classification Search
CPC .. H01M 8/249; H01M 8/2483; H01M 8/2484; H01M 8/04291
See application file for complete search history.

(56) References Cited

U.S. PATENT DOCUMENTS 7,705,490 B2    4/2010 Srinivasan et al.
7,713,649 B2    5/2010 Hickey et al.
(Continued)

OTHER PUBLICATIONS

U.S. Appl. No. 63/278,778, filed Nov. 12, 2021, Bloom Energy Corporation.
(Continued)

*Primary Examiner* — Olatunji A Godo
(74) *Attorney, Agent, or Firm* — THE MARBURY LAW GROUP PLLC

(57) ABSTRACT

A modular fuel cell subsystem includes multiple rows of modules, where each row comprises a plurality of fuel cell power modules and a power conditioning module containing a DC to AC inverter electrically connected the power modules. In some embodiments, a single gas and water distribution module is fluidly connected to multiple rows of power modules, and a single mini power distribution module is electrically connected to each of the power conditioning module in each row of modules. In some embodiments, each row of modules further includes a fuel processing module located on an opposite side of the plurality of fuel cell power modules from the power conditioning module. Fuel and water connections may enter each row from the side of the row containing the fuel processing module, and electrical connections may enter each row from the side of the row containing the power conditioning module.

14 Claims, 65 Drawing Sheets

Related U.S. Application Data on Jan. 20, 2022, provisional application No. 63/227,836, filed on Jul. 30, 2021.

(51) Int. Cl.
*H01M 8/2483* (2016.01)
*H01M 8/2484* (2016.01)
*H01M 8/04291* (2016.01)
*H01M 8/0662* (2016.01)

(52) U.S. Cl.
CPC ....... *H01M 8/2483* (2016.02); *H01M 8/2484* (2016.02); *H01M 2250/10* (2013.01)

(56) References Cited

U.S. PATENT DOCUMENTS

| | | | |
|---|---|---|---|
| 8,440,362 B2 | 5/2013 | Richards et al. | |
| 8,822,101 B2 | 9/2014 | Richards et al. | |
| 9,190,693 B2 | 11/2015 | Sridhar et al. | |
| 9,755,263 B2 | 9/2017 | Trevisan et al. | |
| 10,320,017 B2 | 6/2019 | Trevisan et al. | |
| 10,333,163 B2 | 6/2019 | Trevisan et al. | |
| 10,651,496 B2 | 5/2020 | Trevisan et al. | |
| 10,840,535 B2 | 11/2020 | Richards et al. | |
| 2009/0305087 A1* | 12/2009 | Rajashekara | H01M 8/04619 429/423 |
| 2010/0288629 A1* | 11/2010 | LaConti | C25B 9/77 204/252 |
| 2016/0260996 A1* | 9/2016 | Trevisan | H01M 8/249 |
| 2021/0075047 A1* | 3/2021 | Echigo | H01M 8/04074 |
| 2021/0143459 A1* | 5/2021 | Ikeda | H01M 8/04179 |

OTHER PUBLICATIONS

U.S. Appl. No. 63/363,201, filed Apr. 19, 2022, Bloom Energy Corporation.

* cited by examiner

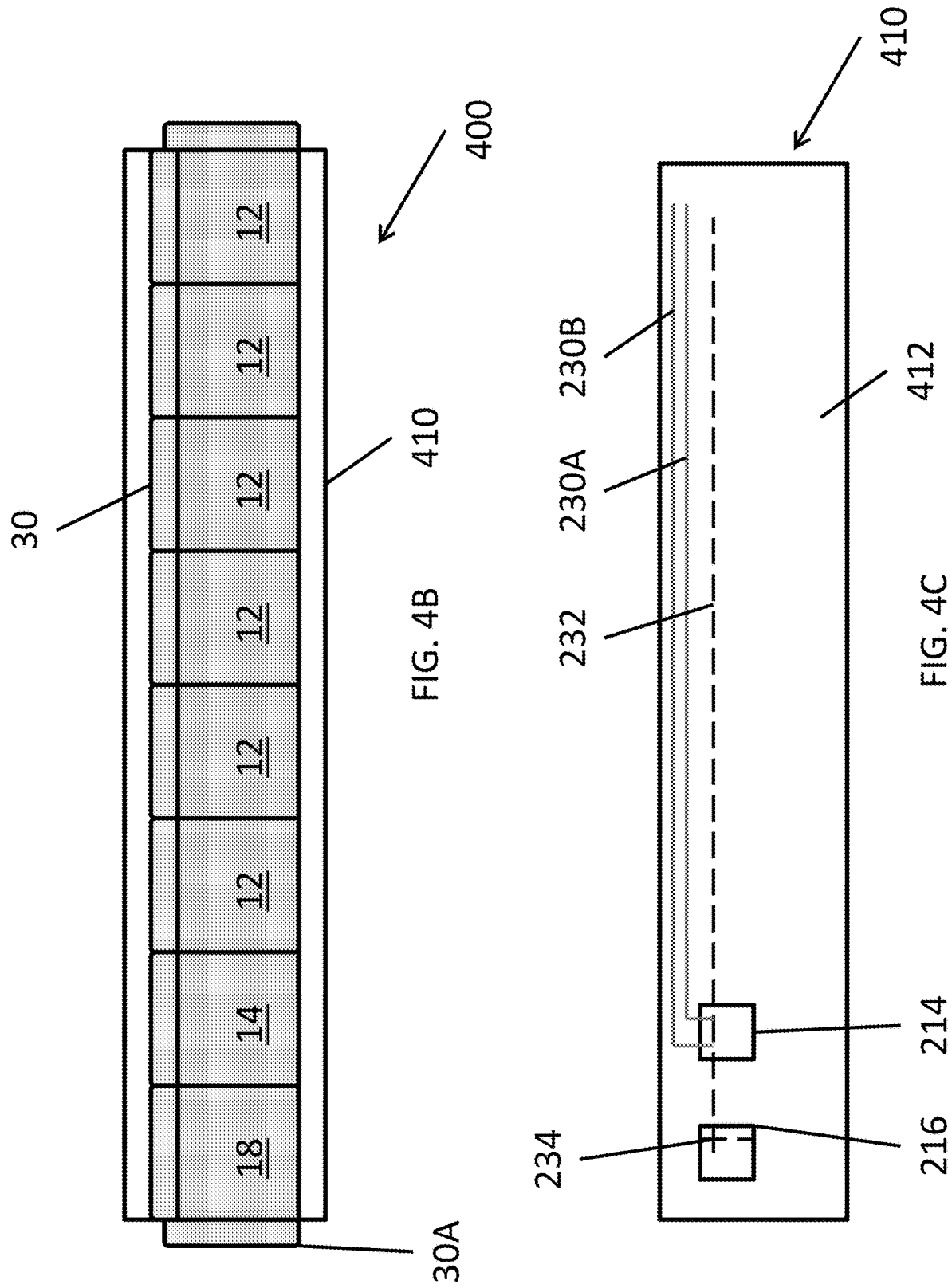

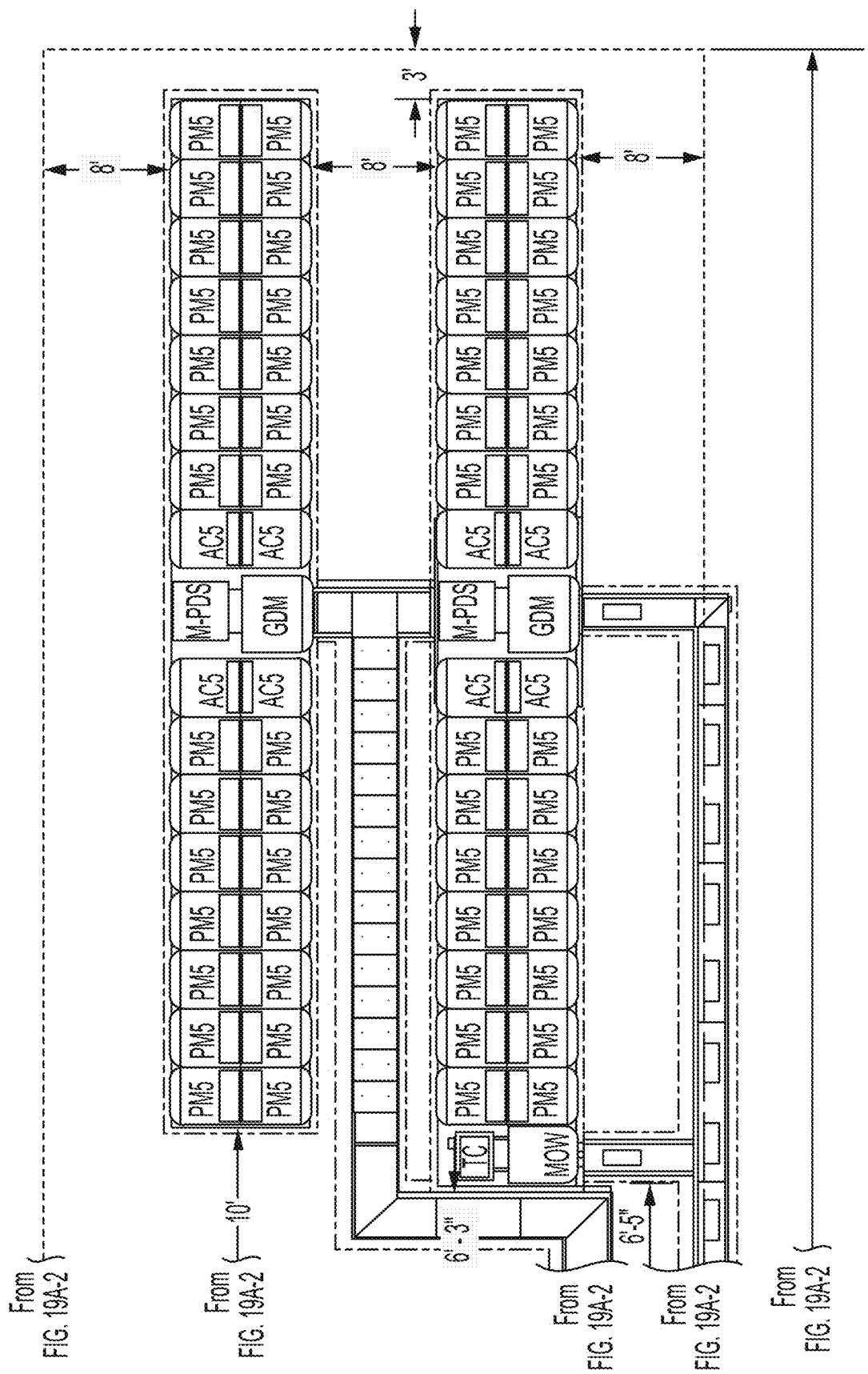

LARGE SITE FUEL CELL SYSTEM AND METHOD OF INSTALLING SAME

RELATED APPLICATIONS

This application claims the benefit of priority to U.S. Provisional Application No. 63/227,836 filed on Jul. 30, 2021, U.S. Provisional Application No. 63/301,399 filed on Jan. 20, 2022, and U.S. Provisional Application No. 63/307,309 filed on Feb. 7, 2022, the entire teachings of which are incorporated by reference herein.

FIELD

The present disclosure is directed generally to fuel cell systems and specifically to large site fuel cell systems and method of installing thereof.

BACKGROUND

Rapid and inexpensive installation can help to increase the prevalence of fuel cell systems. Installation costs for pour in place custom designed concrete pads, which generally require trenching for plumbing and electrical lines, can become prohibitive. Installation time is also a problem in the case of most sites since concrete pours and trenches generally require one or more building permits and building inspector reviews.

Furthermore, stationary fuel cell systems may be installed in location where the cost of real estate is quite high or the available space is limited (e.g., a loading dock, a narrow alley or space between buildings, etc.). The fuel cell system installation should have a high utilization of available space. When a considerable amount of stand-off space is required for access to the system via doors and the like, installation real estate costs increase significantly.

When the number of fuel cell systems to be installed on a site increases, one problem which generally arises is that stand-off space between these systems is required (to allow for maintenance of one unit or the other unit). The space between systems is lost in terms of its potential to be used by the customer of the fuel cell system.

In the case of some fuel cell system designs, these problems are resolved by increasing the overall capacity of the monolithic system design. However, this creates new challenges as the size and weight of the concrete pad required increases. Therefore, this strategy tends to increase the system installation time. Furthermore, as the minimum size of the system increases, the fault tolerance of the design is reduced.

The fuel cell stacks or columns of the fuel cell systems are usually located in hot boxes (i.e., thermally insulated containers). The hot boxes of existing large stationary fuel cell systems are housed in cabinets, housings or enclosures. The terms cabinet, enclosure, and housing are used interchangeably herein. The cabinets are usually made from metal. The metal is painted with either automotive or industrial powder coat paint, which is susceptible to scratching, denting and corrosion. Most of these cabinets are similar to current industrial HVAC equipment cabinets.

SUMMARY

In one embodiment a modular fuel cell subsystem comprises multiple rows of modules, wherein each row comprises a plurality of fuel cell power modules and a power conditioning module containing a DC to AC inverter electrically connected to the power modules, a single gas and water distribution module fluidly connected to multiple rows of power modules, and a single mini power distribution module electrically connected to the power conditioning module in each row of the multiple rows of modules.

In one embodiment, a fuel cell system comprises a plurality of the modular fuel cell subsystems, a system power distribution unit which is electrically connected to the plurality of modular fuel cell subsystems, and a plurality of precast concrete trenches containing plumbing and wires connecting the plurality of modular fuel cell subsystems with a utility fuel pipe, a utility water pipe and the system power distribution unit.

In another embodiment, a fuel cell power module comprises a cellular concrete base, a non-cellular concrete pad located on the base, and having a smaller area than the base, and a fuel cell power module located on the concrete base, the fuel cell power module containing at least one fuel cell stack. In one embodiment, a precast concrete trench is provided, the trench containing wires which connect the fuel cell power module with a power distribution unit.

In another embodiment, a fuel cell system includes multiple rows of fuel cell system modules, wherein each row comprises a plurality of fuel cell power modules, a power conditioning module containing a DC to AC inverter electrically connected to the power modules, and a fuel processing module containing components for pre-processing of fuel fluidly connected to the power modules, wherein the power conditioning module is located on a first side of the plurality of fuel cell modules and the fuel processing module is located on a second side of the plurality of fuel cell modules that is opposite the first side in each row of the multiple rows of fuel cell system modules, an electrical connection to the power conditioning module of each row located on the first side of the respective rows, and at least one plumbing connection to the fuel processing module of each row located on the second side of the respective rows.

BRIEF DESCRIPTION OF THE DRAWINGS

FIG. 4B illustrates top plan view of the system of FIG. 4A.

FIG. 4C illustrates a schematic view of a pad of the fuel cell system of FIG. 4A.

DETAILED DESCRIPTION

It is to be understood that both the foregoing general description and the following detailed description are exemplary and explanatory only, and are not restrictive of the invention as claimed.

Figure 1:
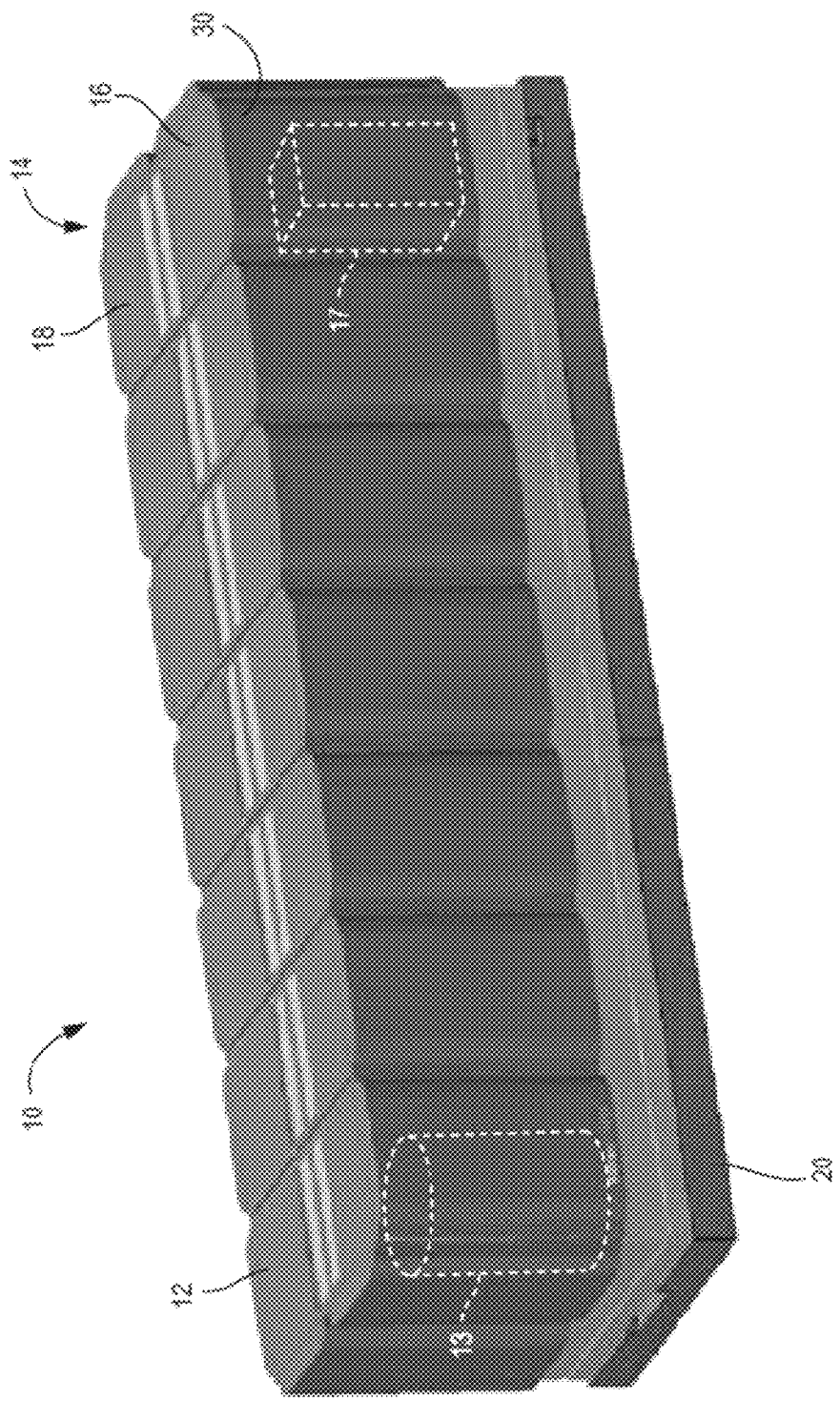
FIG. 1 is a perspective view of a modular fuel cell system according to various embodiments of the present disclosure.

Referring to FIG. 1, a modular fuel cell system 10 is shown according to an exemplary embodiment. The modular system 10 may contain modules and components described in U.S. patent application Ser. No. 11/656,006, filed on Jan. 22, 2007, and U.S. patent application Ser. No. 14/208,190, filed on Mar. 13, 2014, which are incorporated herein by reference in their entireties. The modular design of the fuel cell system 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The modular fuel cell system 10 includes a housing 14 in which at least one (preferably more than one or plurality) of power modules 12, one or more fuel processing modules 16, and one or more power conditioning (i.e., electrical output) modules 18 are disposed. In embodiments, the power conditioning modules 18 are configured to deliver direct current (DC). In alternative embodiments, the power conditioning modules 18 are configured to deliver alternating current (AC). In these embodiments, the power conditioning modules 18 include a mechanism to convert DC to AC, such as an inverter. For example, the system 10 may include any desired number of modules, such as 2-30 power modules, for example 3-12 power modules, such as 6-12 modules.

The system 10 of FIG. 1 includes six power modules 12 (one row of six modules stacked side to side), one fuel processing module 16, and one power conditioning module 18 on a pad 20. The housing 14 may include a cabinet to house each module 12, 16, 18. Alternatively, as will be described in more detail below, modules 16 and 18 may be disposed in a single cabinet. While one row of power modules 12 is shown, the system may comprise more than one row of modules 12. For example, the system 10 may comprise two rows of power modules 18 arranged back to back/end to end.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The modular fuel cell system 10 also contains at least one fuel processing module 16. The fuel processing module 16 includes components for pre-processing of fuel, such as adsorption beds (e.g., desulfurizer and/or other impurity adsorption) beds. The fuel processing module 16 may be designed to process a particular type of fuel. For example, the system may include a diesel fuel processing module, a natural gas fuel processing module, and an ethanol fuel processing module, which may be provided in the same or in separate cabinets. A different bed composition tailored for a particular fuel may be provided in each module. The processing module(s) 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, the fuel processing module 16 may include a reformer 17. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The power conditioning module 18 includes components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one cabinet of the housing 14. If a single input/output cabinet is provided, then modules 16 and 18 may be located vertically (e.g., power conditioning module 18 components above the fuel processing module 16 desulfurizer canisters/beds) or side by side in the cabinet.

As shown in one exemplary embodiment in FIG. 1, one cabinet is provided for one row of six power modules 12, which are arranged linearly side to side on one side of the input/output module. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules may also be provided in other ratios. For example, in other exemplary embodiments, more or fewer power modules 12 may be provided adjacent to the input/output module 16/18. Further, the support functions could be served by more than one input/output module 16/18 (e.g., with a separate fuel processing module 16 and power conditioning module 18 cabinets). Additionally, while in the preferred embodiment, the input/output module 16/18 is at the end of the row of power modules 12, it could also be located in the center of a row power modules 12.

The modular fuel cell system 10 may be configured in a way to ease servicing of the components of the system 10. All of the routinely or high serviced components (such as the consumable components) may be placed in a single module to reduce amount of time required for the service person. For example, a purge gas (optional) and desulfurizer material for a natural gas fueled system may be placed in a single module (e.g., a fuel processing module 16 or a combined input/output module 16/18 cabinet). This would be the only module cabinet accessed during routine maintenance. Thus, each module 12, 16, and 18 may be serviced, repaired or removed from the system without opening the other module cabinets and without servicing, repairing or removing the other modules.

For example, as described above, the system 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 16/18) are not taken off line. Furthermore, the fuel cell system 10 may contain more than one of each type of module 12, 16, or 18. When at least one module of a particular type is taken off line, the remaining modules of the same type are not taken off line.

Thus, in a system comprising a plurality of modules, each of the modules 12, 16, or 18 may be electrically disconnected, removed from the fuel cell system 10 and/or serviced or repaired without stopping an operation of the other modules in the system, allowing the fuel cell system to continue to generate electricity. The entire fuel cell system 10 does not have to be shut down if one stack of fuel cells in one hot box 13 malfunctions or is taken off line for servicing.

Figure 2:
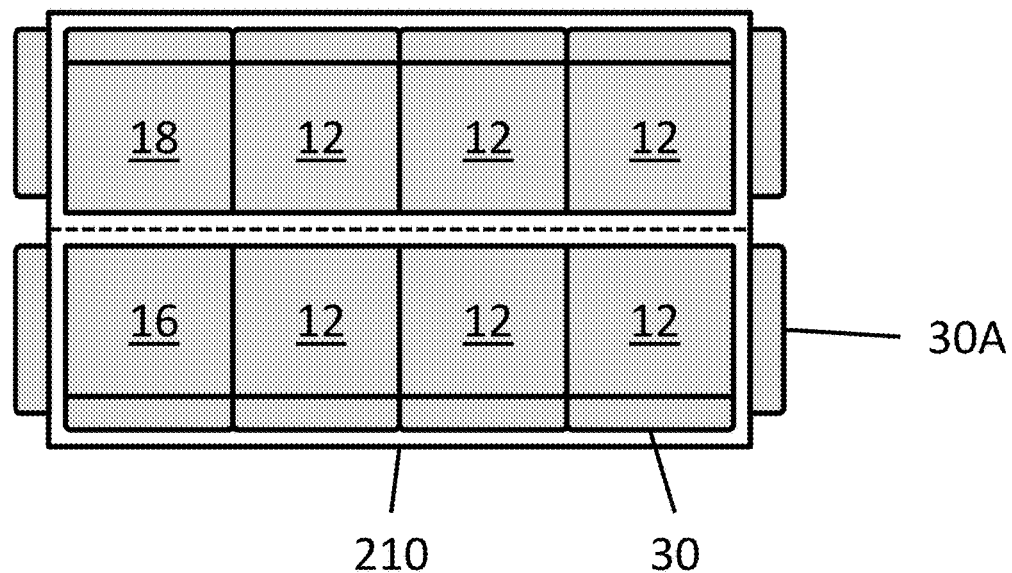
FIG. 2 illustrates top plan view of a modular fuel cell system according to various embodiments of the present disclosure.

FIG. 2 illustrates top plan view of a modular fuel cell system 200 according to various embodiments of the present disclosure. The fuel cell system 200 is similar to the fuel cell system 10 of FIG. 1. As such, similar reference numbers are used for similar elements, and only the differences therebetween will be described in detail.

Referring to FIG. 2, the system 200 includes power modules 12, a power conditioning module 18, and a fuel processing module 16 disposed on a pad 210. The system 200 may include doors 30 to access the modules 12, 16, 18. The system 200 may further include cosmetic doors 30A.

The power modules 12 may be disposed in a back-to-back configuration. In particular, the power modules 12 may be disposed in parallel rows, and the fuel processing module 16 and the power conditioning module may be disposed at ends of the rows. Accordingly, the system 200 has an overall rectangular configuration, and may be shorter in length than other systems, such as the system 10 of FIG. 1. As such, the system 200 can be disposed in locations where space length is an issue. For example, the system 200 may fit in a parking spot adjacent to a building to which power is to be provided.

While the system 200 is shown to include two rows of three power modules 12, the present disclosure is not limited to any particular number of power modules 12. For example, the system 200 may include 2-30 power modules 12, 4-12 power modules 12, or 6-12 power modules 12, in some embodiments. In other words, the system 200 may include any desired number of power modules 12, with the power modules 12 being disposed in a back-to-back configuration. In addition, the positions of the fuel processing module 16 and the power conditioning module 18 may be reversed, and/or the modules 16, 18 may be disposed on either end of the system 200.

Figure 3A:
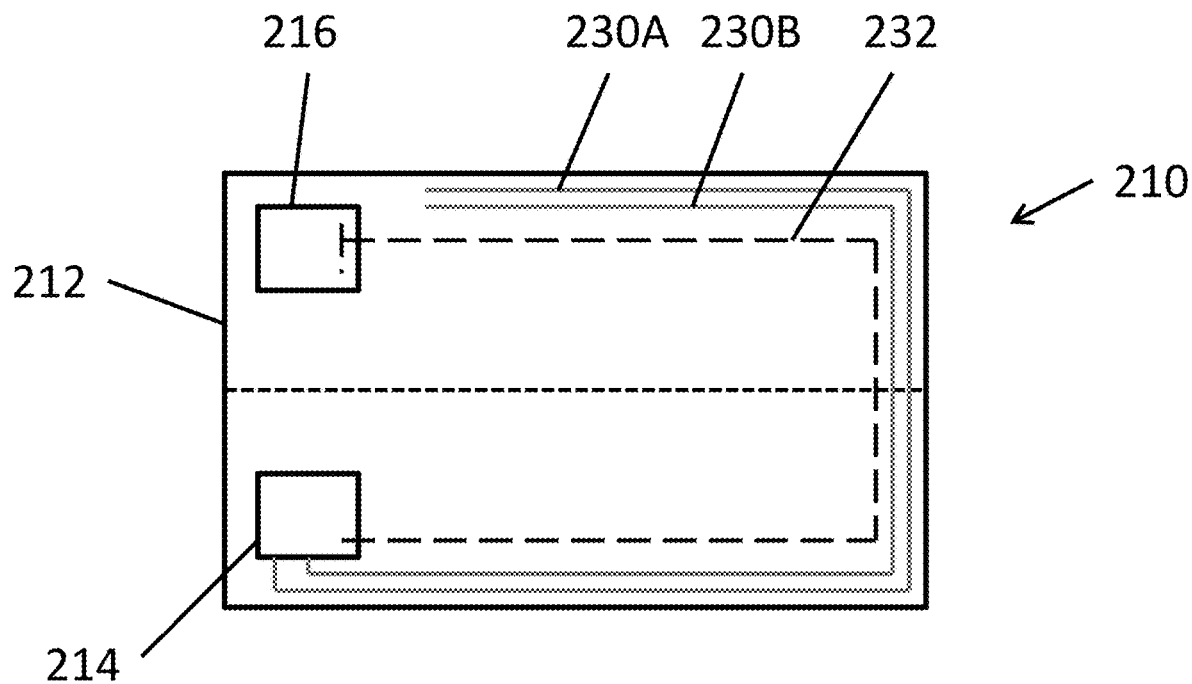
FIGS. 3A, 3B, and 3C illustrate top and perspective views of a pad of the fuel cell system of FIG. 2.
Figure 3B:
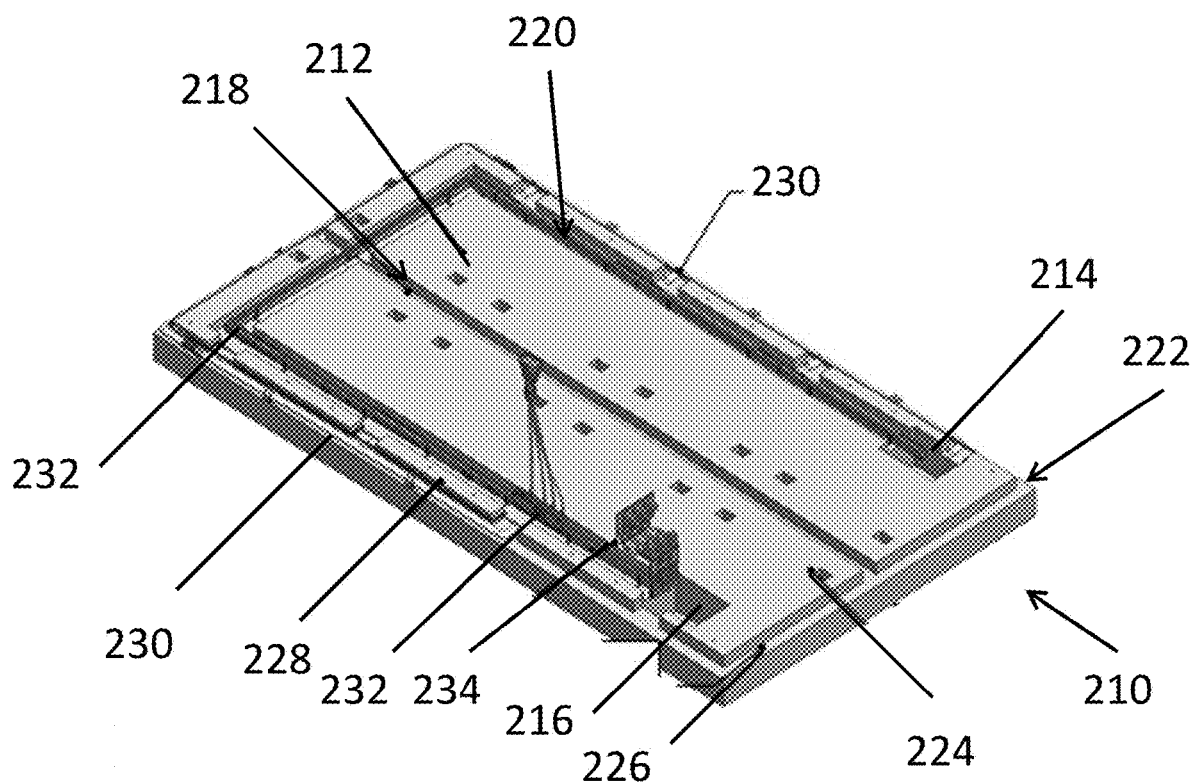

FIG. 3A illustrates a schematic top view of the pad 210. FIG. 3B illustrates a perspective view of the pad 210, and FIG. 3C illustrates a perspective view of the pad 210 including an edge cover.

Figure 3C:
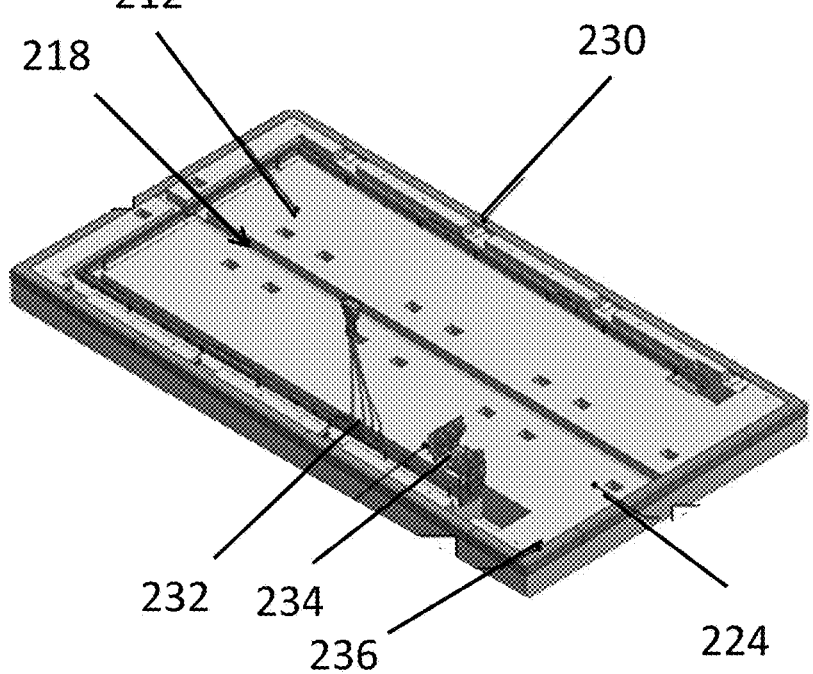

Referring to FIGS. 3A-3C, the pad 210 includes a base 212. The base 212 may be formed of a concrete or similar material. Alternatively, the base 212 may be made of any other suitable structural material, such as steel or another metal, and may be pre-cast as a single body or may be cast in sections. The base 212 may be made by casting the base material in a patterned mold, removing the cast base 212 from the mold, and then transporting the base 212 from the location of the mold (e.g., in a base fabrication facility) to the operation site of the fuel cell system (i.e., where the fuel cell system will be located to generate power). The base 212 may be configured as a single piece, or may include multiple connected sections.

The base 212 may include first and second through holes 214, 216, a drainage recess 218, a wiring recess 220, and a plumbing recess 222. The base 212 may also include tie-down pockets 224, tie-down inserts 226, and pluming brackets 228.

The drainage recess 218 may extend along the middle of the base 212, between the rows of modules, and may be configured to collect, for example, rain or debris collected on the base 212. The tie-down pockets 224 and tie-down inserts 226 may be configured to secure corresponding modules to the base 212. The plumbing recess 222 may extend around the perimeter of the base 212. In particular, the plumbing recess 222 may be formed along three or more edges of the base 212. The wiring recess 220 may extend from the first through hole 214 to the second through hole 216, and may be generally U-shaped.

The pad 210 may also include plumbing 230, wiring 232, and a system electrical connection, such as a bus bar 234. In particular, the wiring 232 may be disposed in the wiring recess 220 and may be connected to one or more of the modules. For example, the wiring 232 may be connected to the bus bar 234 and each of the power modules 12. The bus bar 234 may be connected to the power conditioning module 18. The power conditioning module 18 may be connected to an external load through the second through hole 216. The bus bar 234 may be disposed on an edge of the through hole 216, such that the wiring 232 does not extend across the through hole 216. However, the bus bar 234 may be disposed on an opposing side of the through hole 216, such that the wiring 232 does extend across the through hole 216, if such a location is needed to satisfy system requirements.

The plumbing 230 may be disposed in the plumbing recess 222. The plumbing 230 may be connected to an external source of water and/or fuel, via the first through hole 214, and may be attached to the plumbing brackets 228. In particular, the plumbing 230 may include a fuel pipe 230A connecting the fuel processing module 16 to the power modules 12. The plumbing 230 may also include a water pipe 230B configured to provide water to the power modules 12. The plumbing 230 may extend between the plumbing brackets 228 to the power modules 12.

As shown in FIG. 3C, the plumbing 230 may be covered by an edge cover 236. In particular, the edge cover 236 may be configured to cover the plumbing recess 222. In some embodiments, the edge cover 236 may include a number of segments, such that the edge cover 236 may be removed and/or installed on a piece-by-piece basis.

Figure 3D:
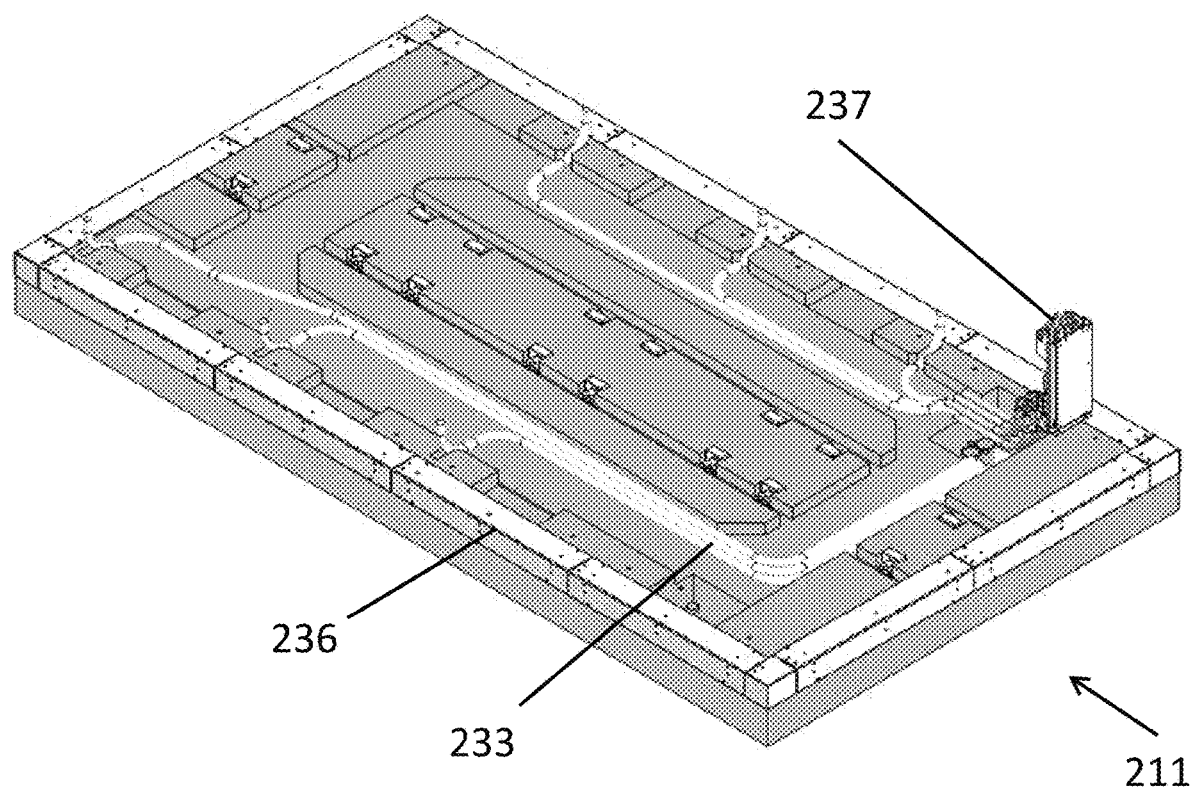
FIG. 3D illustrates a perspective view of a modified version of a pad of the fuel cell system of FIG. 2.

FIG. 3D illustrates a perspective view of a pad 211, according to various embodiments of the present disclosure. The pad 211 is an alternate version of the pad 210 of the fuel cell system of FIG. 2, in place of the pad 210. Accordingly, only the differences between the pads 210, 211 will be described in detail.

Referring to FIG. 3D, the pad 211 includes wiring 233, but does not include a bus bar. In particular, the wiring 233 may be in the form of cables configured to attach each power module 12 to the power conditioning module 18 and the system electrical connection may comprise a cable assembly input or output 237.

Figure 4A:
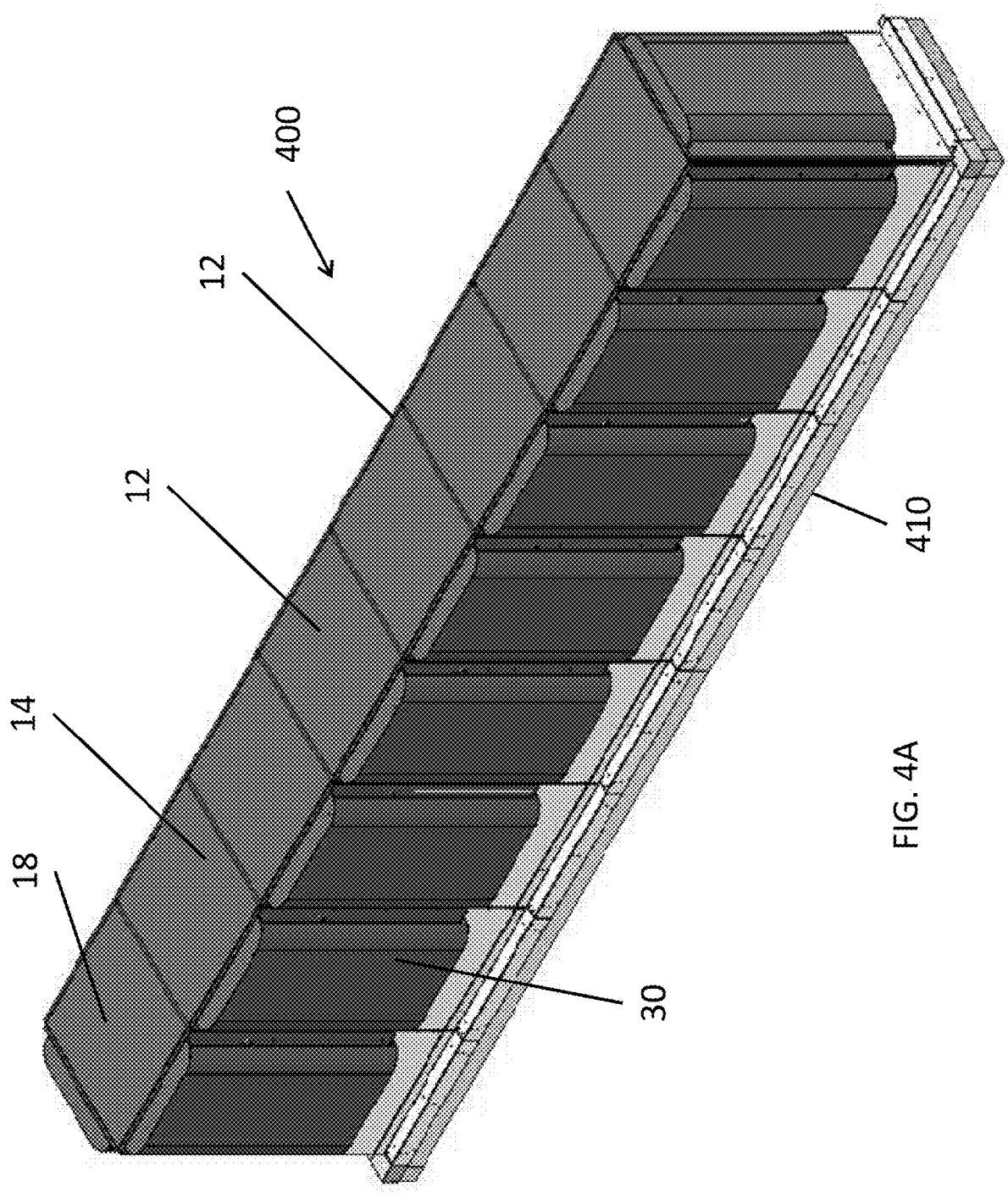
FIG. 4A illustrates a perspective view of a modular fuel cell system according to various embodiments of the present disclosure.

FIG. 4A illustrates a perspective view of a modular fuel cell system according to various embodiments of the present disclosure. FIG. 4B illustrates top plan view of the system 400. FIG. 4C illustrates a schematic view of a pad 410 of FIG. 4A. The fuel cell system 400 includes similar components to the fuel cell system 10 of FIG. 1. As such, similar reference numbers are used for similar elements, and only the differences therebetween will be described in detail.

Referring to FIGS. 4A-C, the system 400 includes power modules 12, a power conditioning module 18, and a fuel processing module 16 disposed on a pad 410. The system 400 may include doors 30 to access the modules 12, 16, 18. The system 400 may further include cosmetic doors 30A.

The power modules 12 may be disposed in a linear configuration. In particular, the power modules 12 may be disposed in one row, and the fuel processing module 16 and the power conditioning module 18 may be disposed at an end of the row. According to some embodiments, the fuel processing module 16 and the power conditioning module 18 may be disposed in the middle of the row. Accordingly, the system 400 has an overall linear configuration, and may be fit into locations having linear space, but limited width. An example of such a location may be behind a big box store.

While the system 400 is shown to include a row of six power modules 12, the present disclosure is not limited to any particular number of power modules 12. For example, the system 400 may include 2-30 power modules 12, 4-12 power modules 12, or 6-12 power modules 12, in some embodiments. In other words, the system 500 may include any desired number of power modules 12, with the modules 12, 16, 18 being disposed in a linear configuration.

The pad 410 includes a base 412. The base 412 may include first and second through holes 214, 216. The base 412 may also include a wiring recess and a plumbing recess, as discussed below with regard to FIG. 10. The base 412 may be formed of a concrete or similar material. Alternatively, the base 412 may be made of any other suitable structural material, such as steel or another metal, and may be pre-cast as a single body or may be cast in sections. The base 412 may be made by casting the base material into a patterned mold, removing the cast base 412 from the mold and then transporting the base 412 from the location of the mold (e.g., in a base fabrication facility) to the location of the fuel cell system (i.e., where the fuel cell system will be located to generate power).

The pad 410 may also include plumbing 230 (for example, water pipe 230A and fuel pipe 230B), wiring 232, and a system bus bar 234. In particular, the wiring 232 may be disposed in a substantially linear wiring recess and may be connected to one or more of the modules. For example, the wiring 232 may be connected to the bus bar 234 and each of the power modules 12. The bus bar 234 may be connected to the power conditioning module 18. The power conditioning module 18 may be connected to an external load through the second through hole 216. The bus bar 234 may be disposed on an edge of the second through hole 216, such that the wiring 232 does not extend across the second through hole 216. However, the bus bar 234 may be disposed on an opposing side of the second through hole 216, such that the wiring 232 does extend across the second through hole 216, if such a location is needed to satisfy system requirements.

According to some embodiments, the plumbing 230 and the wiring 232 may be disposed adjacent to the doors 30, in order to facilitate connecting the same to the modules 12, 16, 18. In other words, the plumbing 230 and the wiring 232 may be disposed adjacent to an edge of the base 412. According to some embodiments, the wiring 232 may be in the form of cables, similar to what is shown in FIG. 3D, and the bus bar 234 may be omitted.

Figure 5A:
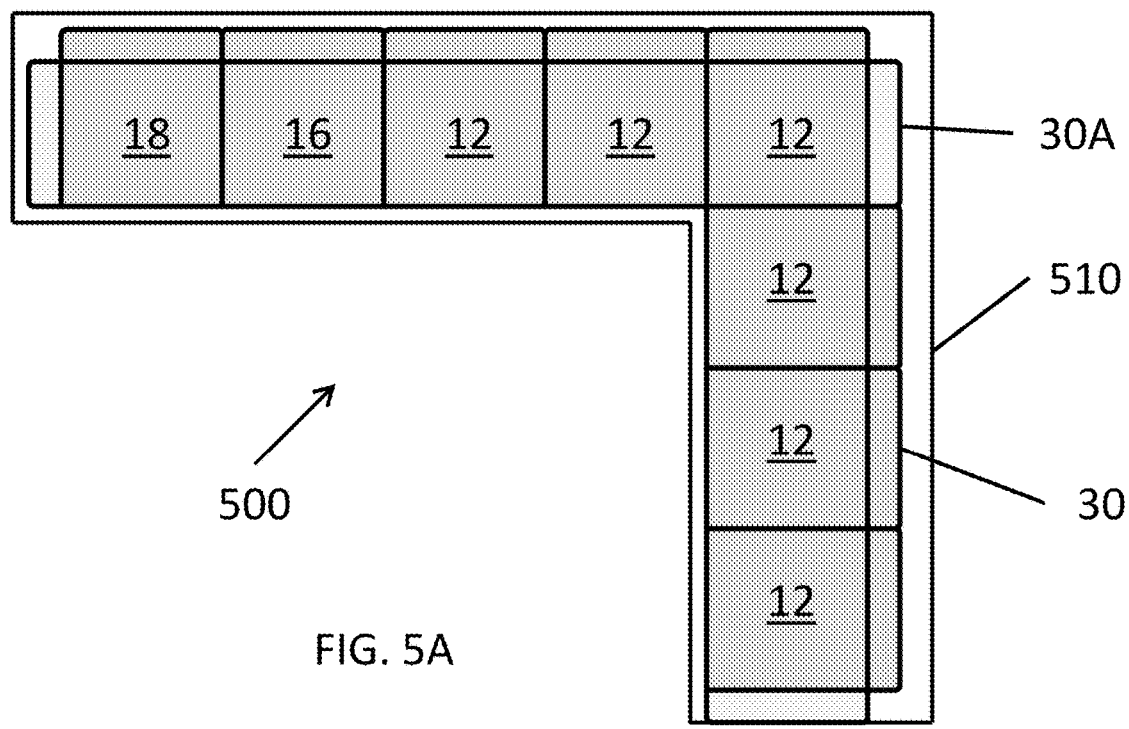
FIG. 5A illustrates a top plan view of a modular fuel cell system according to various embodiments of the present disclosure.
Figure 5B:
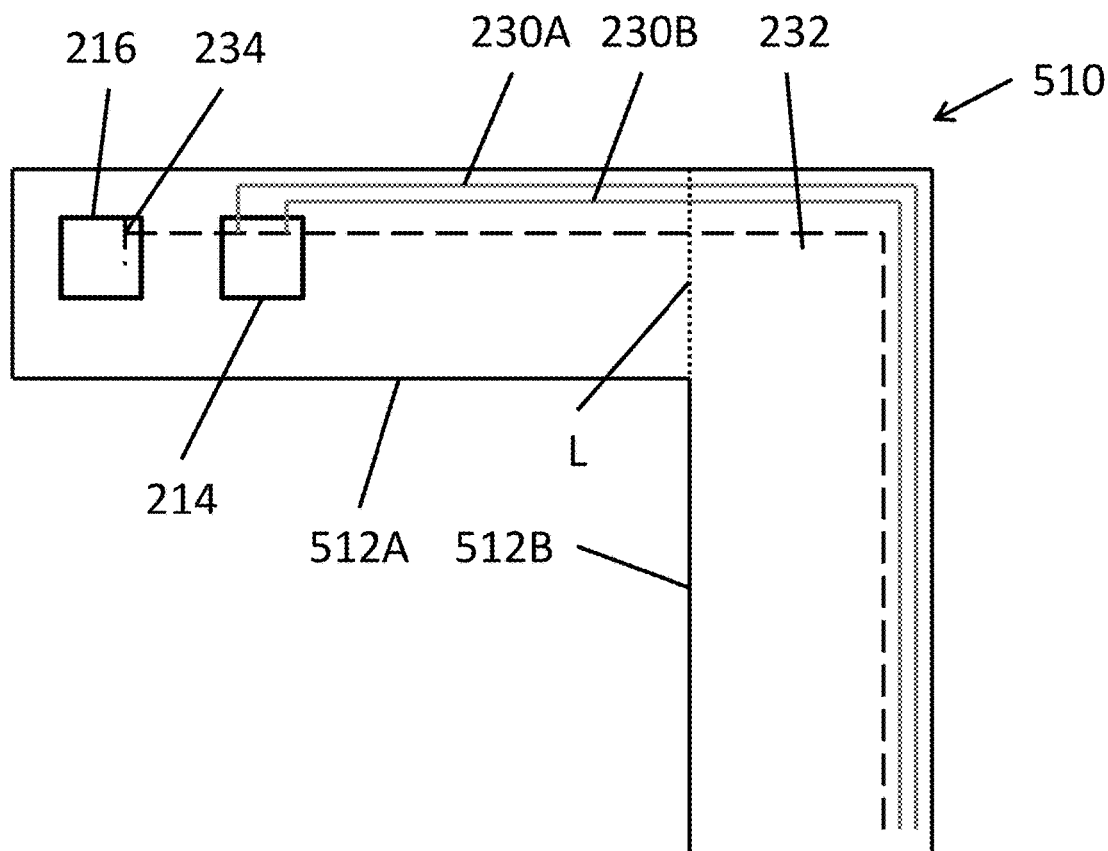
FIG. 5B illustrates a schematic view of a pad of the fuel cell system of FIG. 5A.

FIG. 5A illustrates a top plan view of a modular fuel cell system 500 according to various embodiments of the present disclosure. FIG. 5B illustrates a schematic view of a pad 510 of FIG. 5A. The fuel cell system 500 includes similar components to the fuel cell system 200. As such, similar reference numbers are used for similar elements, and only the differences therebetween will be described in detail.

Referring to FIGS. 5A and 5B, the system 500 includes power modules 12, a power conditioning module 18, and a fuel processing module 16, which are disposed on a pad 510. The system 500 may include doors 30 to access the modules 12, 16, 18. The system 500 may further include cosmetic doors 30A.

The power modules 12 may be disposed in an L-shaped configuration. In particular, the power modules 12 may be disposed in a first row, and the fuel processing module 16, the power conditioning module 18, and addition power modules 12 may be disposed in a second row substantially orthogonal to the first row. In particular, the modules 16, 18 may be disposed at a distal end of the second row. Accordingly, the system 500 may be configured to operate in locations having linear space, but limited width. An example of such a location may be behind a large store.

While the system 500 is shown to include a row of six power modules 12, the present disclosure is not limited to any particular number of power modules 12. For example, the system 500 may include 2-30 power modules 12, 4-12 power modules 12, or 6-12 power modules 12, in some embodiments. In other words, the system 500 may include any desired number of power modules 12, with the modules 12, 16, 18 being disposed in an orthogonal configuration.

The pad 510 includes a base 512. The base 512 may include first and second through holes 214, 216, a wiring recess, and a plumbing recess. The base 512 may be formed of a concrete or similar material. The base 512 may be pre-cast as a single body or may be cast in sections. For example, the base 512 may include a first section 512A and a second section 512B, which may be precast and then disposed adjacent to one another at an operating location. The division between the sections 512A and 512B is shown by dotted line L. The first row of modules may be disposed on the first section 512A, and the second row of modules may be disposed on the second section 512B.

The pad 510 may also include plumbing 230 (for example, water plumbing 230A and fuel plumbing 230B), wiring 232, and a system bus bar 234. In particular, the wiring 232 may be disposed in a wiring recess and may be connected to one or more of the modules. For example, the wiring 232 may be connected to the bus bar 234 and each of the power modules 12. The bus bar 234 may be connected to the power conditioning module 18. The power conditioning module 18 may be connected to an external load through the second through hole 216.

According to some embodiments, the plumbing 230 and the wiring 232 may be disposed adjacent to the doors 30, in order to facilitate connecting the same to the modules 12, 16, 18. In other words, the plumbing 230 and the wiring 232 may be disposed adjacent to edges of the base 512. According to some embodiments, the wiring 232 may be in the form of cables, similar to what is shown in FIG. 3D, and the bus bar 234 may be omitted.

Figure 5C:
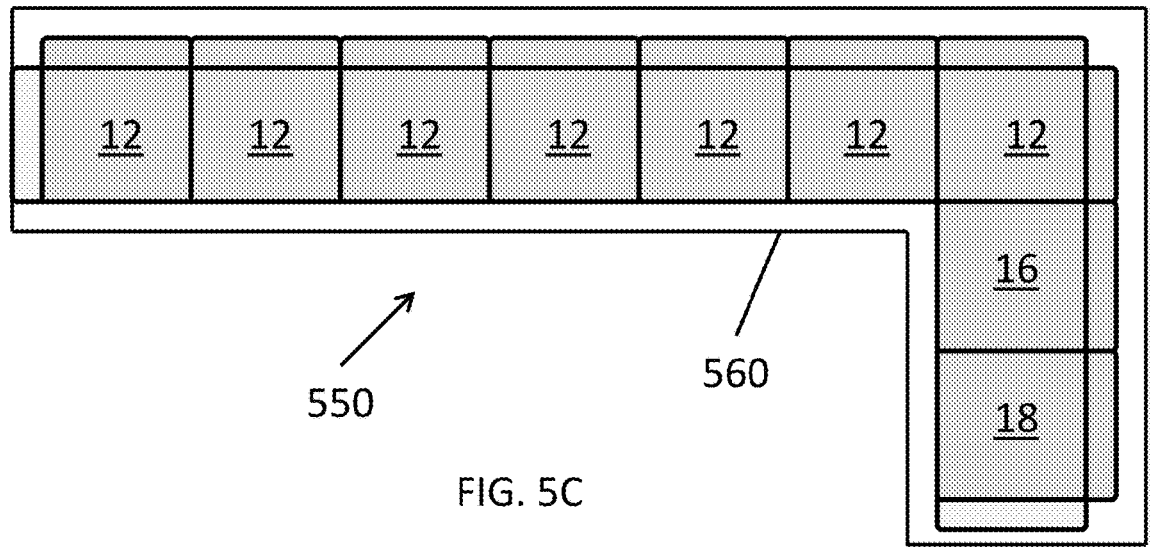
FIG. 5C illustrates a top plan view of a modular fuel cell system according to various embodiments of the present disclosure.
Figure 5D:
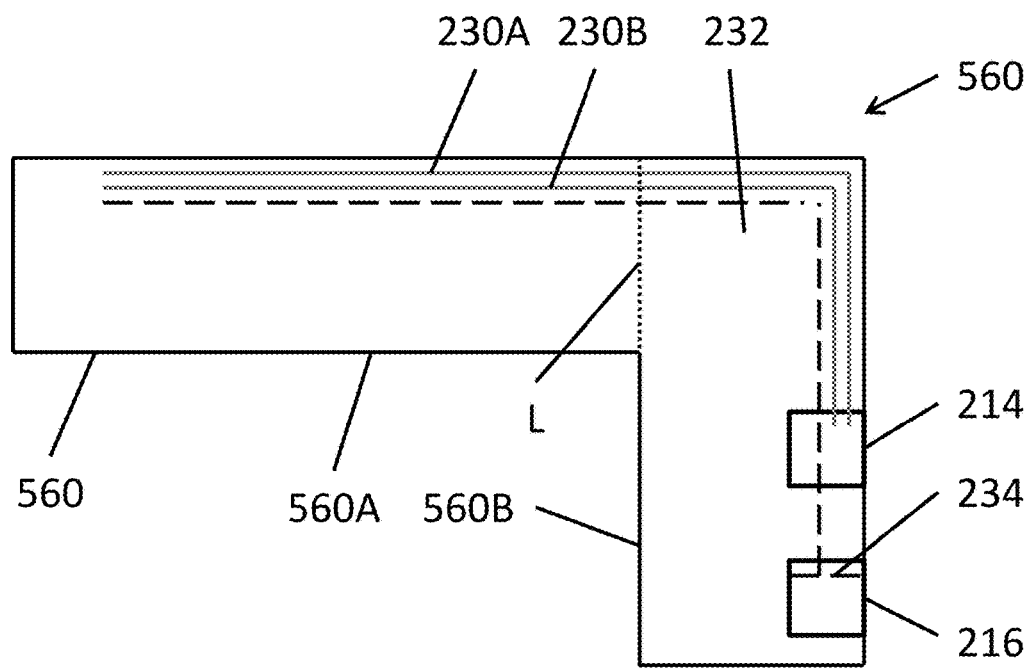
FIG. 5D illustrates a schematic view of a pad of the fuel cell system FIG. 5C.

FIG. 5C illustrates a top plan view of a modular fuel cell system 550 according to various embodiments of the present disclosure. FIG. 5D illustrates a schematic view of a pad 560 of FIG. 5C. The fuel cell system 550 includes similar components to the fuel cell system 500. As such, similar reference numbers are used for similar elements, and only the differences therebetween will be described in detail.

Referring to FIGS. 5C and 5D, the system 550 includes power modules 12, a power conditioning module 18, and a fuel processing module 16, which are disposed on a pad 560. The power modules 12 may be disposed in a first row, and fuel processing module 16 and the power conditioning module 18 may be disposed in a second row that is generally orthogonal to the first row. As such, the system 550 may be generally L-shaped. The pad 560 may include first and second sections 560A and 560B separated by dotted line L. However, the pad 560 may be formed of a single piece of material. The first row of modules may be disposed on the first section 560A, and the second row of modules may be disposed on the second section 560B.

The pad 560 may also include plumbing 230 (for example, water plumbing 230A and fuel plumbing 230B), wiring 232, a first through hole 214, a second through hole 216, and a system bus bar 234. In particular, the wiring 232 may be disposed in a wiring recess and may be connected to one or more of the modules. For example, the wiring 232 may be connected to the bus bar 234 and each of the power modules 12. The bus bar 234 may be connected to the power conditioning module 18. The power conditioning module 18 may be connected to an external load through the second through hole 216.

According to some embodiments, the plumbing 230 and the wiring 232 may be disposed adjacent to the doors 30, in order to facilitate connecting the same to the modules 12, 16, 18. In other words, the plumbing 230 and the wiring 232 may be disposed adjacent to edges of the pad 560. According to some embodiments, the wiring 232 may be in the form of cables, similar to what is shown in FIG. 3D, and the bus bar 234 may be omitted.

Figure 6A:
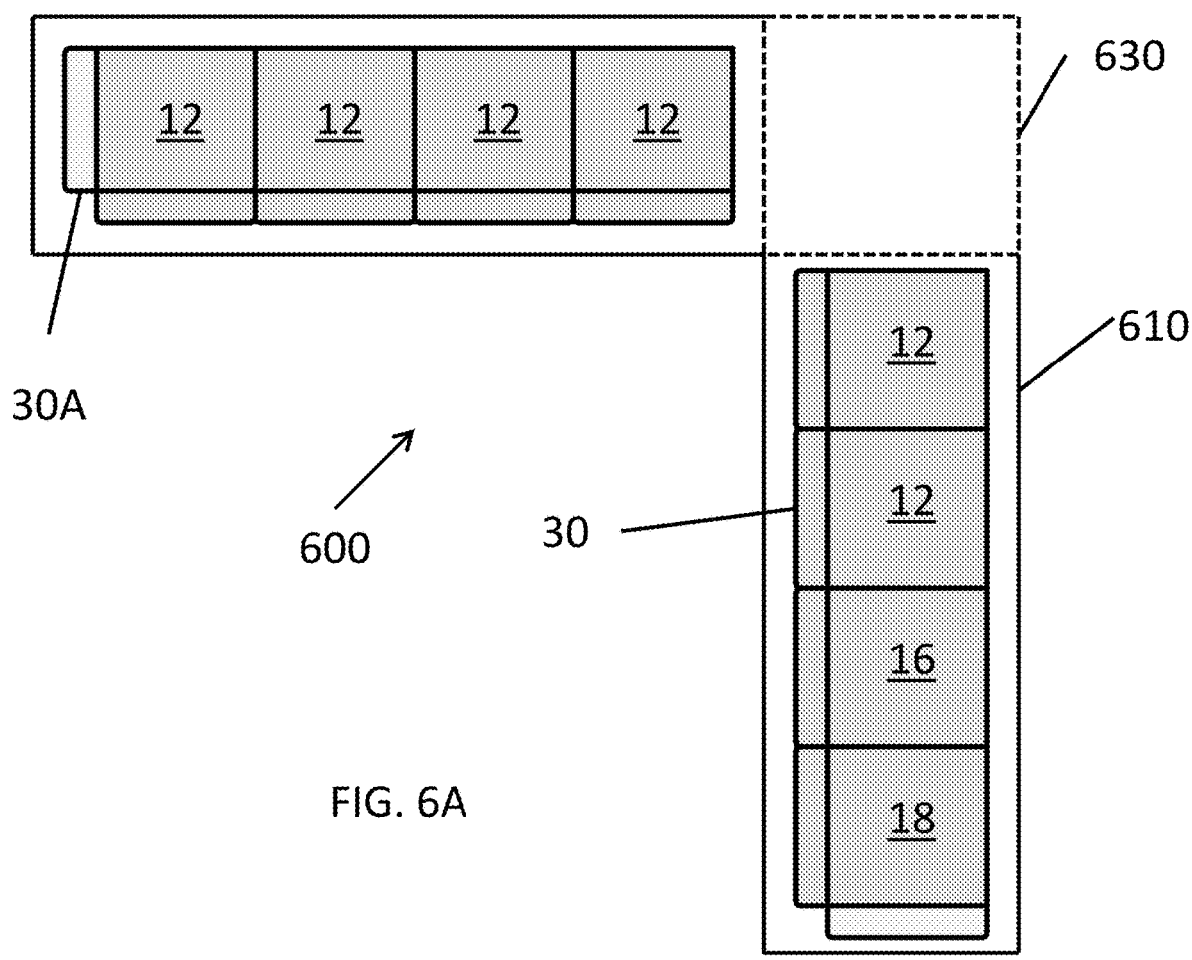
FIG. 6A illustrates a top plan view of a modular fuel cell system according to various embodiments of the present disclosure.
Figure 6B:
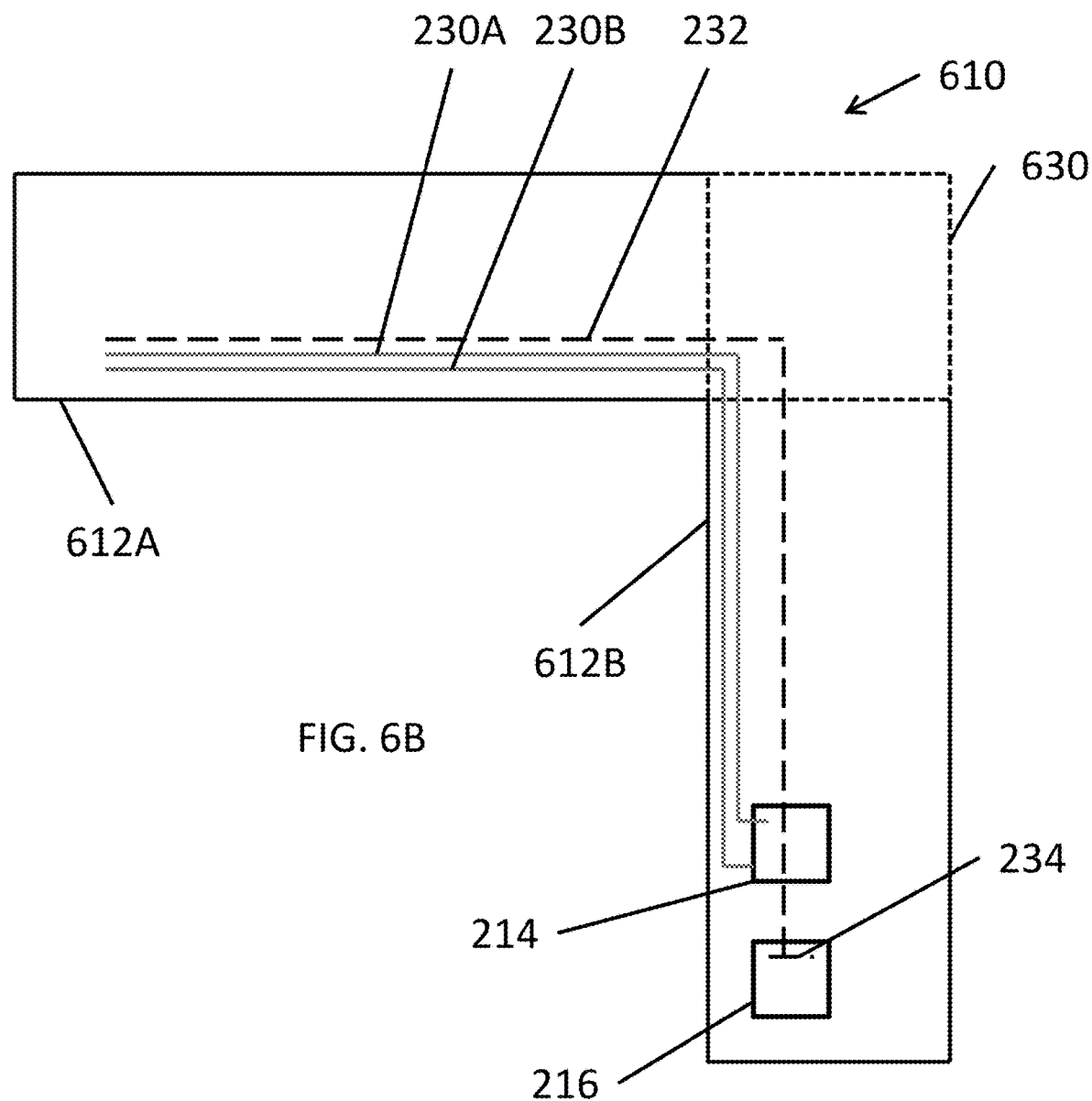
FIG. 6B illustrates a schematic view of a pad of the fuel cell system of FIG. 6A.

FIG. 6A illustrates a top plan view of a modular fuel cell system 600 according to various embodiments of the present disclosure. FIG. 6B illustrates a schematic view of a pad 610 of FIG. 6A. The fuel cell system 600 includes similar components to the fuel cell system 500. As such, similar reference numbers are used for similar elements, and only the differences therebetween will be described in detail.

Referring to FIGS. 6A and 6B, the system 600 includes power modules 12, a power conditioning module 18, and a fuel processing module 16, which are disposed on a pad 610. The system 600 may include doors 30 to access the modules 12, 16, 18. The system 600 may further include cosmetic doors 30A.

The power modules 12 may be disposed in an L-shaped configuration. In particular, the power modules 12 may be disposed in a first row, and the fuel processing module 16, the power conditioning module 18, and addition power modules 12 may be disposed in a second row substantially orthogonal to the first row. In particular, the modules 16, 18 may be disposed at a distal end of the second row.

In contrast to the system 500, the system 600 includes a dummy section 630 disposed between the first and second rows. The dummy section 630 may be a portion of the pad 610 that does not include a module. Plumbing 230 and wiring 232 may be routed through the dummy section 630 and may extend along an edge of the pad 610.

The pad 610 may include a first section 612A and a second section 612B, which are separated by the dummy section 630. In some embodiments, the dummy section 630 may be a separate section of the pad 610, or may be a portion of either of the first and second sections 612A, 612B. In some embodiments, an empty cabinet may be disposed on the dummy section 630. The first row of modules may be disposed on the first section 612A, and the second row of modules may be disposed on the second section 612B.

Figure 7A:
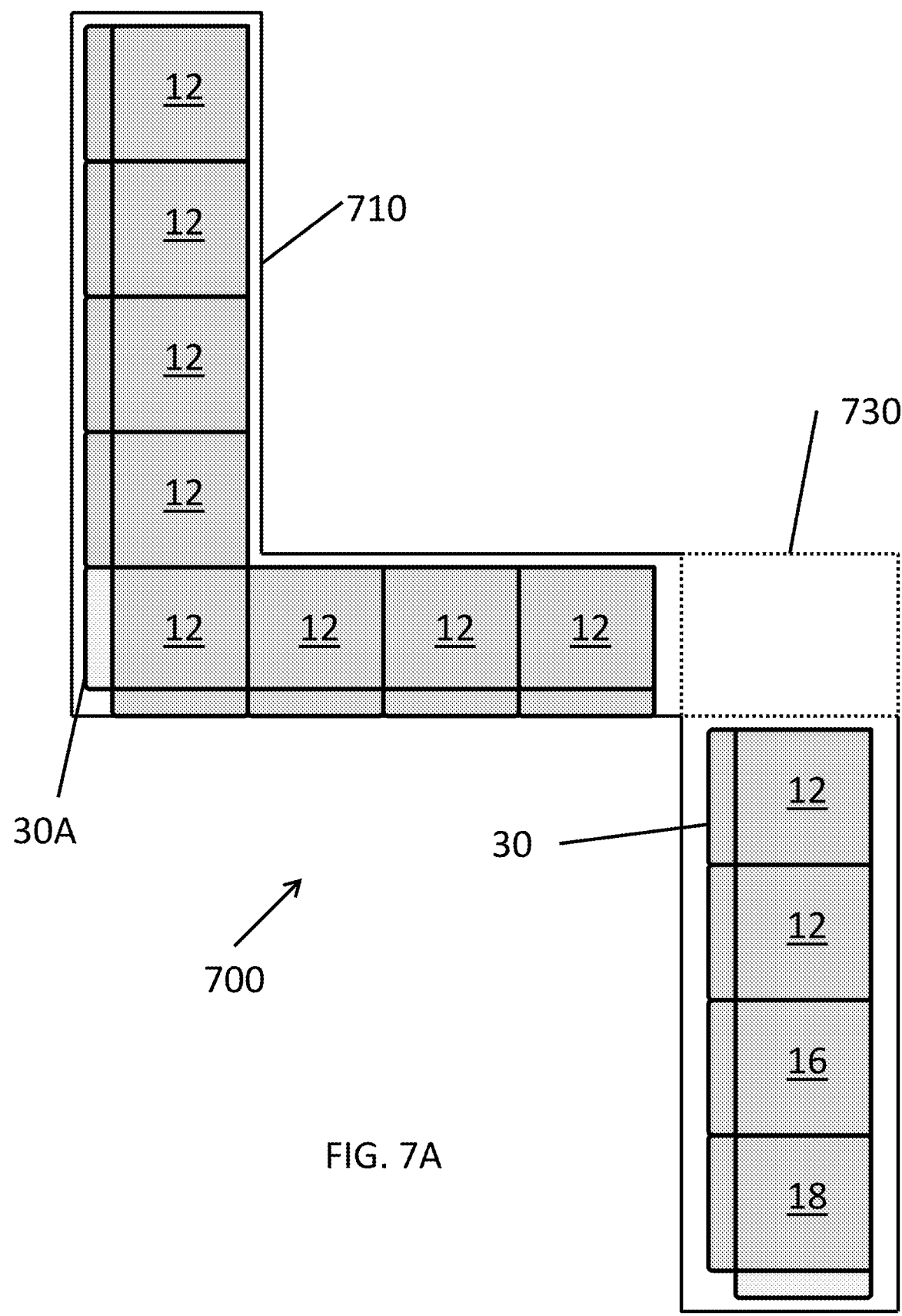
FIG. 7A illustrates a top plan view of a modular fuel cell system according to various embodiments of the present disclosure.
Figure 7B:
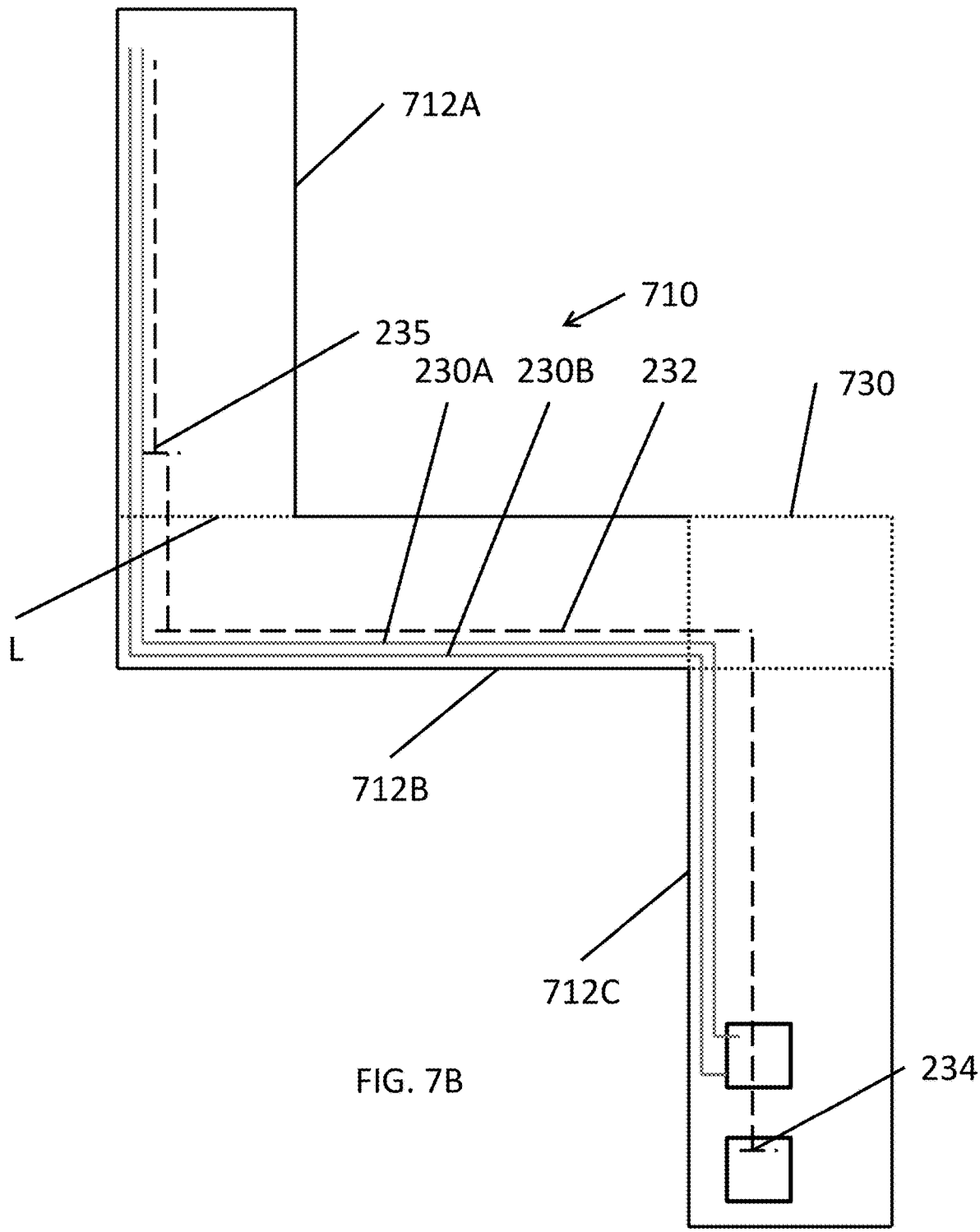
FIG. 7B illustrates a schematic view of a pad of the fuel cell system of FIG. 7A.

FIG. 7A illustrates a top plan view of a modular fuel cell system 700 according to various embodiments of the present disclosure. FIG. 7B illustrates a schematic view of a pad 710 of FIG. 7A. The fuel cell system 700 includes similar components to the fuel cell system 500. As such, similar reference numbers are used for similar elements, and only the differences therebetween will be described in detail.

Referring to FIGS. 7A and 7B, the system 700 includes power modules 12, a power conditioning module 18, and a fuel processing module 16, which are disposed on a pad 710. The system 700 may include doors 30 to access the modules 12, 16, 18. The system 700 may further include cosmetic doors 30A.

The power modules 12 may be disposed in a stepped configuration. In particular, the power modules 12 may be disposed in a first row, a second row substantially orthogonal to the first row, and a third row substantially orthogonal to the second row. The fuel processing module 16 and the power conditioning module 18 may be disposed at a distal end of the third row. However, the fuel processing module 16 and the power conditioning module 18 may be disposed in the first row or the second row, according to some embodiments.

The system 700 includes a dummy section 730 between the first and second rows. The dummy section 730 may be a portion of the pad 710 that does not include a module. In some embodiments, an empty cabinet may be disposed on the dummy section 730. Plumbing 230 and wiring 232 may be routed through the dummy section 730 and may extend along an edge of the pad 710.

The pad 710 may include a first section 712A, a second section 712B, and a third section 712C. The first and second sections 712A, 712B may be separated by line L. The second and third sections 712B, 712C may be separated by the dummy section 730. In some embodiments, the dummy section 730 may be a separate segment of the pad 710, or may be a portion of either of the second and third sections 712B, 712C. The first row of modules may be disposed on the first section 712A, the second row of modules may be disposed on the second section 712B, and the third row of modules may be disposed on the third section 712B. The pad 710 may also include a second system bus bar 235 configured to connect wiring 232 of the first and second sections 712A, 712B.

Figure 8:
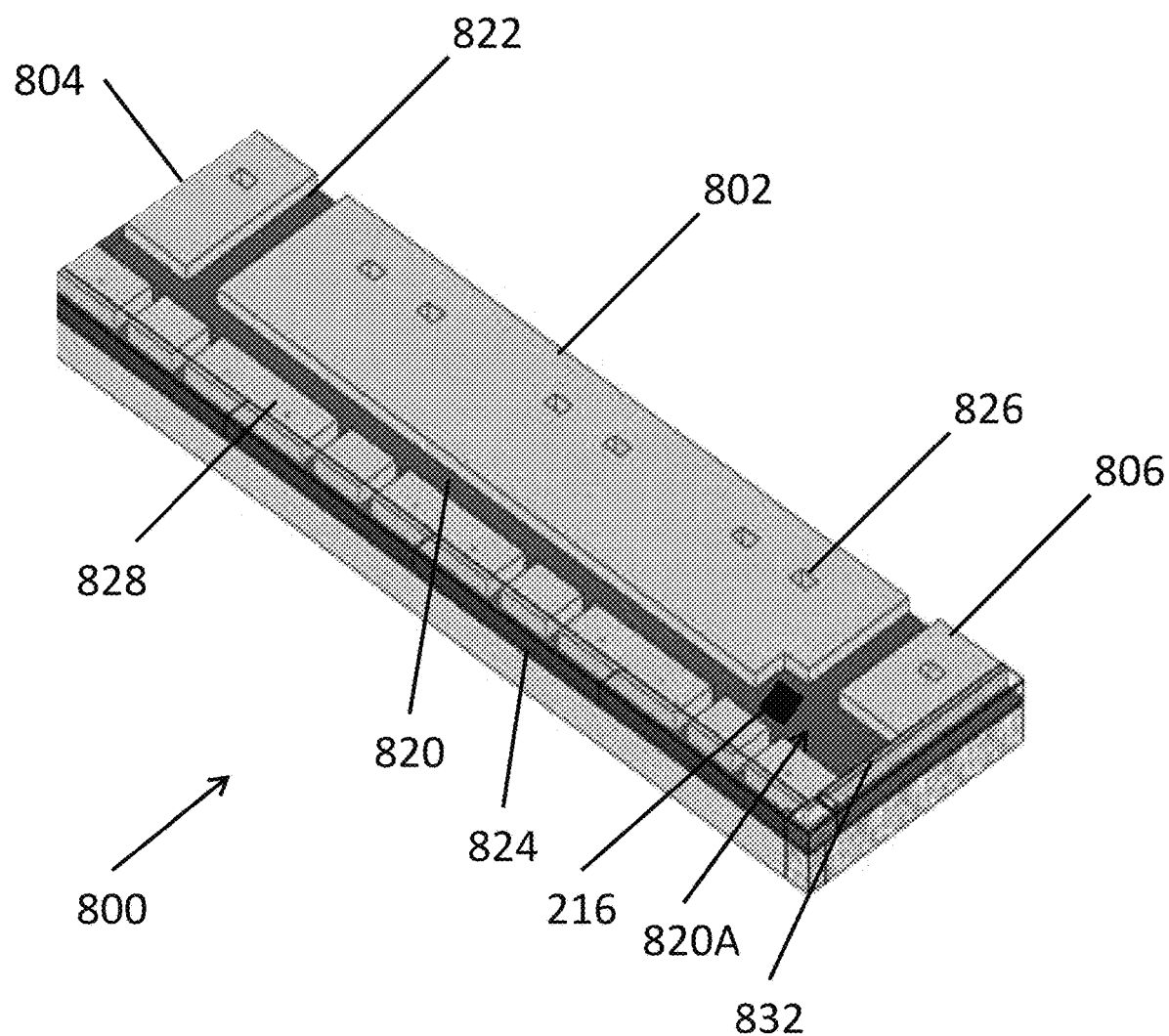
FIG. 8 illustrates a perspective view of modular pad section according to various embodiments of the present disclosure.

FIG. 8 illustrates a perspective view of modular pad section 800 according to various embodiments of the present disclosure. Referring to FIG. 8, the pad section 800 may be used as any of the sections of the above-described pads. The pad section 800 may be rectangular, e.g., the pad section 800 may have two substantially parallel long sides and two substantially parallel short sides extending therebetween.

The pad section 800 may include a first boss 802, a second boss 804, a third boss 806, plumbing brackets 828, a wiring recess 820, connection recesses 822, and a plumbing recess 824, which may be formed on an upper surface of the pad section 800. The first boss 802 may be disposed between the second and third bosses 804, 806. The second boss 804 may have a larger surface area than the third boss 806. For example, the second boss 804 and the third boss 806 may have substantially the same width, but the second boss 804 may be longer than the third boss 806. The first boss 802 may have a larger surface area than the second or third bosses 804, 806. A portion 820A of the wiring recess 820 that is disposed between the third boss 806 and adjacent plumbing brackets 828 may be enlarged, e.g., the enlarged portion 820A may be wider than the rest of the wiring recess 820. A through hole 216 may be formed in the enlarged portion 820A, according to some embodiments.

The wiring recess 820 may be disposed between the bosses 802, 804, 806 and the plumbing brackets 828. The bosses 802, 804, 806 may include tie-down pockets 826, configured to secure modules disposed thereon. The plumbing brackets 828 may be disposed in a first row, and the bosses 802, 804, 806 may be disposed in a second row that is substantially parallel to the first row.

The plumbing recess 824 may be formed on only two or three sides/edges of the pad section 800, depending on the shape of a pad constructed using the pad sections. For example, the plumbing recess 824 may extend along a long side and one short side of the pad section 800, if the pad section 800 is to be used in a fuel cell system having L-shaped or linear configuration. In the alternative, the plumbing recess 824 a long side and two short sides of the pad section 800, if the pad section 800 is to be used in a fuel cell system having a rectangular configuration.

An edge cover 832 may be disposed on the plumbing recesses 822. The pad section 800 may be precast, delivered, and then assembled on site with one or more other pad sections 800.

Figure 9A:
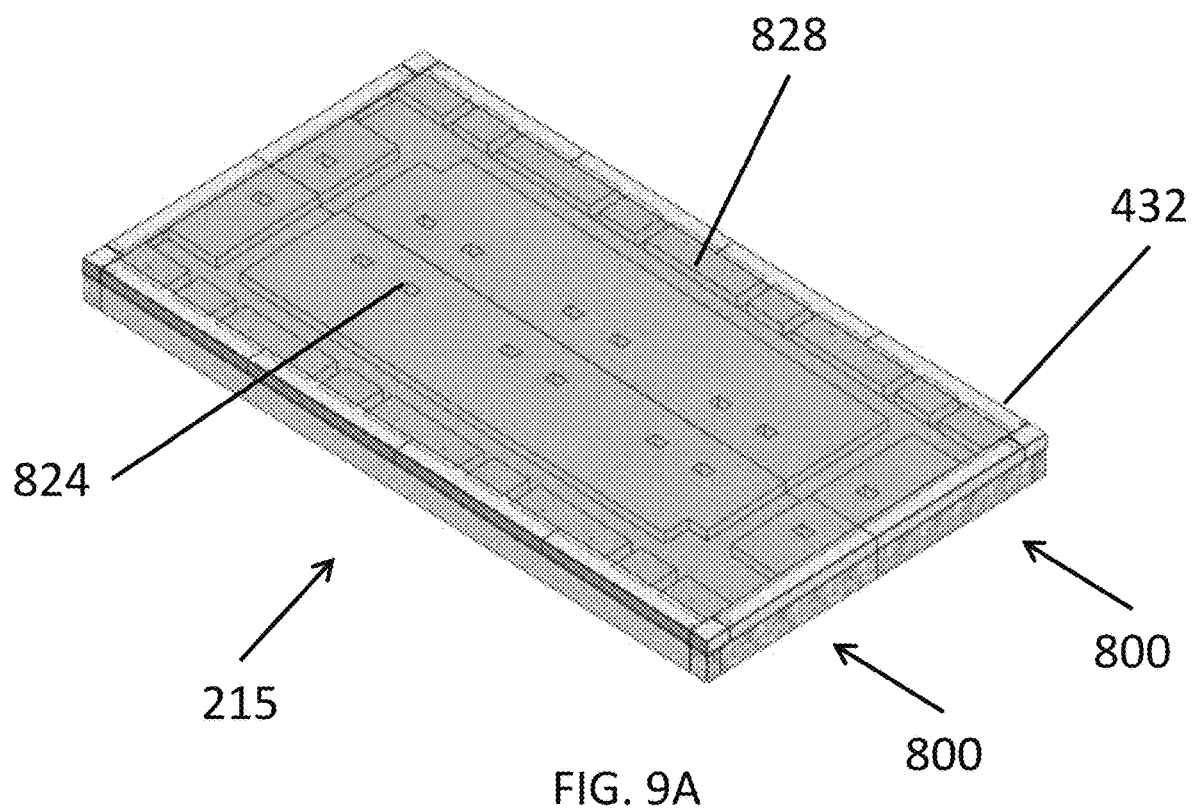
FIGS. 9A and 9B illustrate perspective views of a modular pad according to various embodiments of the present disclosure.
Figure 9B:
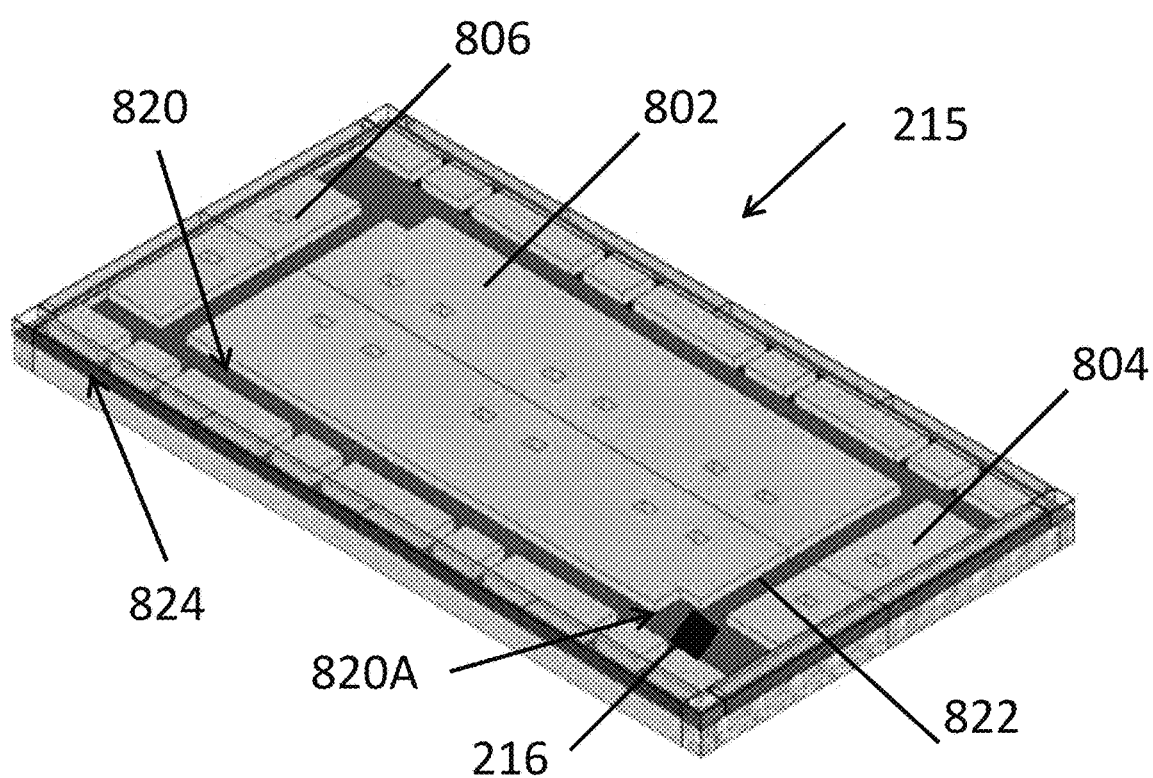

FIGS. 9A and 9B illustrate perspective views of a modular pad 215 according to various embodiments of the present disclosure. The pad 215 may be used as the pad 210 of the fuel cell system 200. Referring to FIGS. 9A and 9B, the pad 215 includes two of the pad sections 800 disposed adjacent to one another. In particular, the pad sections 800 may be disposed flush with one another, and/or may be physically connected to one another.

In particular, each pad section 800 may be configured such that the connection recesses 822 and the plumbing recesses 824 are respectively aligned with one another, when the sections 800 are assembled, as shown in FIGS. 9A and 9B. In other words, the connection recesses 822 of the adjacent pad sections 800 may form contiguous recesses, and the plumbing recesses 824 of two adjacent pad sections 800 may form a contiguous plumbing recess, when the pad sections 800 are aligned with one another. In addition, the pad sections 800 may be aligned such that the second bosses 804 are aligned with (contact) the third bosses 806, and the first bosses 802 are aligned with (contact) one another. In other words, a long side of a first pad section 800 may be disposed in contact with a long side of a second pad section 800 (rotated 180 degrees with respect to the identical first pad section). One or more through holes 216 may be formed the pad sections 800, in order to allow for the routing of plumbing and/or wiring. In particular, a through hole 216 may be formed in the enlarged portion 820A of the wiring recess 820.

Figure 10:
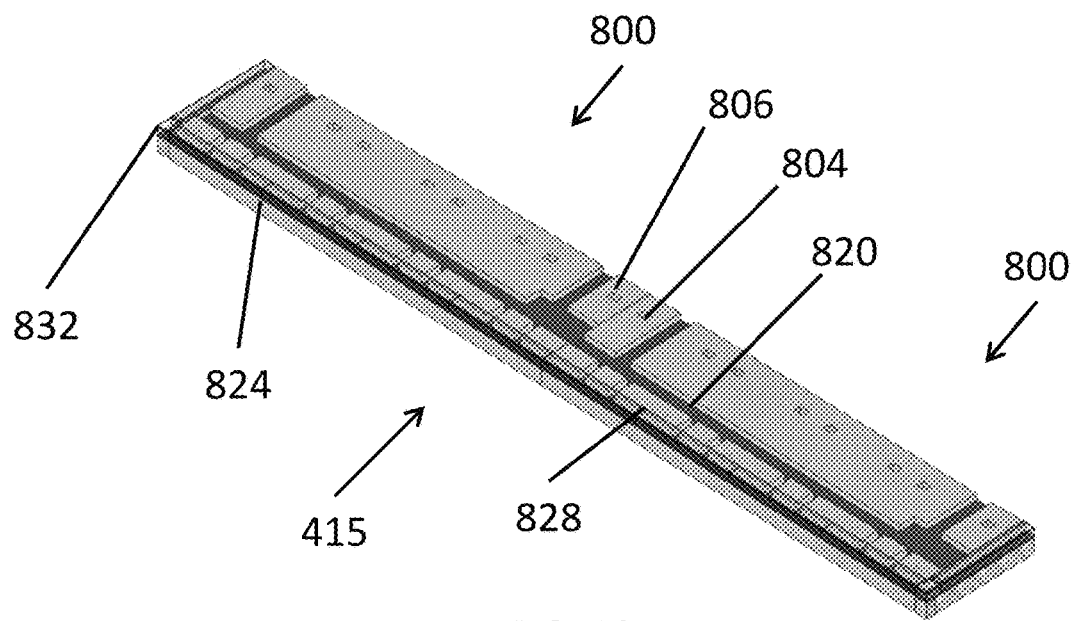
FIG. 10 illustrates a perspective view of a modular pad according to various embodiments of the present disclosure.

FIG. 10 illustrates a perspective view of a modular pad 415 according to various embodiments of the present disclosure. The pad 415 that may be a linear pad that can be substituted for the linear pad 410 of FIGS. 4A and 4B. Referring to FIG. 10, the pad 415 includes two pad sections 800 aligned together lengthwise. In particular, the third boss 806 of one pad section 800 is disposed adjacent to the second boss 804 of the other pad section 800. In other words, a short side of one of the pad sections 800 may be disposed in contact with a short side of the other pad section 800. As such, the wiring recesses 820 and the plumbing recesses 824 of the pad sections 800 may be respectively aligned (contiguous) with one another. In particular, the wiring recesses 820 may be aligned to form a substantially contiguous and linear wiring recess.

Figure 11:
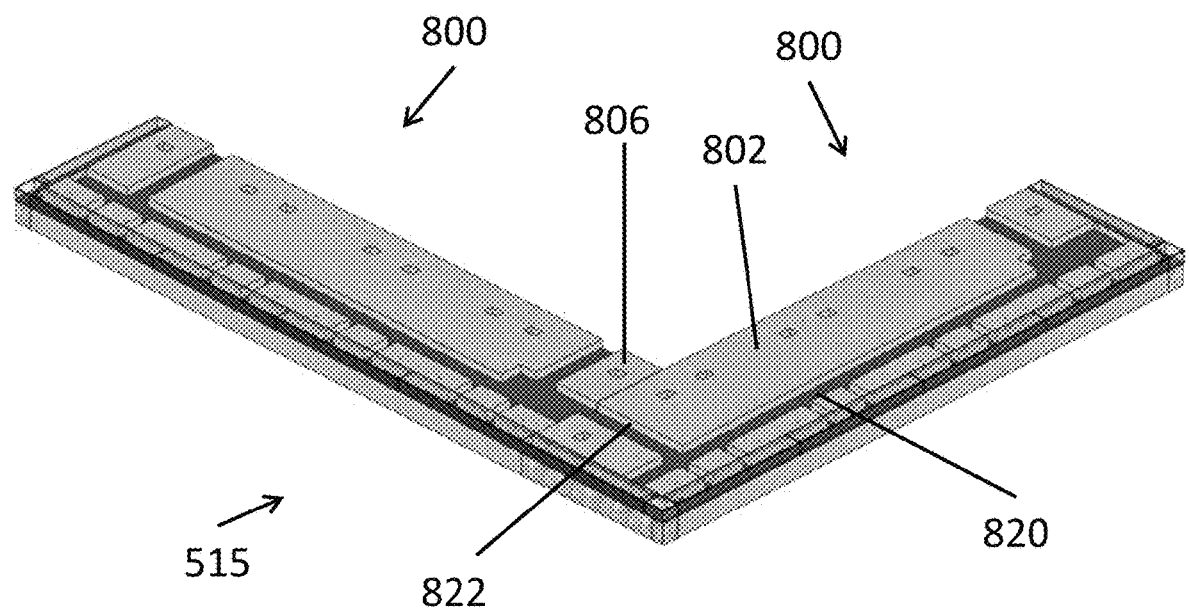
FIG. 11 illustrates a modular pad according to various embodiments of the present disclosure.

FIG. 11 illustrates a modular pad 615 according to various embodiments of the present disclosure. The pad 615 may be substituted for the pad 610 of FIG. 6B.

Referring to FIG. 11, the pad 615 includes two pad sections 800 that are orthogonally aligned together. In particular, the third boss 806 of one pad section 800 is disposed adjacent to the first boss 802 of the other pad section 800. As such, the wiring recesses 820 may be connected by one of the connection recesses 822, and the plumbing recesses 824 of the pad sections 800 may be respectively aligned (contiguous) with one another. In other words, a short side of one pad section 800 may be disposed in contact with a long side of the other pad section 800.

An additional pad section 800 may be aligned with one of the above pad sections 800, such that a step-shaped pad, such as pad 710 of FIG. 7B, may be formed. In other words, each section 712A, 712B, 712C may be formed using one of the pad sections 800.

Figure 12:
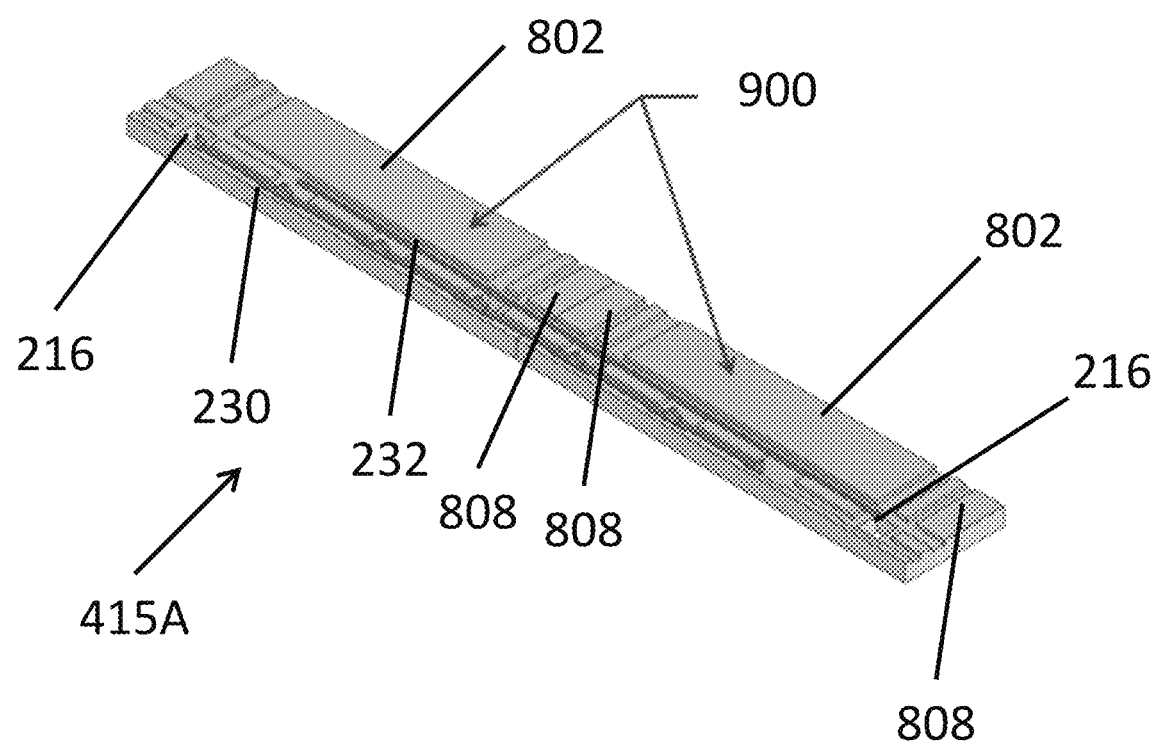
FIG. 12 illustrates a modular pad according to various embodiments of the present disclosure.

FIG. 12 illustrates a modular pad 415A according to various embodiments of the present disclosure. The pad 415A that may be substituted for the pad 410 of FIGS. 4A and 4B.

Referring to FIG. 12, the pad 415A includes two modular pad sections 900. The pad sections 900 are similar to the pad sections 800, so only the differences therebetween will be discussed in detail.

In particular, the pad sections 900 each include a first boss 802 and second bosses 808 disposed on opposing sides of the first boss 804, on an upper surface of the pad section 900. The second bosses 808 may have the same size and shape. Accordingly, the pad sections 900 may be symmetrical widthwise, which is not the case for the pad sections 800, since the pad sections 800 include the second and third bosses 804 and 806 having different sizes. The pad sections 900 may be aligned together in a manner similar to the pad sections 800 in the pad 415, as discussed above.

Figure 13A:
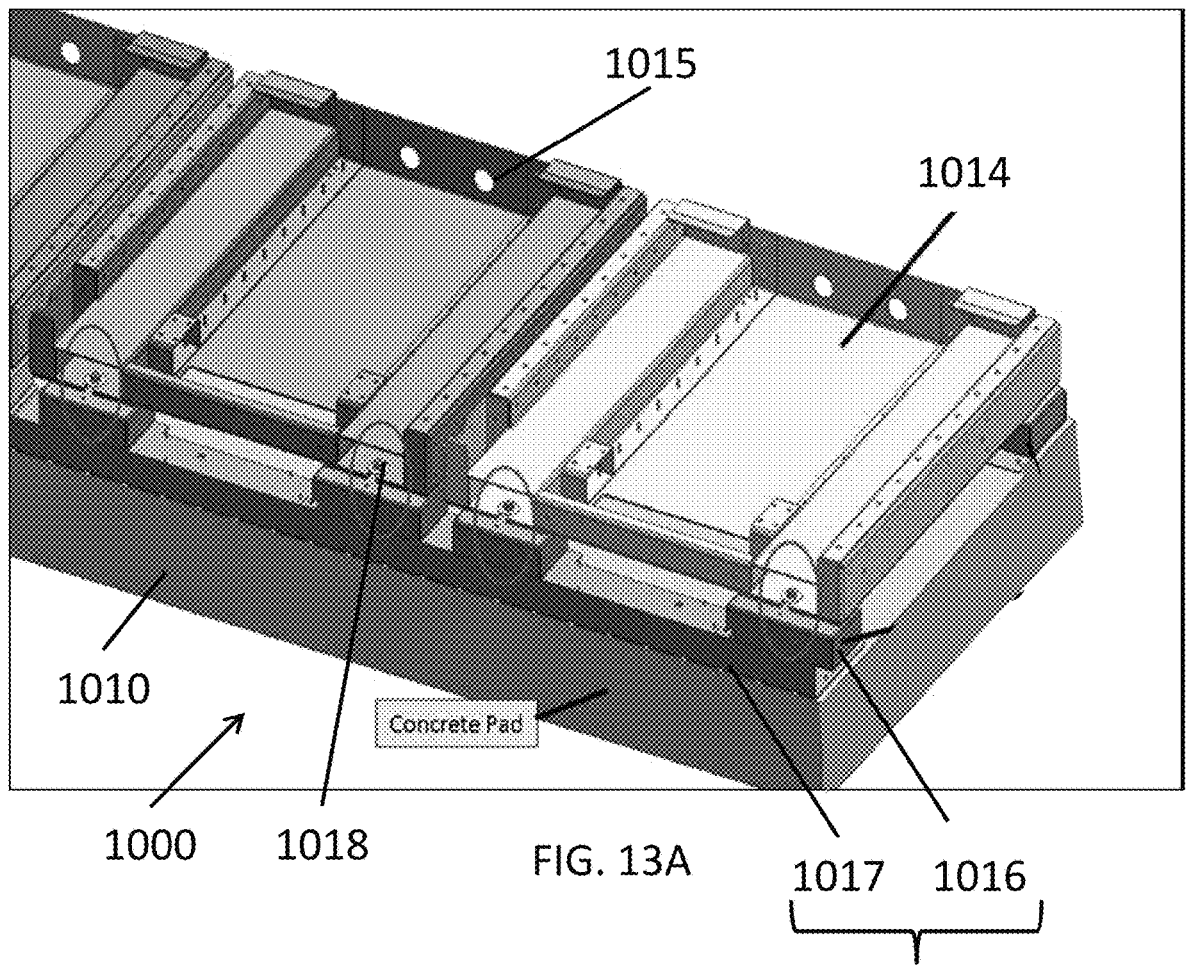
FIGS. 13A and 13B illustrate perspective views of a pad according to various embodiments of the present disclosure.
Figure 13B:
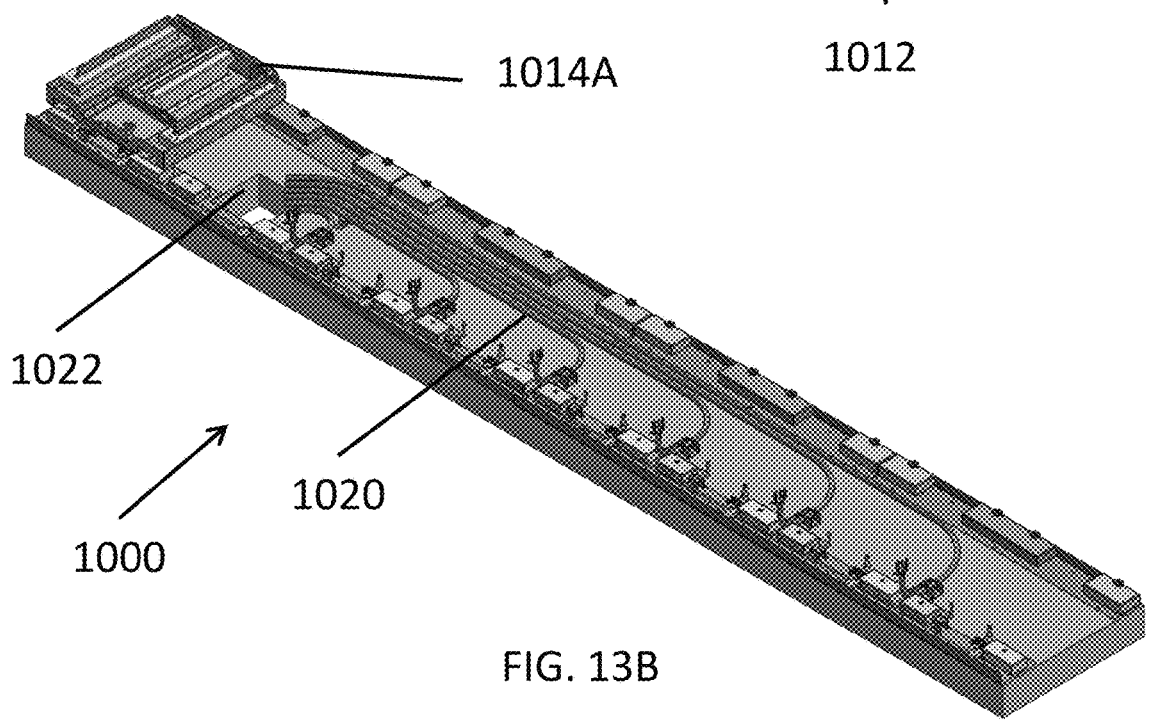

FIGS. 13A and 13B illustrate perspective views of a pad 1000 of a fuel cell system, according to various embodiments of the present disclosure.

Referring to FIGS. 13A and 13B, the pad 1000 may be incorporated into any of the above fuel cell systems. The pad 1000 includes the base 1010, a separator 1012, and frames 1014. The base 1010 may be formed of concrete or similar material, as described above. In particular, the base 1010 may be cast on site, or may be precast in one or more sections and then assembled on site.

The separator 1012 may be disposed on an upper surface of the base 1010, and may be formed of sheet metal or other similar material. The separator 1012 may include rails 1017 disposed on opposing sides of the base 1010, and spacers 1016 disposed on the rails 1017. The rails 1017 may be single pieces, or may include connected rail sections.

The frames 1014 may be attached to the spacers 1016 using any suitable method, such as by using bolts 1018, clamps, or the like. The frames 1014 are configured to receive modules, such as power modules, fuel processing modules, or the like. The separator 1012 may be configured to separate the base 1010 and the frames 1014, such that there is a space formed therebetween.

The pad 1000 may include plumbing 1020 disposed on the base 1010. The plumbing 1020 may extend from a through hole 1022 formed in the base 1010, and may be configured to provide water and/or fuel to modules disposed on the frames 1014. The pad 1000 may include a frame 1014A configured to receive a power conditioning module. The pad 1000 may also include wiring (not shown) configured to connect the power modules to a power conditioning module disposed on the frame 1014A. In the alternative, wiring could be routed through openings 1015 formed in the frames 1014.

The separator 1012 is configured to space apart the frames 1014 from the upper surface of the base 1010. Accordingly, the plumbing 1020 may be disposed directly on the upper surface of the base 1010. In other words, the upper surface of the base 1010 may be substantially planar, e.g., does not need to include recesses for the plumbing 1020 and/or wiring.

The configuration of the pad 1000 provides advantages over conventional pads, in that plumbing and/or wiring is not required to be set into features cast into the base 1010, in order to have a flat surface for the installation of fuel cell system modules. As such, the pad 1000 may be manufactured at a lower cost, since the base 1010 does not require cast features.

Figure 14:
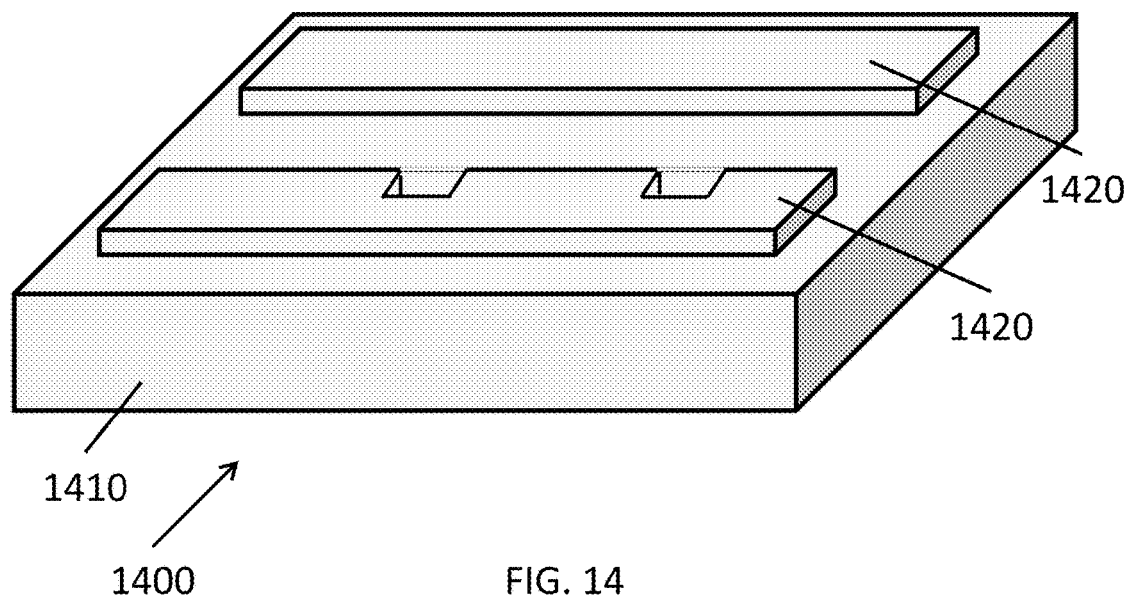
FIG. 14 is a perspective view of a modular pad of a fuel cell system, according to various embodiments of the present disclosure.

FIG. 14 is a perspective view of a pad 1400 for a fuel cell system, according to various embodiments of the present disclosure. Referring to FIG. 14, the pad 1400 includes a base 1410 and replicators 1420 disposed on the base 1410. The base 1410 may be a cast on site or precast and delivered to a site. The base 1410 may be formed of concrete or a similar material.

The replicators 1420 may be attached to the base 1410 and may be formed of plastic or other non-corrosive material. The replicators 1420 may replicate features that are molded into bases of the previous embodiments described above. For example, the replicators 1420 may form bosses such that wiring and/or plumbing channels or recesses are formed on a flat upper surface of the base 1410 between the replicators 1420. Accordingly, the replicators 1420 may create an elevated structure for supporting the modules 12, 16, 18 of a fuel cell system, while the wiring and plumbing is formed on the flat upper surface of the concrete base 1410 in the channels or recesses between the replicators. The replicators 1420 may also be used as templates for drilling features into the base 1410. The replicators 1420 may be attached (e.g., snapped) together and/or attached to the base 1410 using any suitable attachment methods, such as being molded onto the upper base surface.

According to some embodiments, multiple pads 1400 may be attached to one another as pad sections, to create a larger pad 1400. For example, the pads 1400 could be connected using "living hinges" on pad plumbing covers, which may snap lock into position. In other words, the pad 1400 may be considered a pad section, according to some embodiments.

Figure 15:
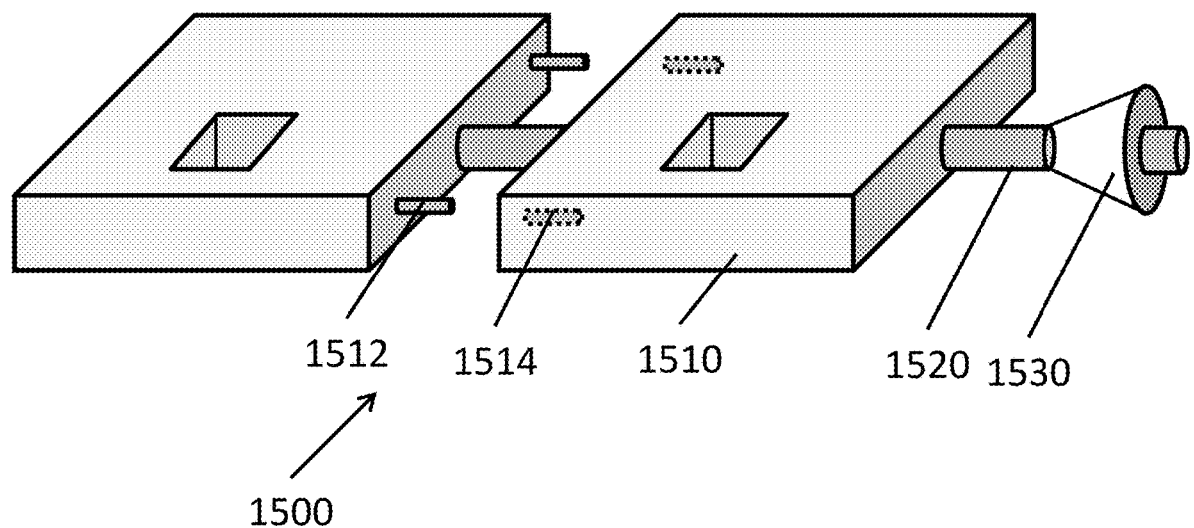
FIG. 15 is a perspective view of a modular pad of a fuel cell system, according to various embodiments of the present disclosure.

FIG. 15 is a perspective view of a pad 1500 for a fuel cell system, according to various embodiments of the present disclosure. Referring to FIG. 15, the pad 1500 includes pad sections 1510 and a tension cable 1520. While one tension cable 1520 is shown, multiple tension cables 1520 may be included. The tension cable 1520 is configured to connect the pad sections 1510. In particular, wedges 1530 may be disposed on the tension cable 1520 to bias the pad sections 1520 together. While one wedge 1530 is shown, wedges may be disposed on opposing ends of each tension cable 1520.

The pad sections 1510 may further include alignment pins 1512 and alignment holes 1514. In particular, the alignment pins 1512 may be interested into the alignment holes 1514, in order to align the pad sections 1520 with one another. According to some embodiments, the alignment pins 1512 may be pyramid-shaped and the alignment holes 1514 may have a corresponding shape, in order to facilitate alignment of the pad sections 1510.

Figure 16:
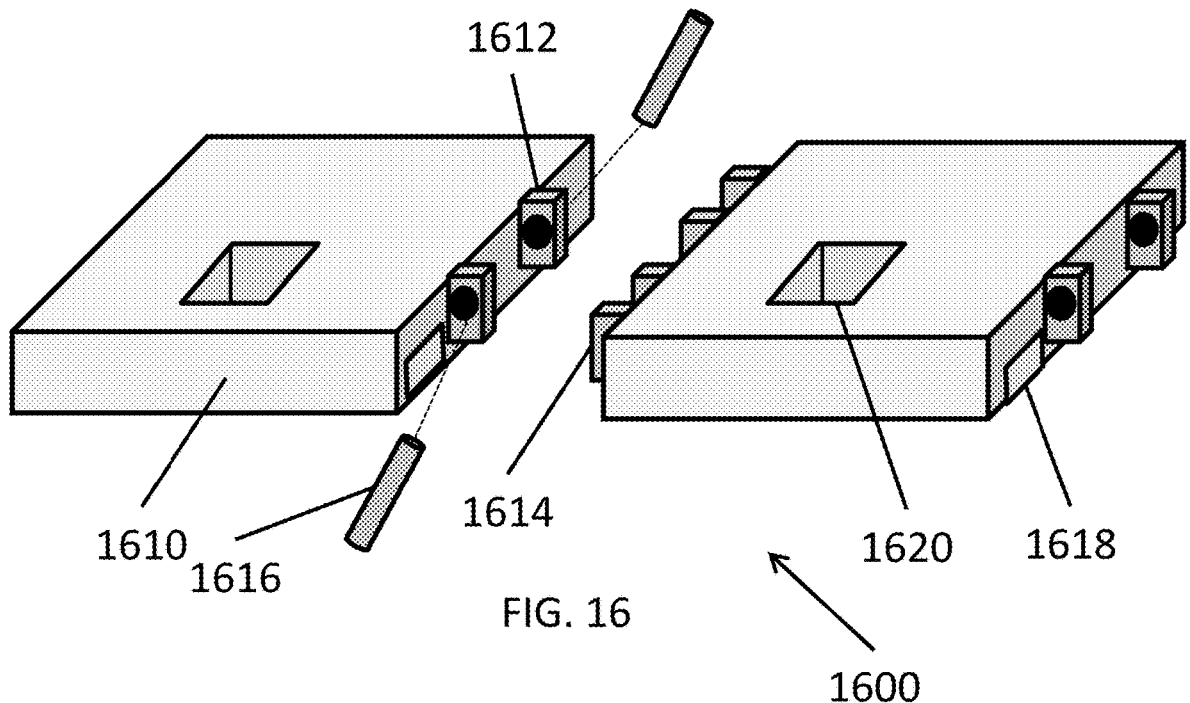
FIG. 16 is a perspective view of a modular pad of a fuel cell system, according to various embodiments of the present disclosure.

FIG. 16 is a perspective view of a pad 1600 for a fuel cell system, according to various embodiments of the present disclosure. Referring to FIG. 16, the pad 1600 includes pad sections 1610 that are connected together. In particular, the pad sections 1610 include first and second brackets 1612, 1614, which mate with one another and are locked together with pins 1616 inserted there through. The pad sections 1610 may include recesses or cut-outs 1618 that may provide space for plumbing and/or wiring. The plumbing and/or wiring may be fed through the pad sections 1610 to holes 1620 formed therein. The configuration of the pad 1600 may allow for the pad 1600 to have various shape and/or sizes. In some embodiments, the pad sections 1600 may be disposed on a relatively thin concrete pad.

Figure 17:
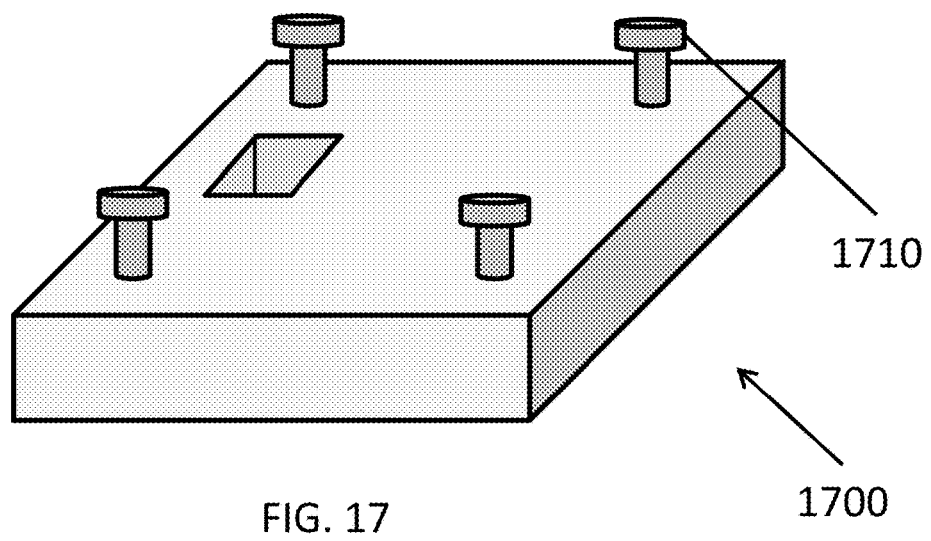
FIG. 17 is a perspective view of a pad section of a fuel cell system, according to various embodiments of the present disclosure.

FIG. 17 illustrates a pad section 1700 of a fuel cell system, according to various embodiments. Referring to FIG. 17, the pad section 1700 includes tie downs 1710 extending from an upper surface thereof. The tie downs 1710 may be formed of forged or toughened metal, and may be inserted into the pad during or after fabrication. The tie downs 1710 may be mushroom shaped, and may allow for the blind installation of a module on the pad section 1700. As such, the tie downs 1710 allow for a module to be more easily attached to the pad section 1700, since the tie downs 1710 are self-guiding.

Figure 18A:
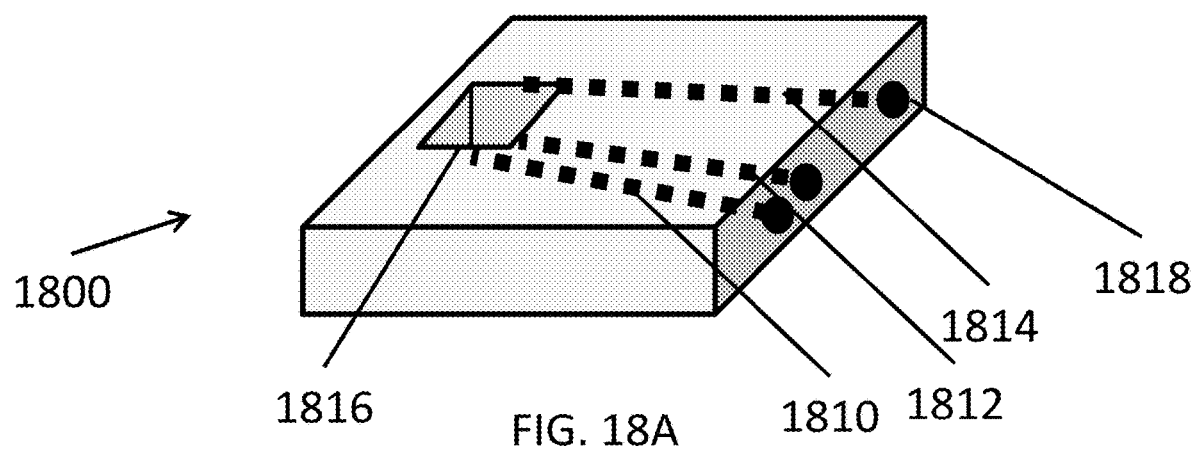
FIG. 18A is a perspective view of a support frame of a fuel cell system.

FIG. 18A illustrates a support frame 1800 of a fuel cell system, according to various embodiments. The support frame may include water plumbing 1810, fuel plumbing 1812, and electrical wiring 1814, which may extend between a hole 1816 in the support frame 1800 and quick connects 1818.

Figure 18B:
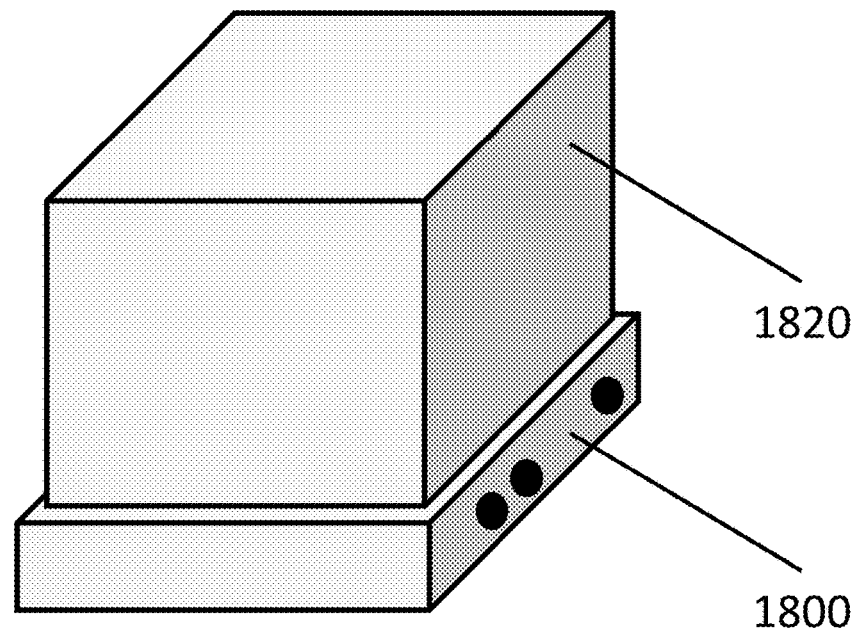
FIG. 18B illustrates a module on the support frame of FIG. 18A.

The support frame 1800 may be attached and prewired to a module 1820 of a fuel cell system as shown in FIG. 18B at a manufacturing site and then shipped to a site for assembly where the fuel cell system will generate power. The pre-attached frame 1800 may be similar to the frame 1014 shown in FIG. 13A. Accordingly, assembly of a fuel cell system may be simplified.

Figures 1, 19A:
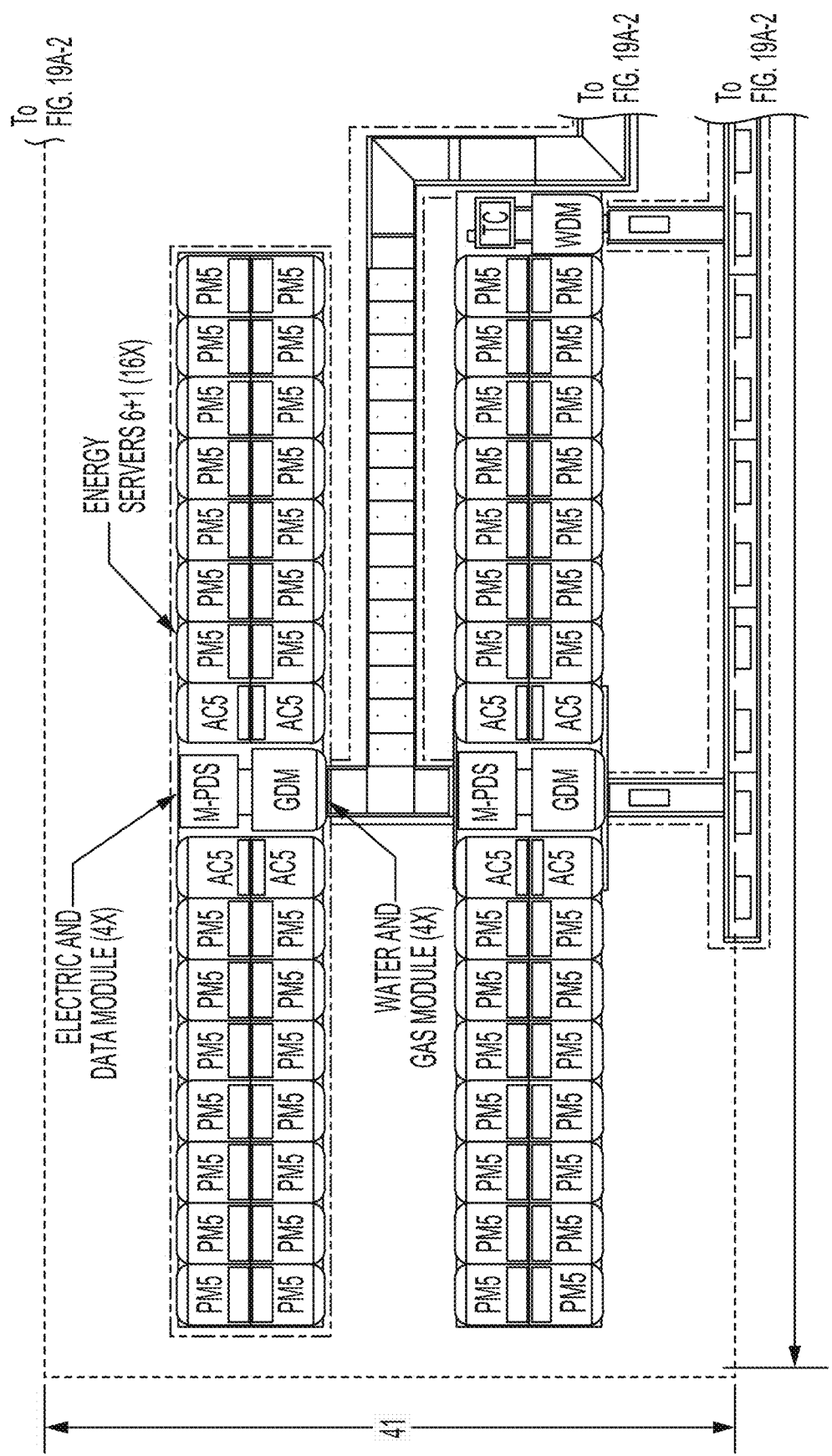
FIGS. 19A and 19B illustrate a top view of a large site fuel cell system with pre-cast concrete trenches before and after they are filled with the plumbing and the wiring, respectively, according to embodiments of the present disclosure.
Figures 2, 19A:
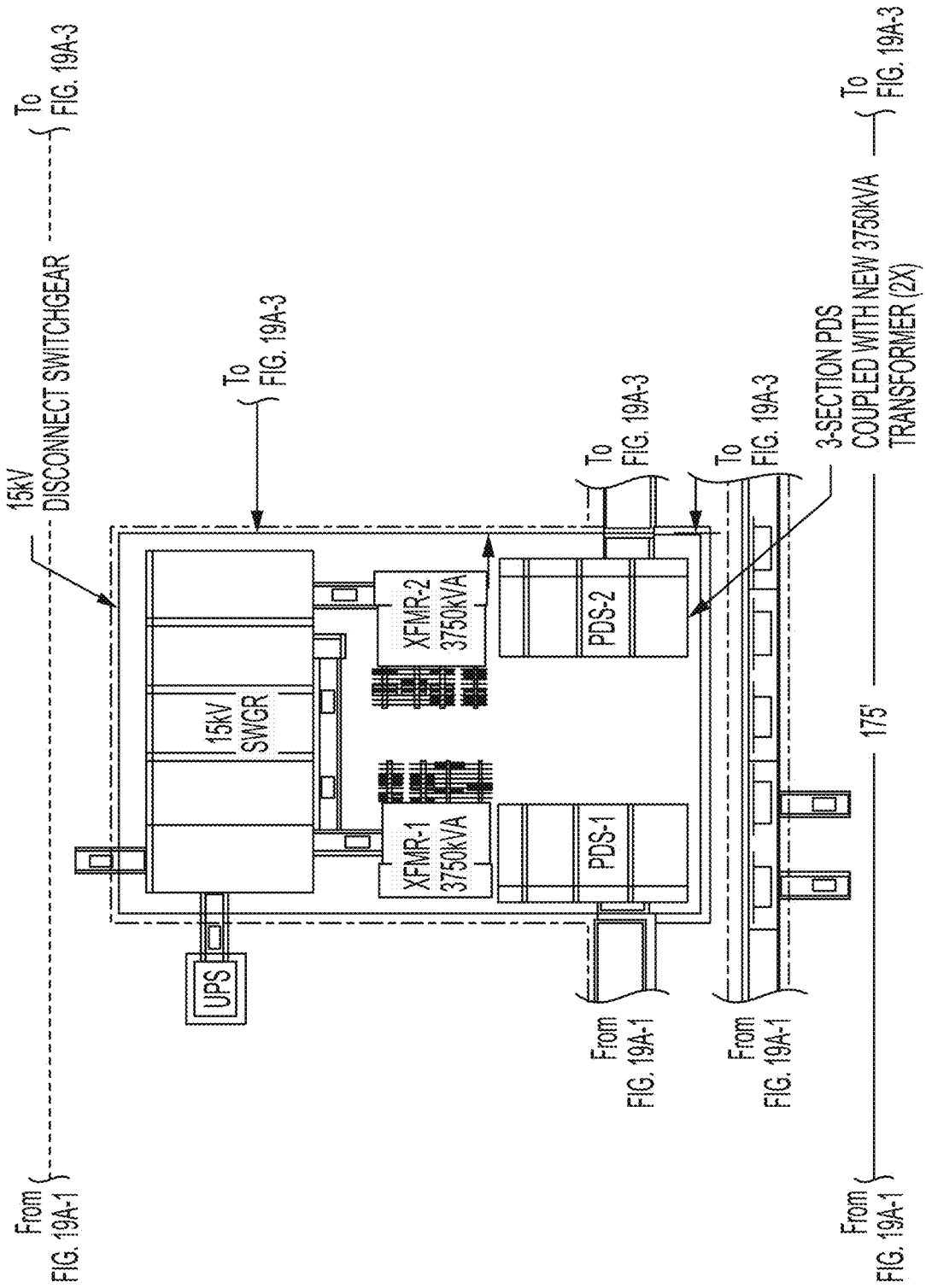
Figures 1, 19B:
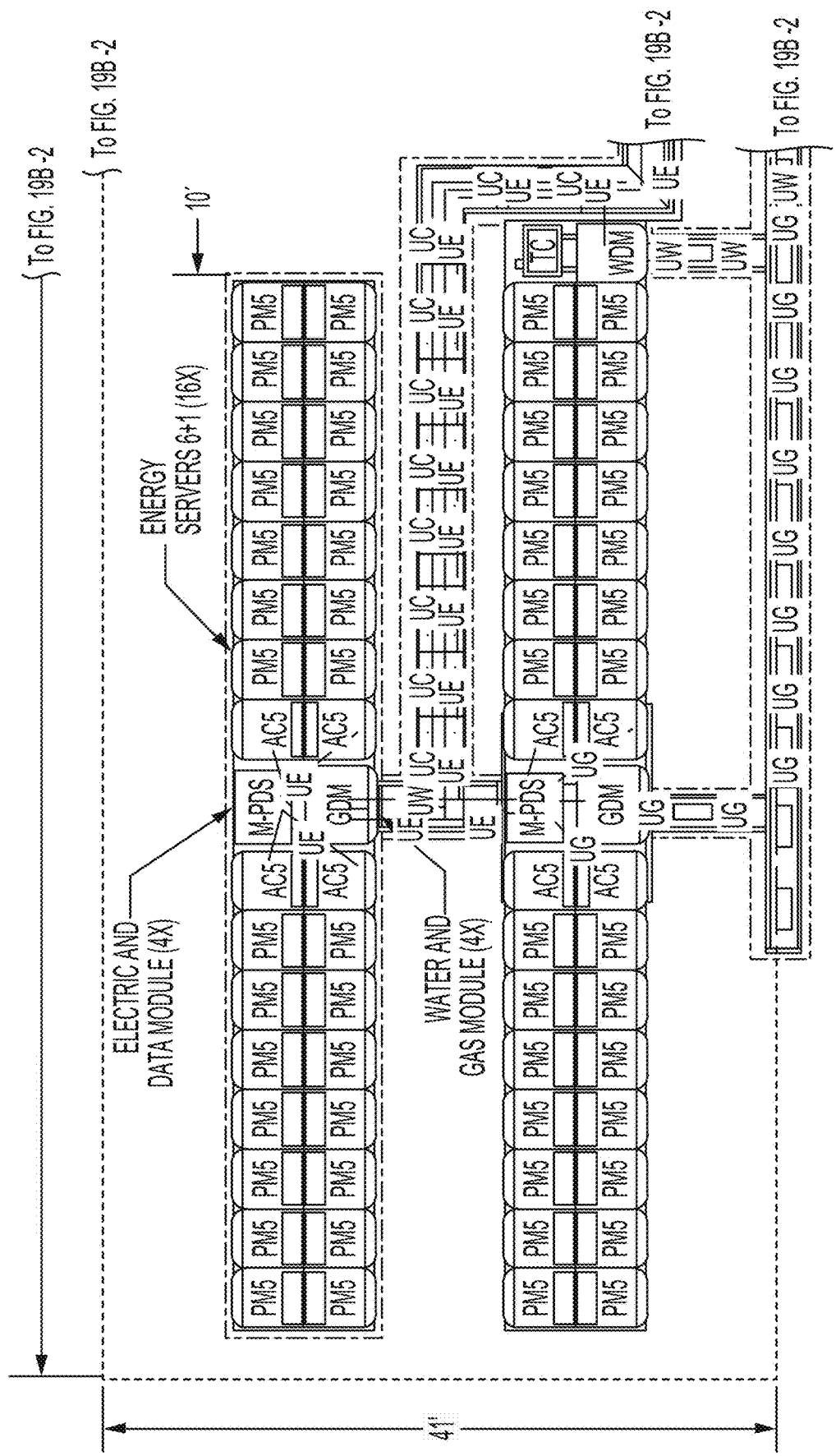
Figures 2, 19B:
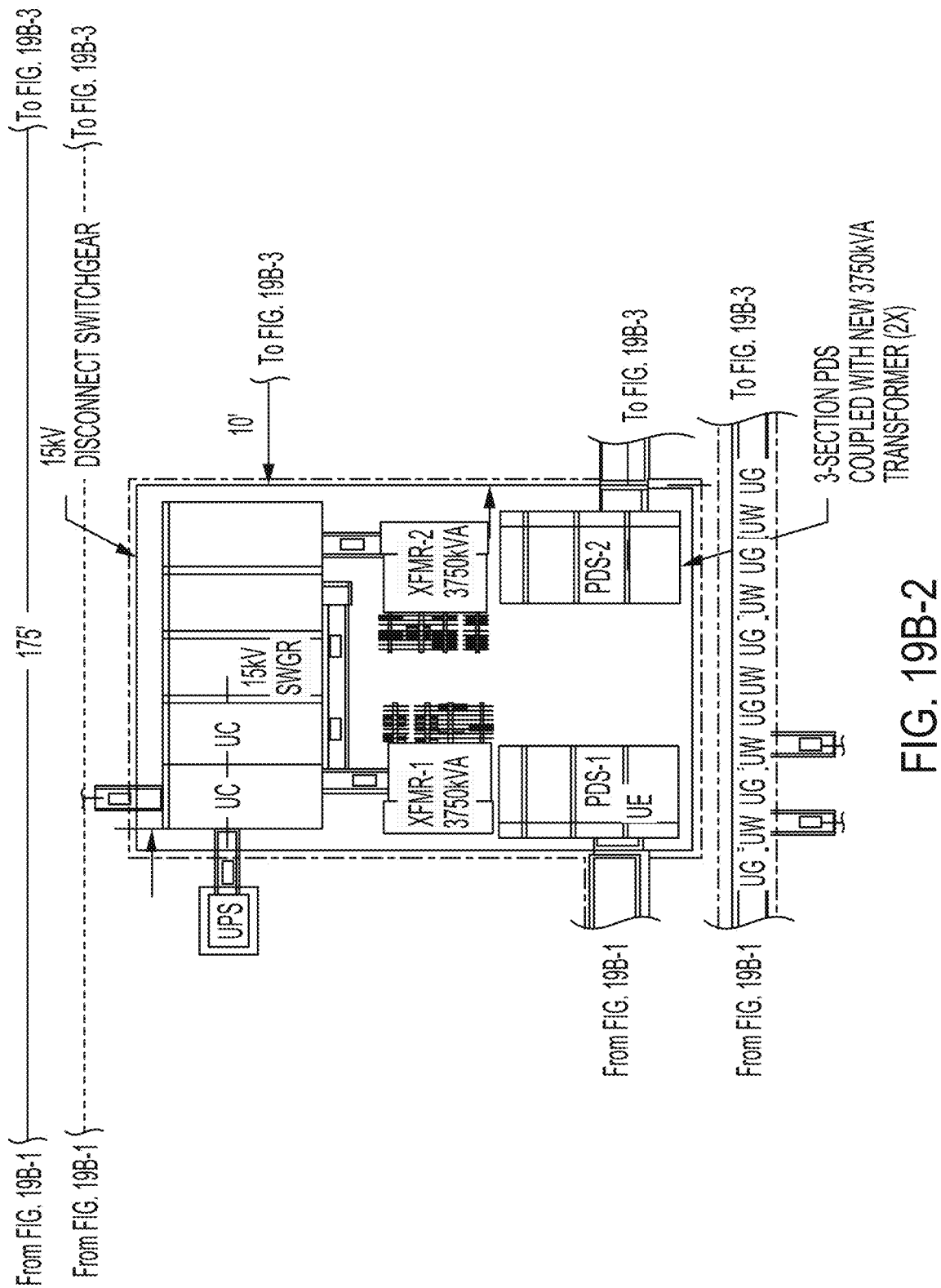
Figures 3, 19B:
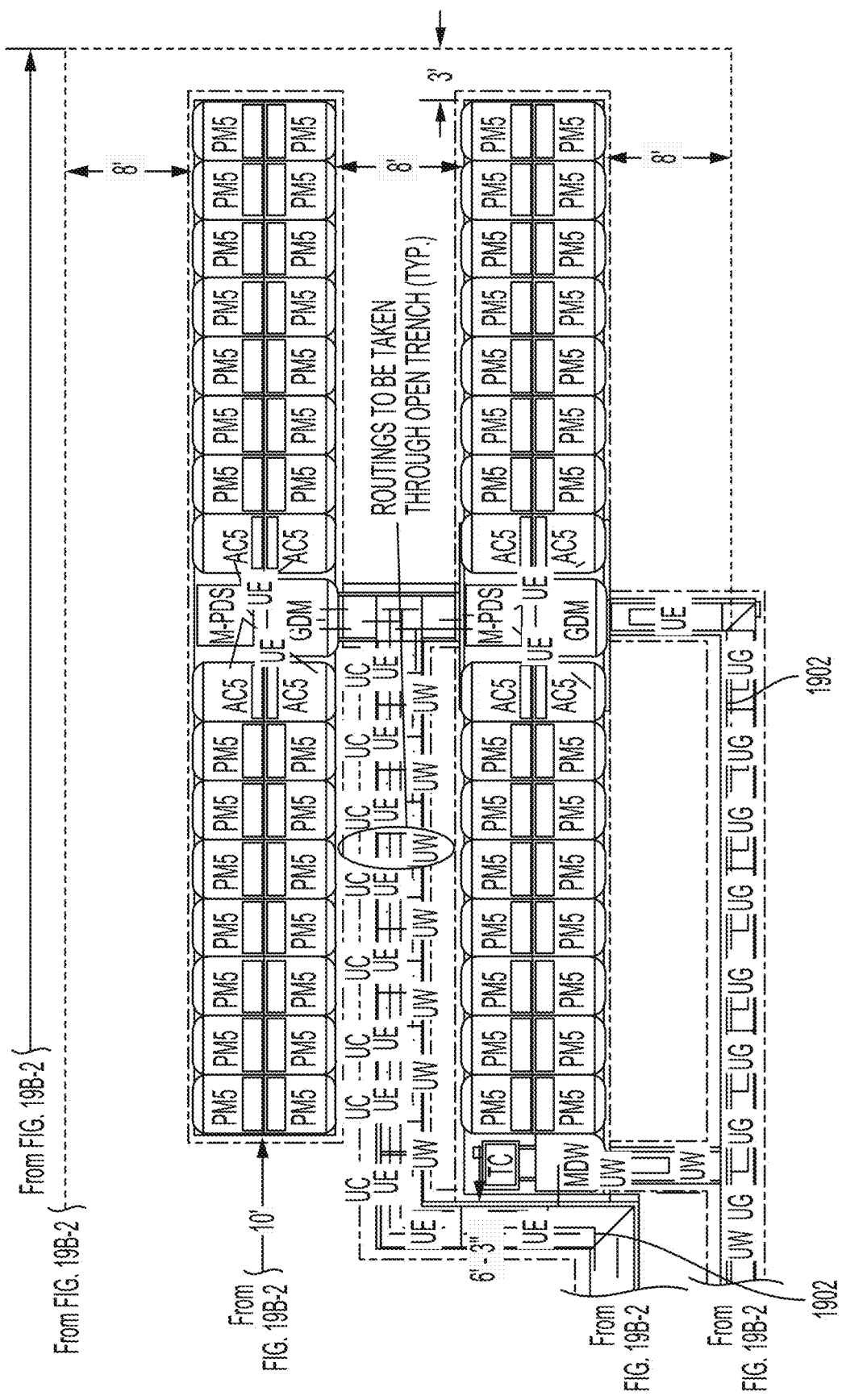
Figure 19C:
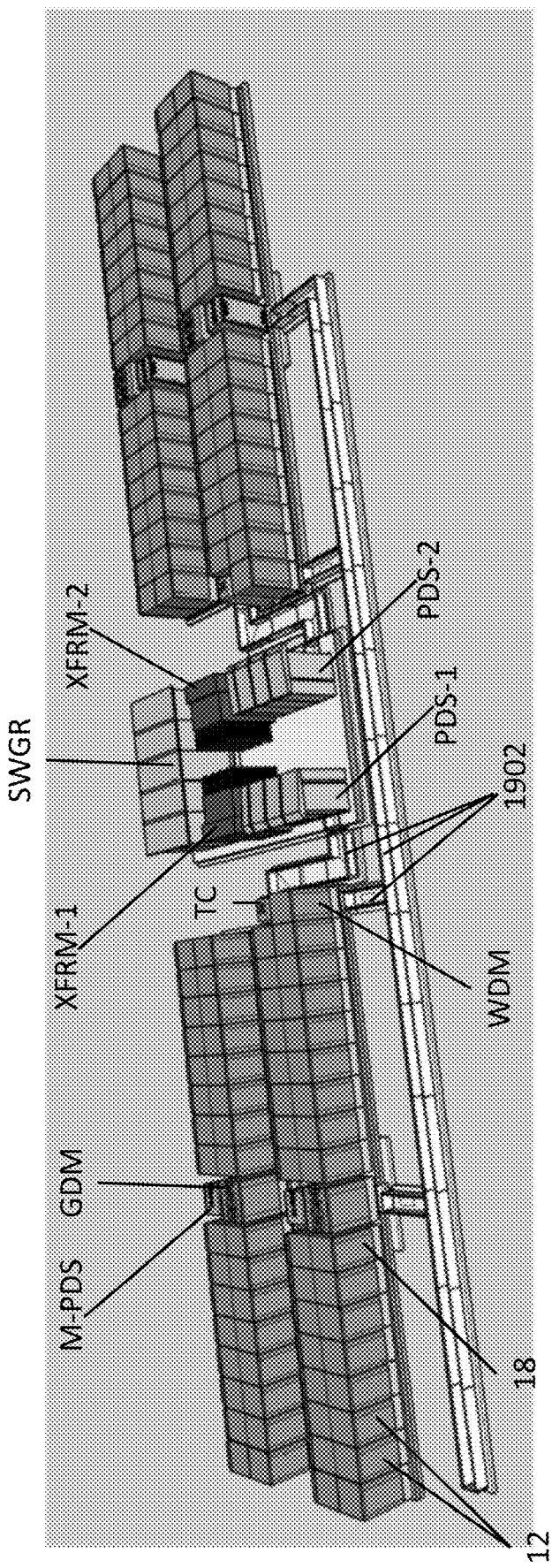
FIGS. 19C and 19D are perspective views of the large site fuel cell system of FIG. 19A.
Figure 19D:
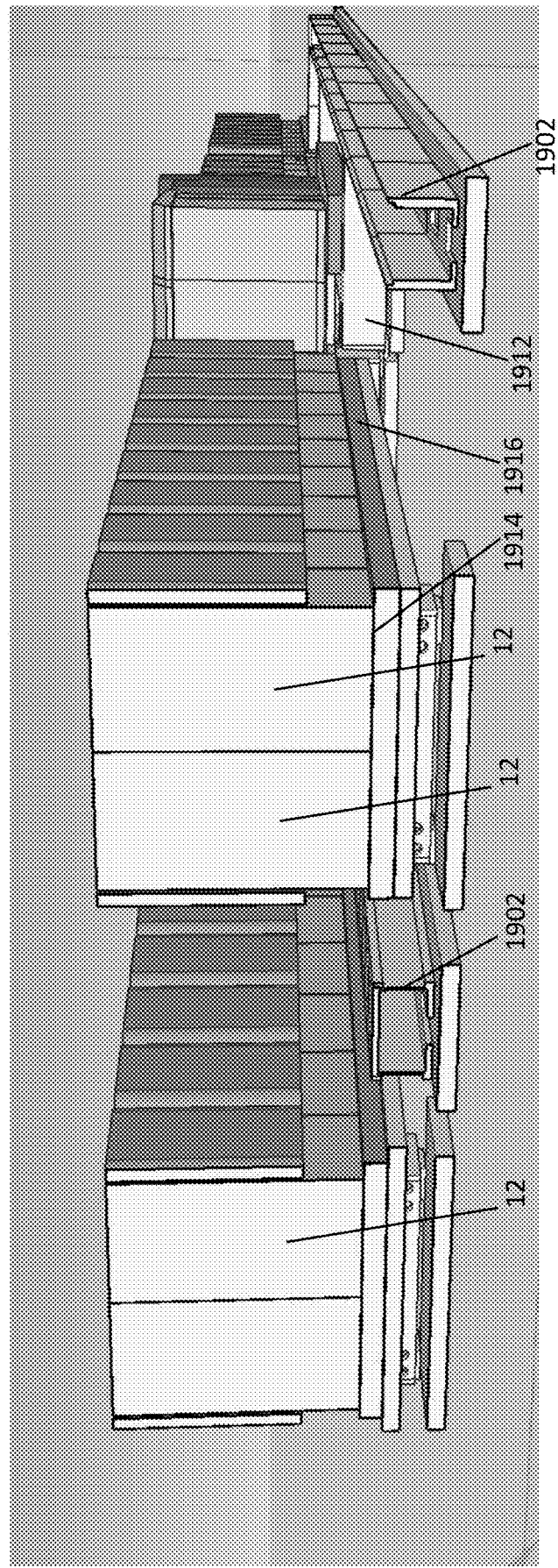
Figure 19E:
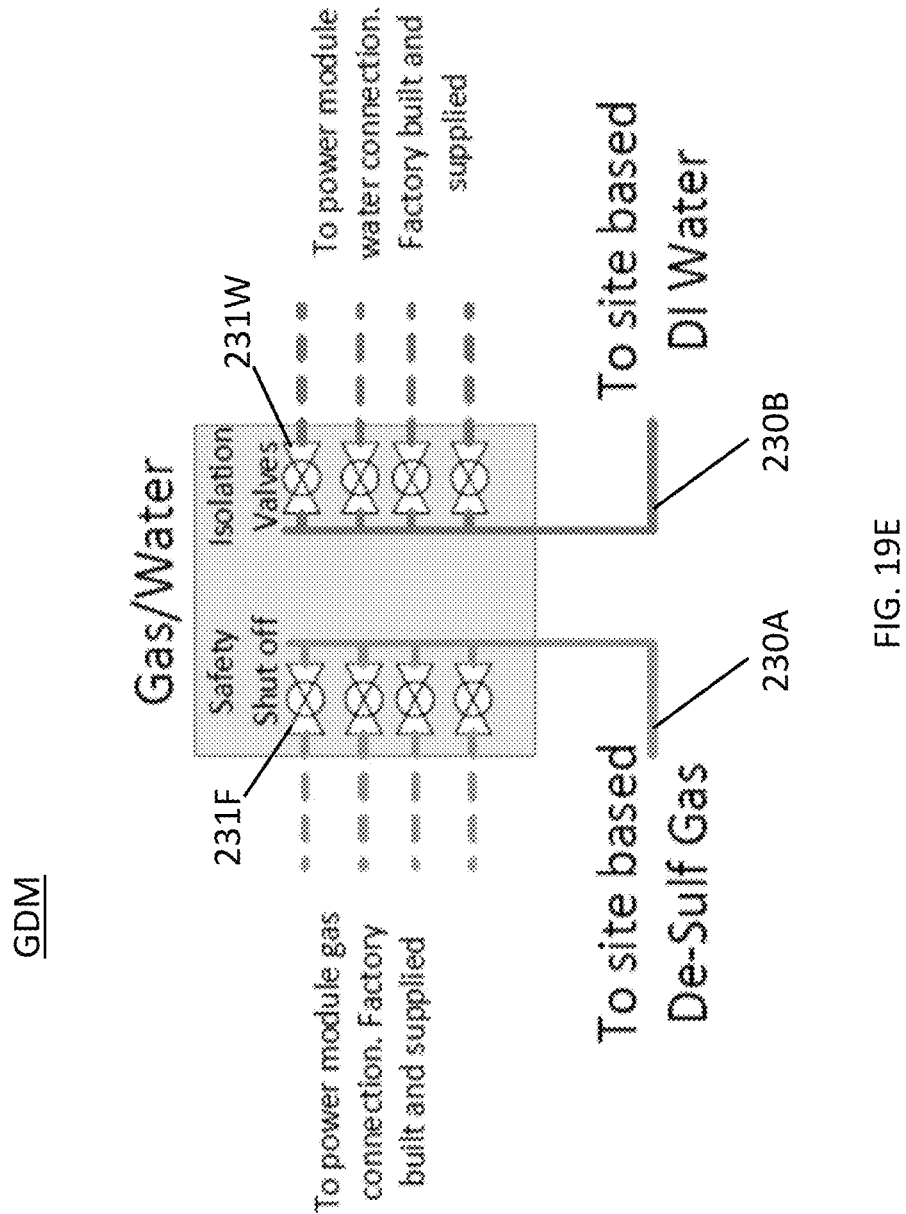
FIG. 19E is a schematic side view of components of a gas and water distribution module of FIG. 19C.

FIGS. 19A and 19B illustrate a top view of a large site fuel cell system of another embodiment with pre-cast concrete trenches before and after the trenches are filled with the plumbing and the wiring, respectively. FIGS. 19C and 19D are perspective views of the large site fuel cell system of FIGS. 19A-19B. FIG. FIG. 19E is a schematic side view of components of a gas and water distribution module of FIG. 19C. 19F is a side cross-sectional view of a pad for a module of the large site fuel cell system of FIG. 19D. FIG. 19G is a functional schematic of the system. All modules described below may be located in a separate housing from the other modules. The system reduces the number of components, and simplifies component installation, thus reducing the total system cost.

The large site fuel cell system contains multiple rows of the above described power modules 12 (labeled PM5). A single gas and water distribution module (GDM) is fluidly connected to multiple rows of power modules. For example, at least two rows of at least six power modules each, such as four rows of seven power modules each, are fluidly connected to the single gas and water distribution module. As shown in FIG. 19E, the single gas and water distribution module GDM may include connections between the above described water and fuel plumbing 230 and the power modules. The connections may include conduits (e.g., pipes) and valves 231F and 231W which route the respective fuel and water from the central plumbing 230 into each power modules. The fuel and water plumbing 230 may include the above described fuel pipes 230A labeled "UG" and the above described water pipes 230B labeled "UW". The gas and water plumbing 230 may be connected to utility gas and water pipes, respectively. A single system level fuel processing module 16 which includes components for pre-processing of fuel, such as adsorption beds (e.g., desulfurizer and/or other impurity adsorption) beds, may be connected to all gas pipes 230A. Thus, a single desulfurizer may be used to desulfurize natural gas fuel provided to all GDMs in the fuel cell system.

Optionally one or more water distribution modules (WDM) may be provided in the system. The WDM may include water treatment components (e.g., water deionizers) and water distribution pipes and valves which are connected to the municipal water supply pipe, and to the individual modules in the system.

Each row of power modules 12 is electrically connected to a single above described power conditioning module 18 (labeled AC5) which may include a DC to AC inverter and other electrical components. A single mini power distribution module (MPDS) is electrically to each of the power conditioning modules 18 using the above the described wires 232 labeled "UE". For example, at least two rows of at least six power modules 12 each, such as four rows of seven power modules each, are electrically connected to a single MPDS through the respective power conditioning modules 18, such as four power conditioning modules 18. The MPDS may include circuit breakers and electrical connections between the plural power conditioning modules 18 and one of the system power distribution modules PDS-1 or PDS-2.

One or more telemetry modules (TC) may also be included in the system. The telemetry modules may include system controllers and communication equipment which allows the system to communicate with the central controller and system operators. Thus, four inverters in power conditioning modules 18 and telemetry cables may be connected to the single MPDS. The system also includes the system power distribution unit (i.e., central power supply unit) that feeds the safety systems within the GDMs and also feeds a telemetry ethernet switch (4:1). This reduces the number of power conduits and telemetry conduits installed by an onsite contractor from 4 into 1. Alternatively, a single connection may be used telemetry data transfer. The single cat 5 cable may be replaced with a wireless transceiver unit for data communications between the power conditioning module 18 and the telemetry module TC. This eliminates the data cable installation.

A set of plural rows of the power modules and their respective power conditioning modules fluidly and electrically connected to the same GDM and the same MPDS, respectively, may be referred to as a subsystem. The fuel cell system may include plural subsystems, such as two to ten subsystems. Four subsystems are shown in FIGS. 19A-19B.

The fuel cell system may also include a system power distribution unit which is electrically connected to all subsystems of the fuel cell system using the wires 232 (i.e., "UE"). The system power distribution unit may include at least one system power distribution module, such as two modules PDS-1 and PDS-2, at least one transformer, such as two transformers (XFMR-1 and XFMR-2) and a disconnect switch gear (SWGR). The transformers XFMR-1 and XFMR-2 may be electrically connected to the respective PDS-1 and PDS-2 modules using the wires 232. The switch gear may comprise 15 kV switch gear which has inputs electrically connected to the transformers via the wires 232, and an output electrically connected to an electrical load and/or grid. An optional uninterruptible power subsystem (UPS) may also be included. Thus, electric power is provided from the power modules through the respective MPDS, PDS-1 or PDS-1, XFMR-1 or XFMR-2 and SWGR to the grid and/or load.

Figure 19F:
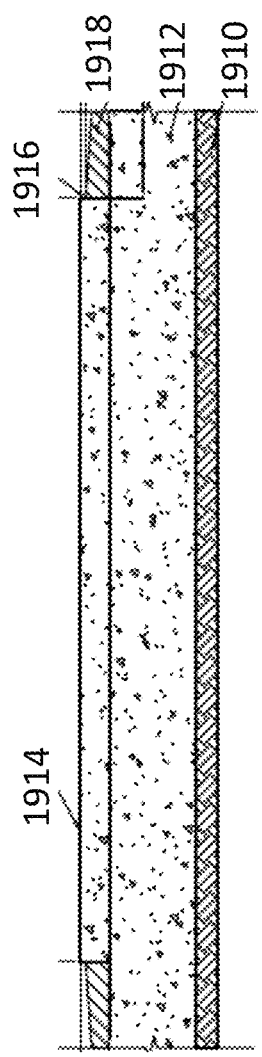
FIG. 19F is a side cross-sectional view of a pad for a module of the large site fuel cell system of FIG. 19D.
Figure 19G:
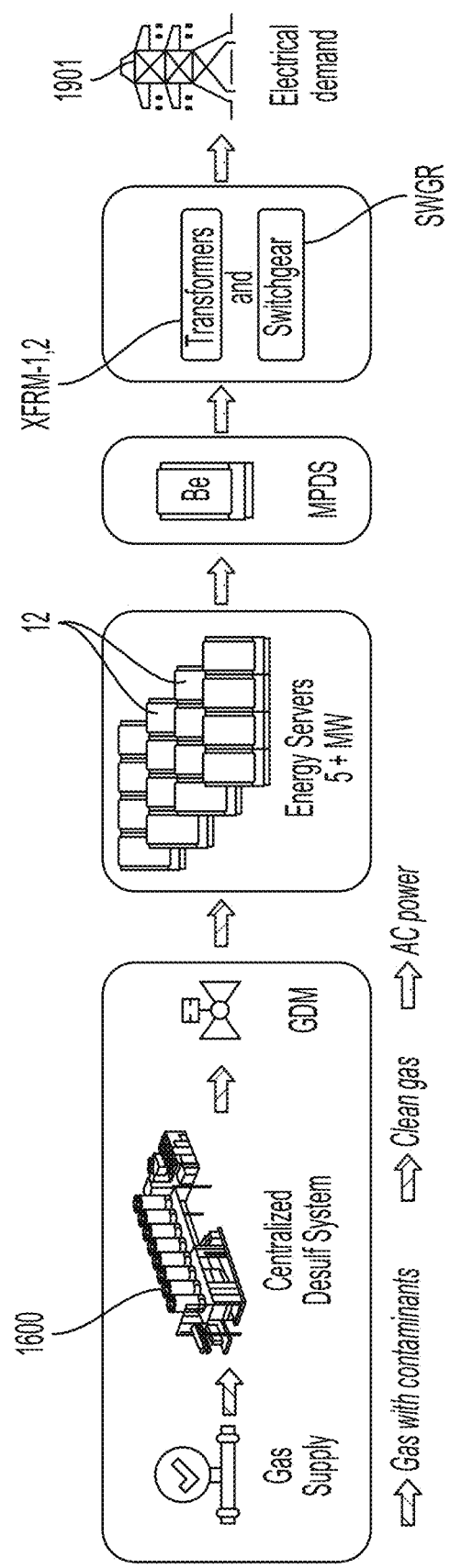
FIG. 19G is a functional schematic of the system of FIG. 19A.
Figure 19H:
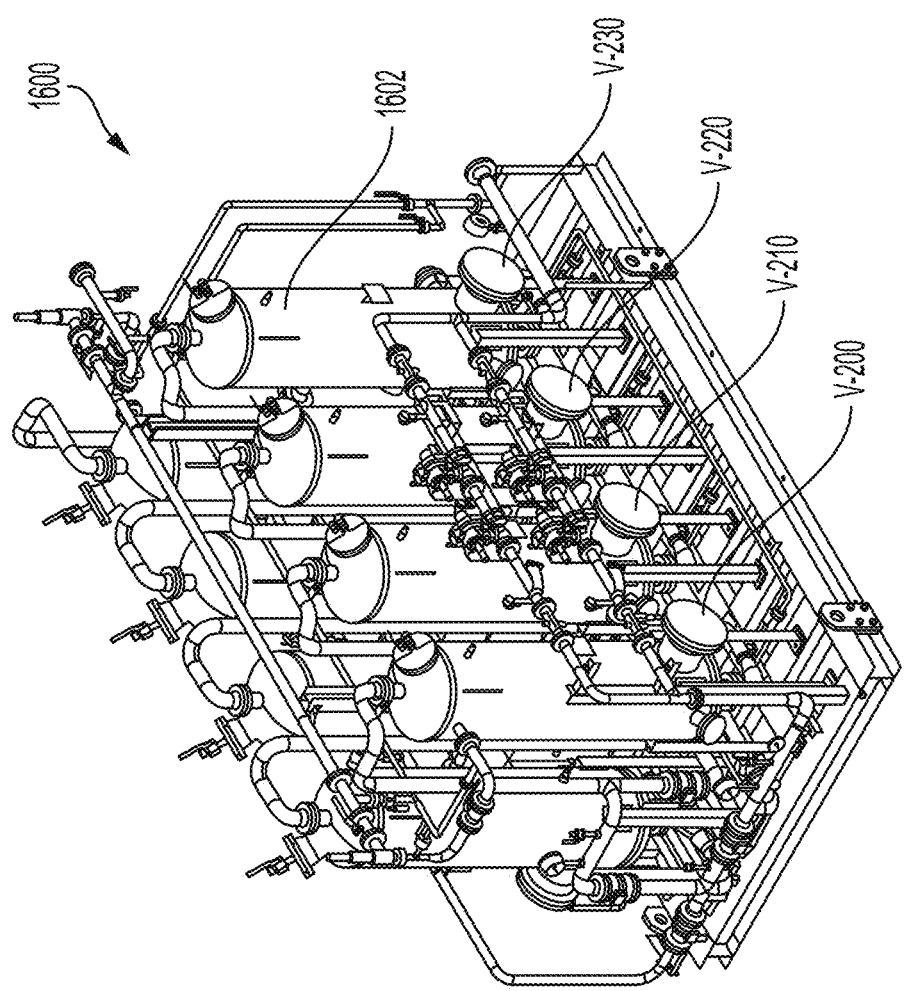
FIGS. 19H and 19I are perspective views of components of the system of FIGS. 19A and 19G.
Figure 19I:
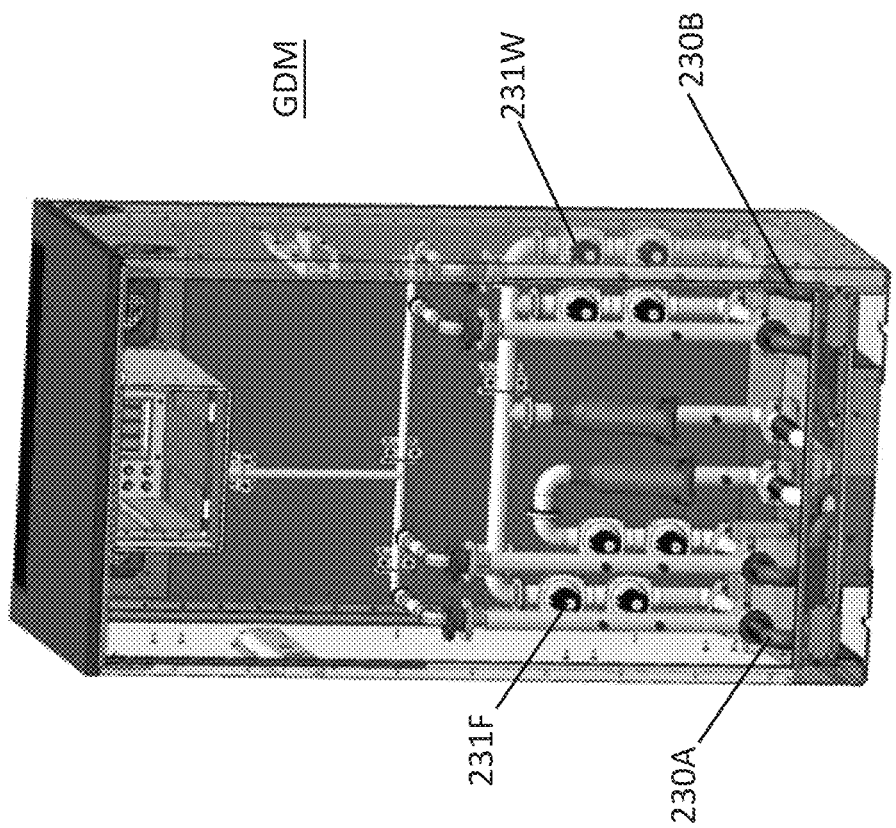
Figures 1, 19J:
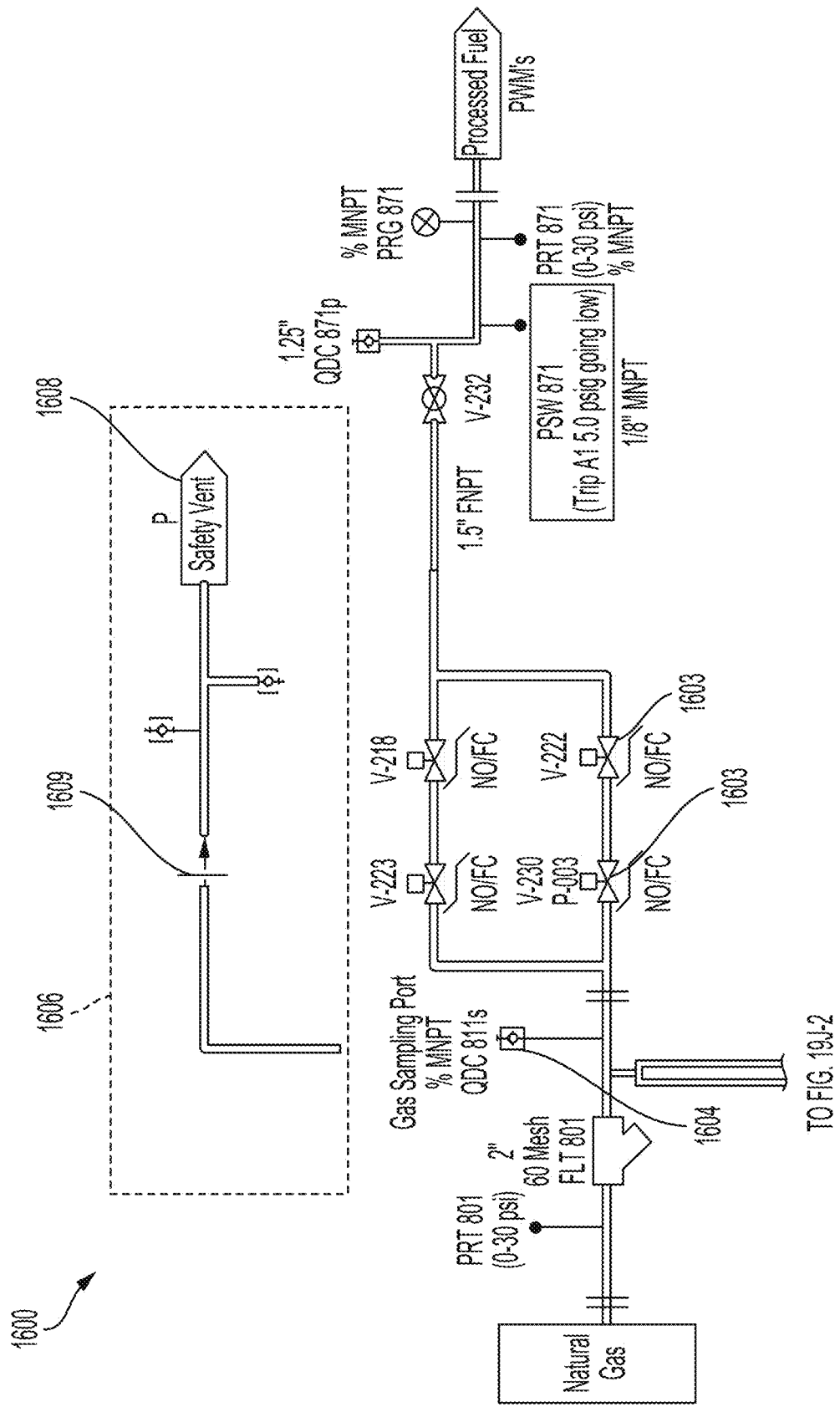
FIG. 19J is a diagram of a fuel processing module with a centralized desulfurizer.
Figures 2, 19J:
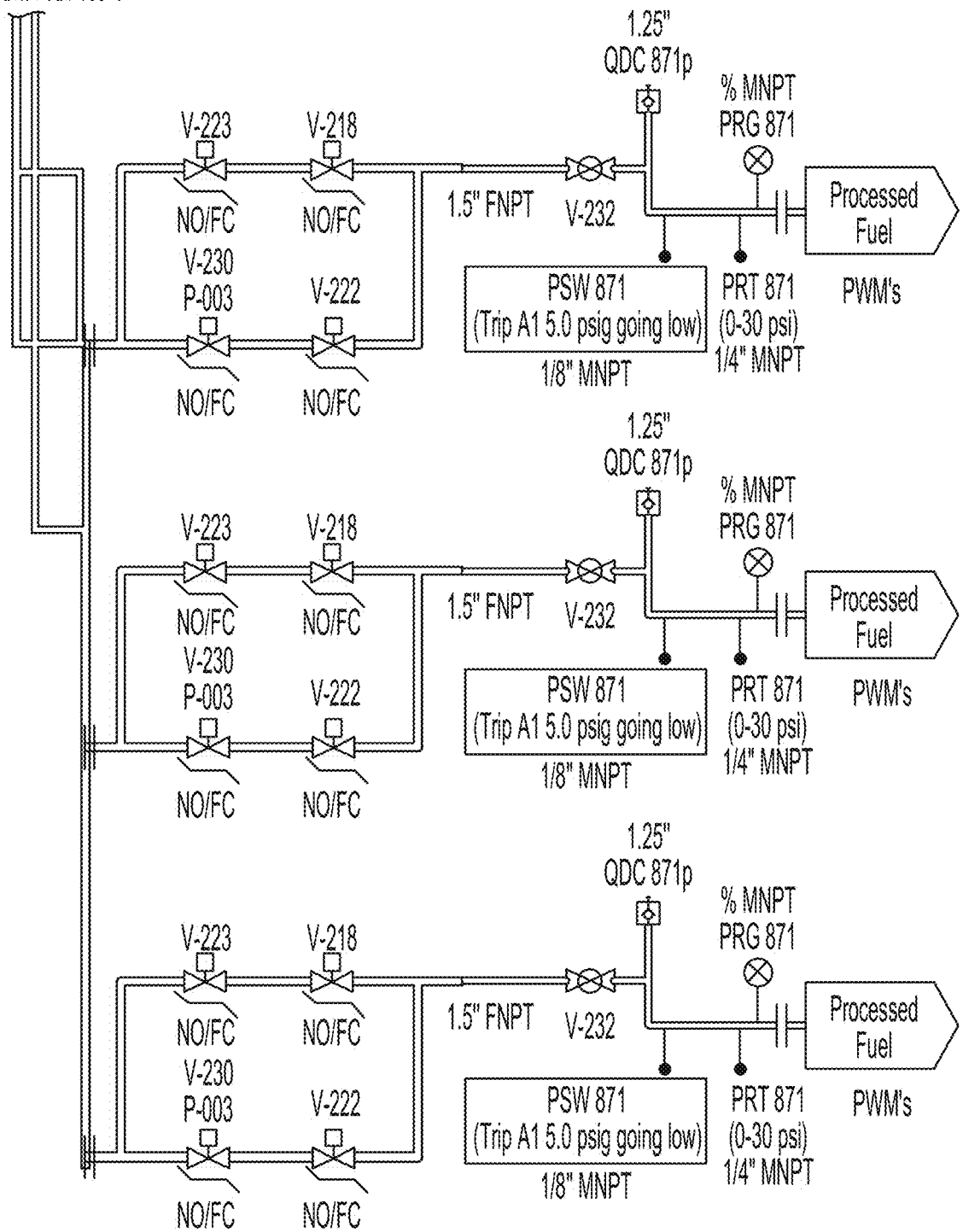
Figure 19K:
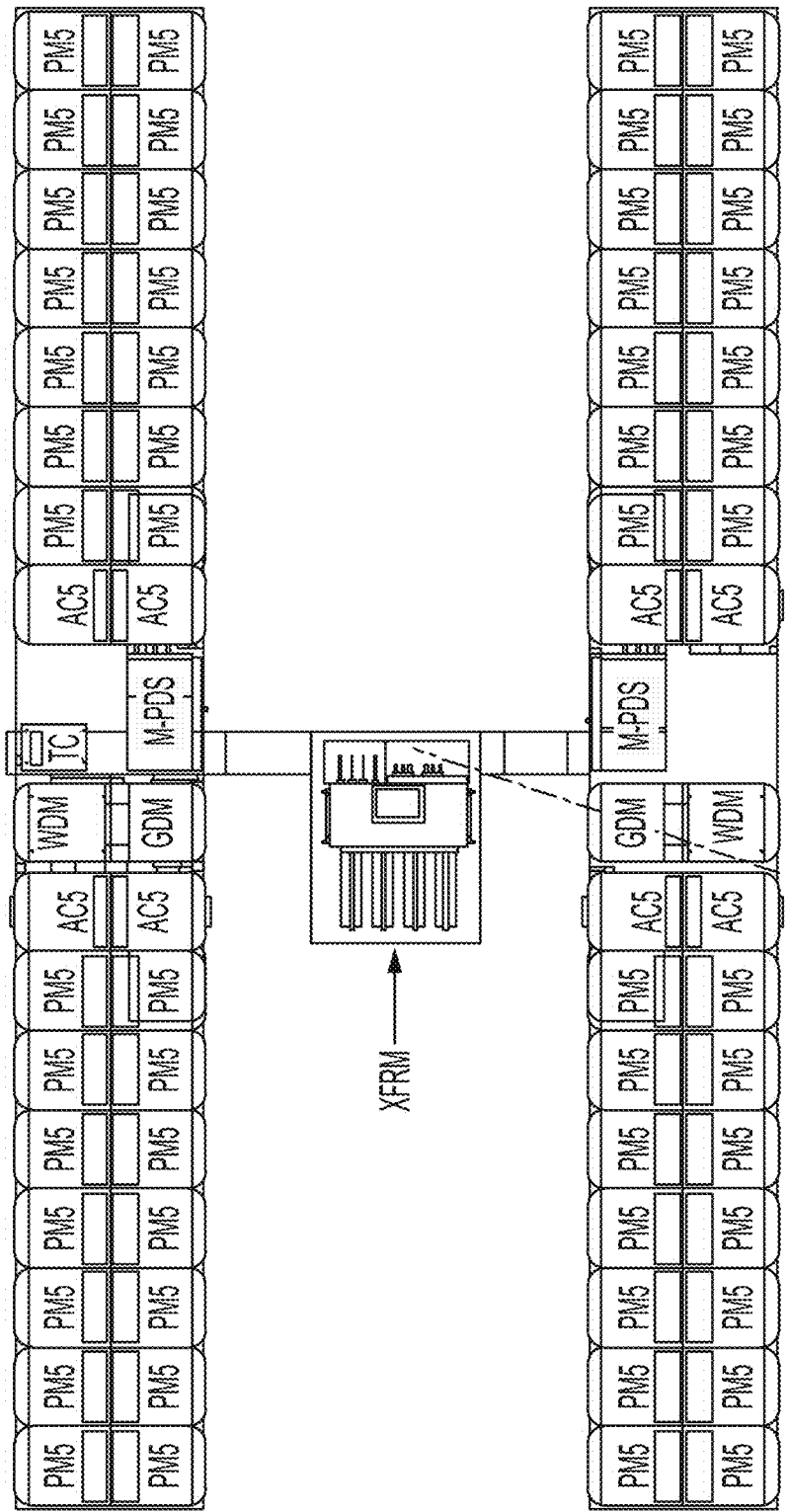
FIG. 19K illustrates a top view of a block of the large site fuel cell system of FIG. 19A.

FIG. 19K shows one block of a fuel cell system such as shown in FIG. 19A. One block includes eight 300 kW (6+1) power modules, eight power conditioning modules 18 (AC5), one TC, two WDMs, one 3000 kVA transformer, two GDMs and two MPDS.

Figures 1, 19L:
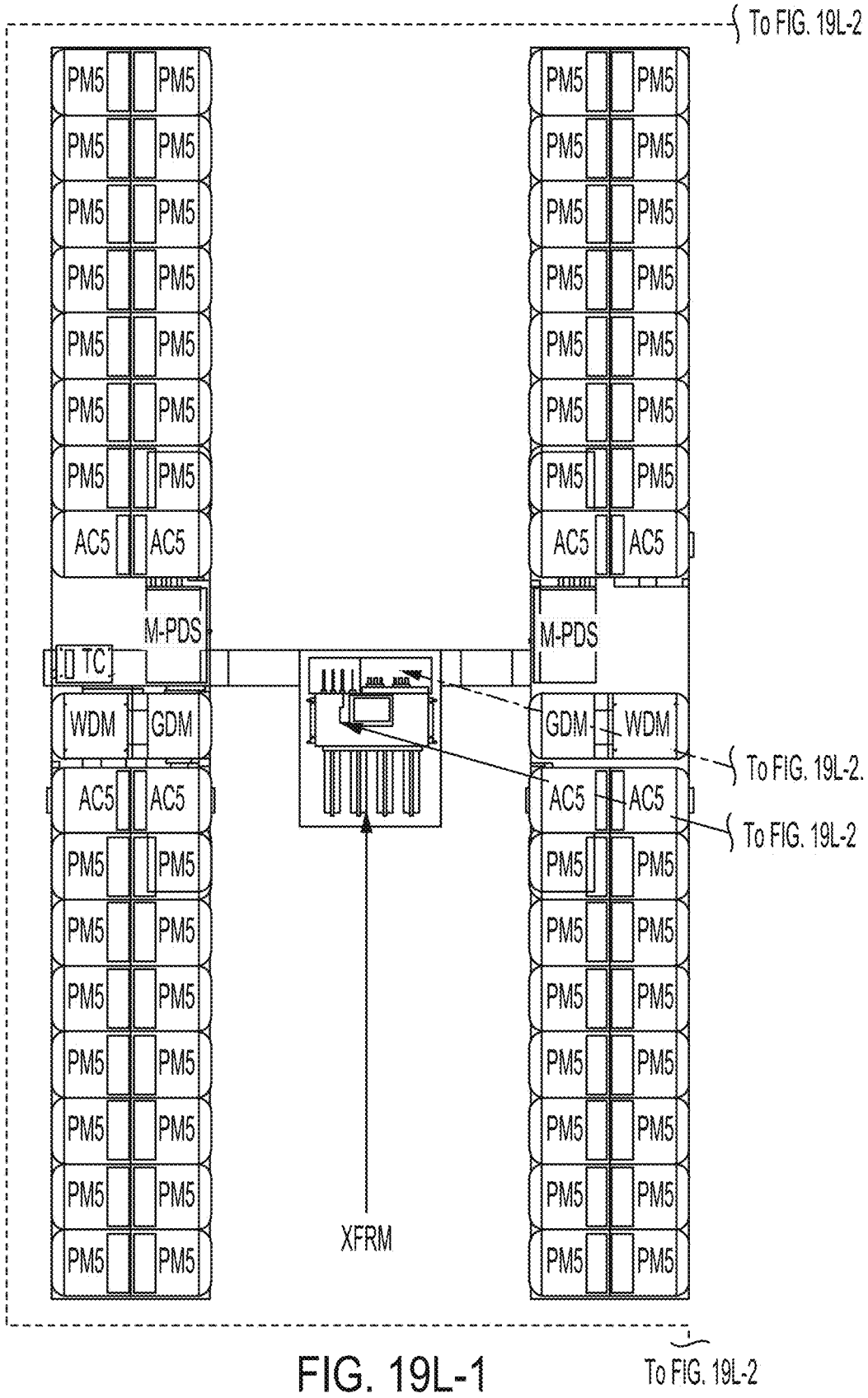
FIG. 19L illustrates a top view of a large site fuel cell system, according to an alternative embodiment of the present disclosure.
Figures 2, 19L:
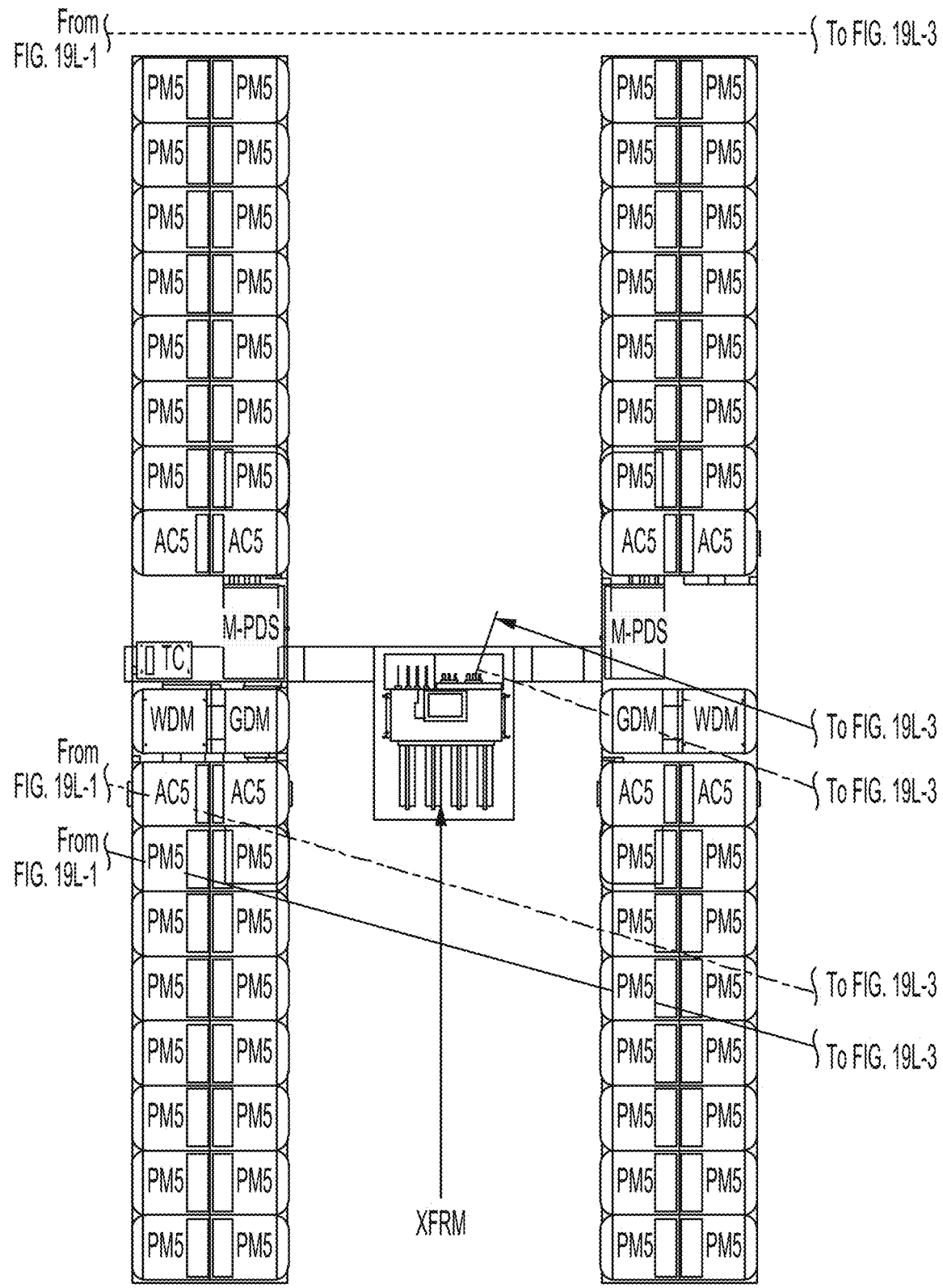
Figures 3, 19L:
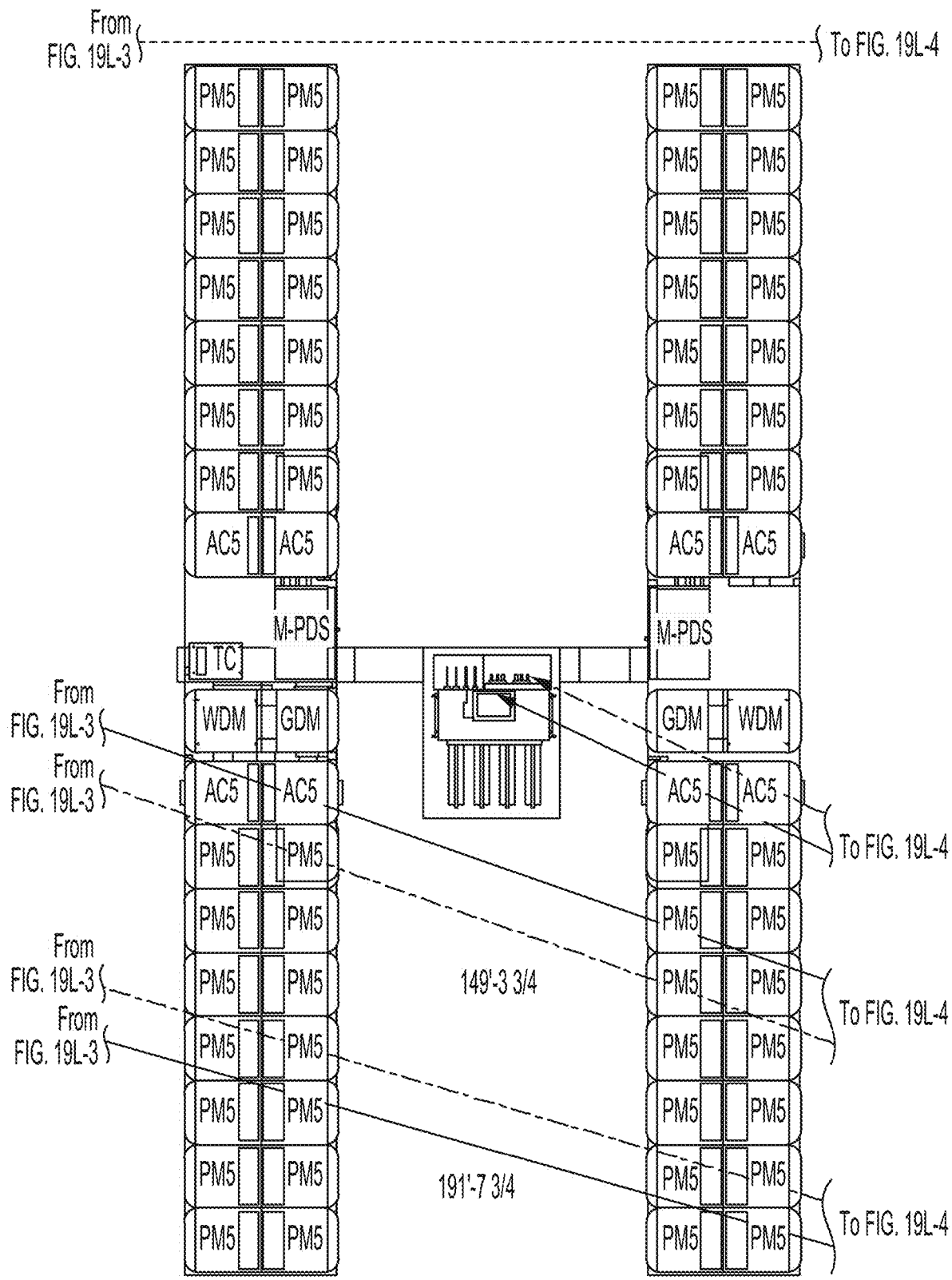
Figures 4, 19L:
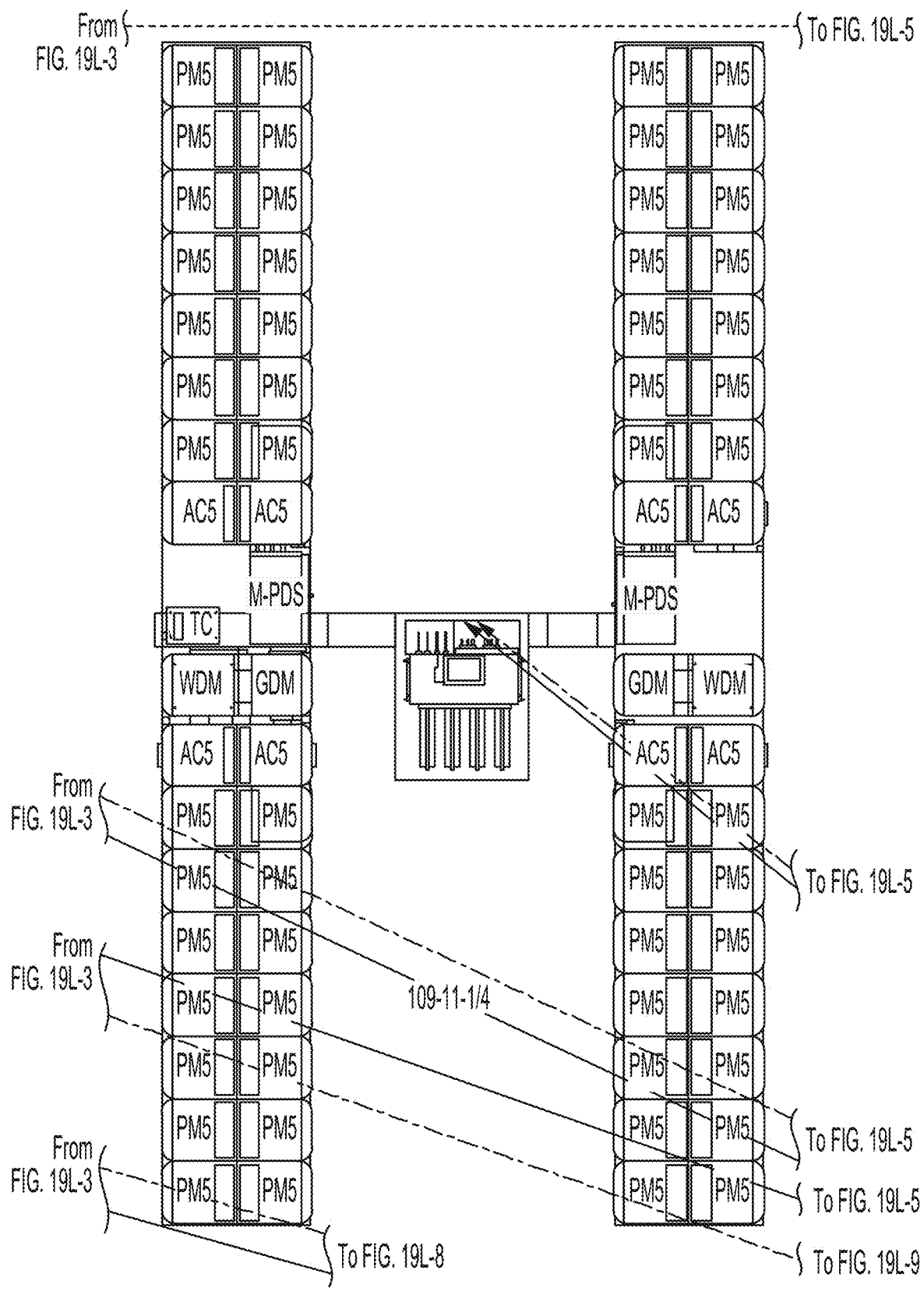
Figures 5, 19L:
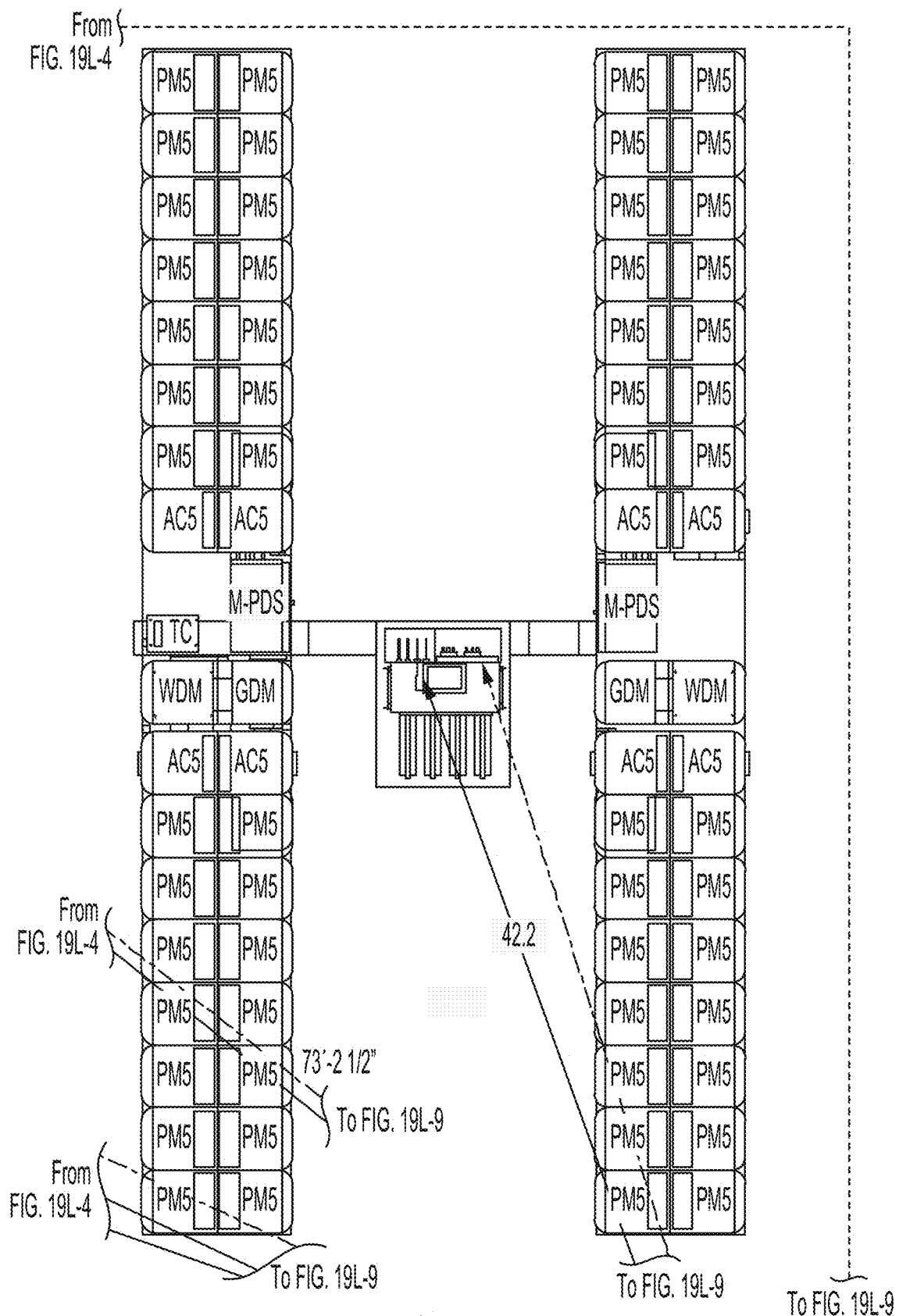
Figures 6, 19L:
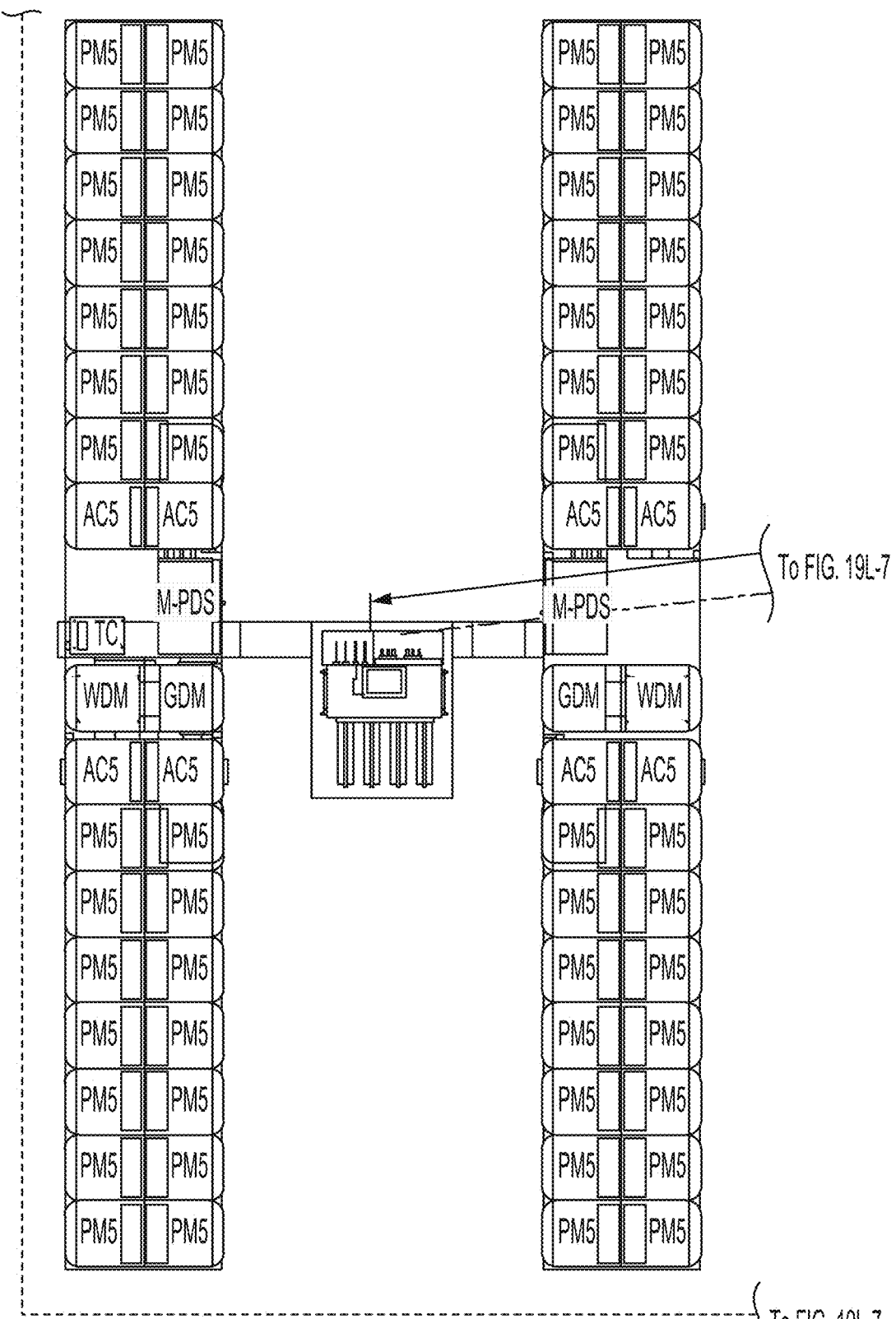
Figures 7, 19L:
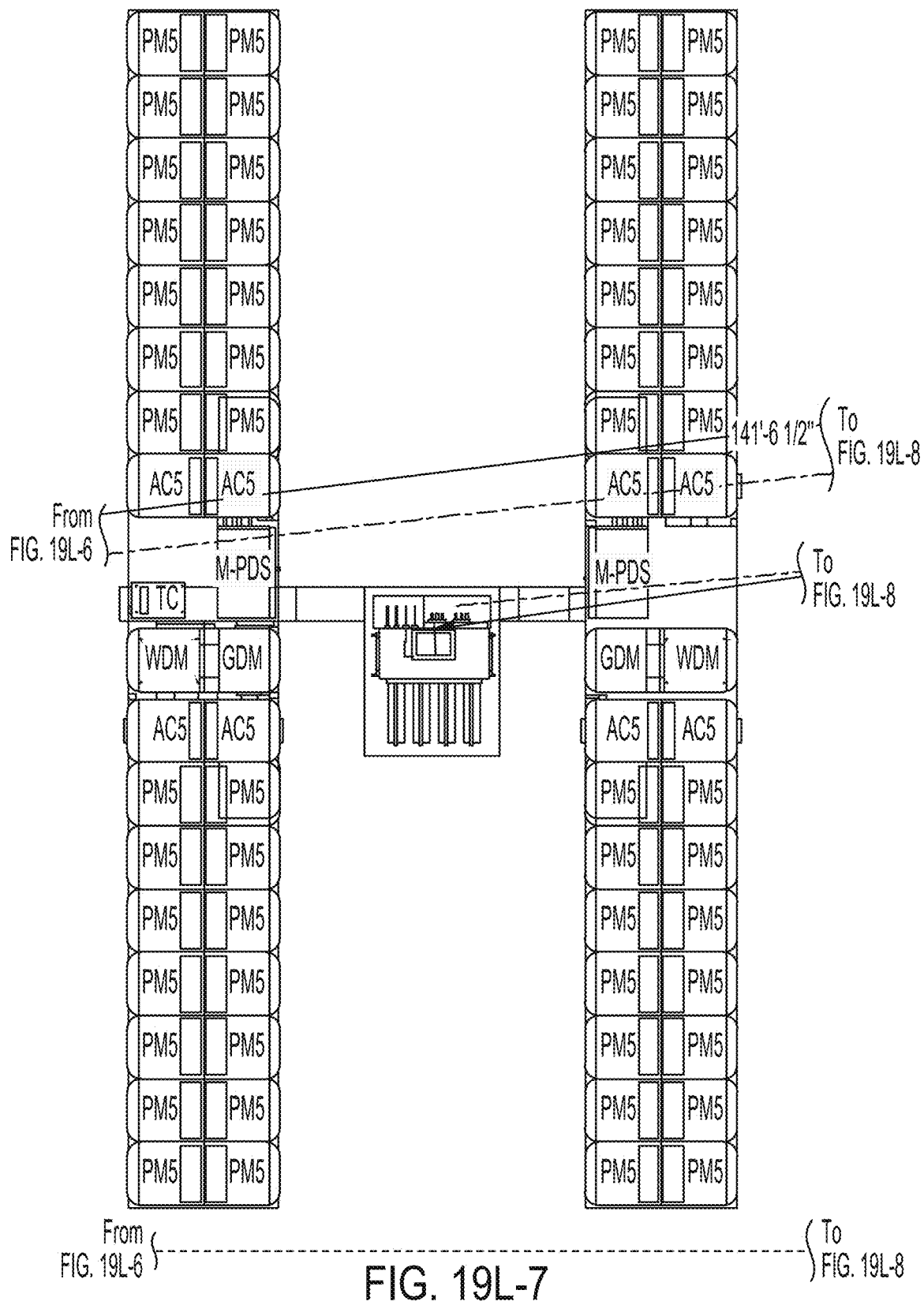
Figures 8, 19L:
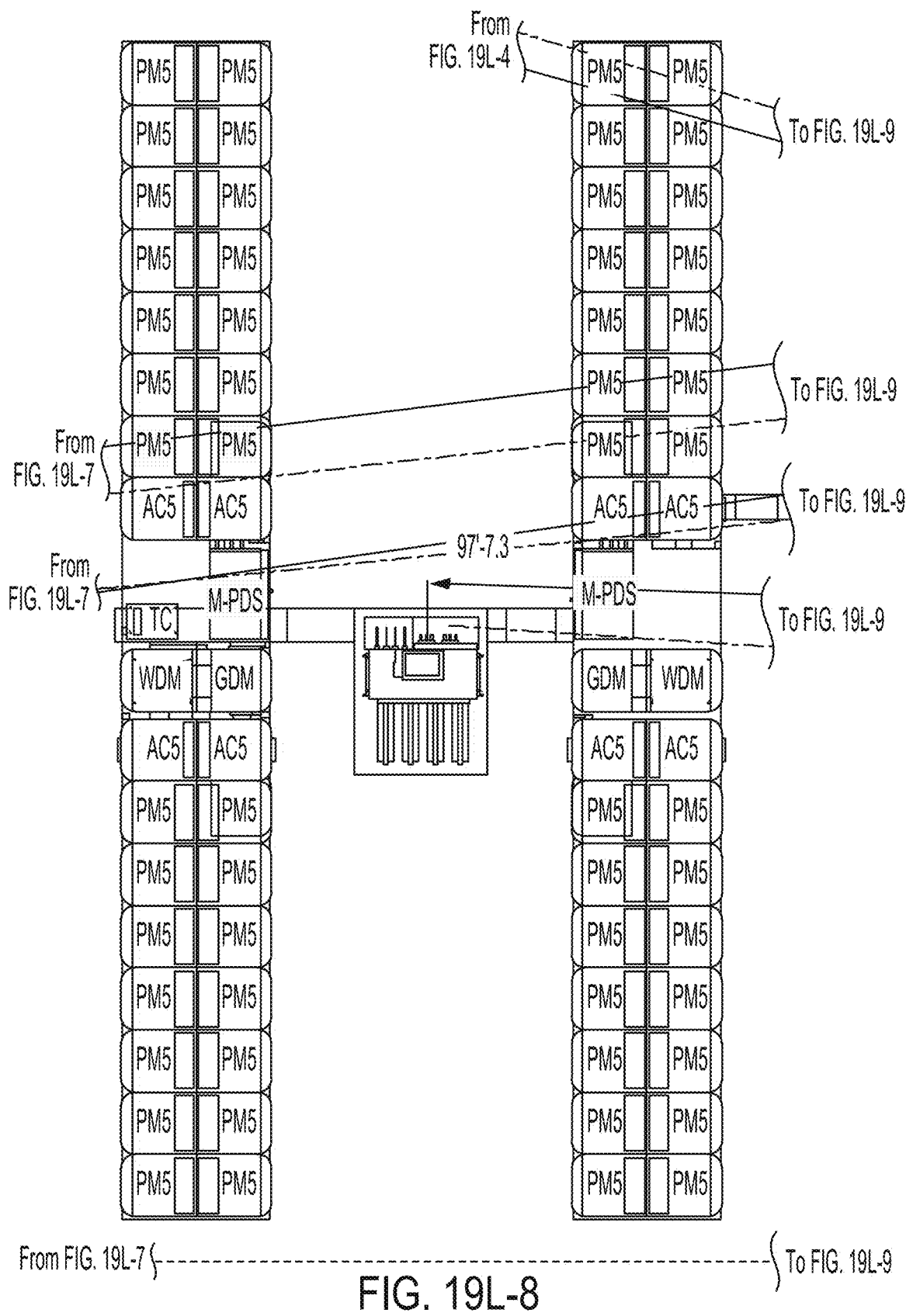
Figures 9, 19L:
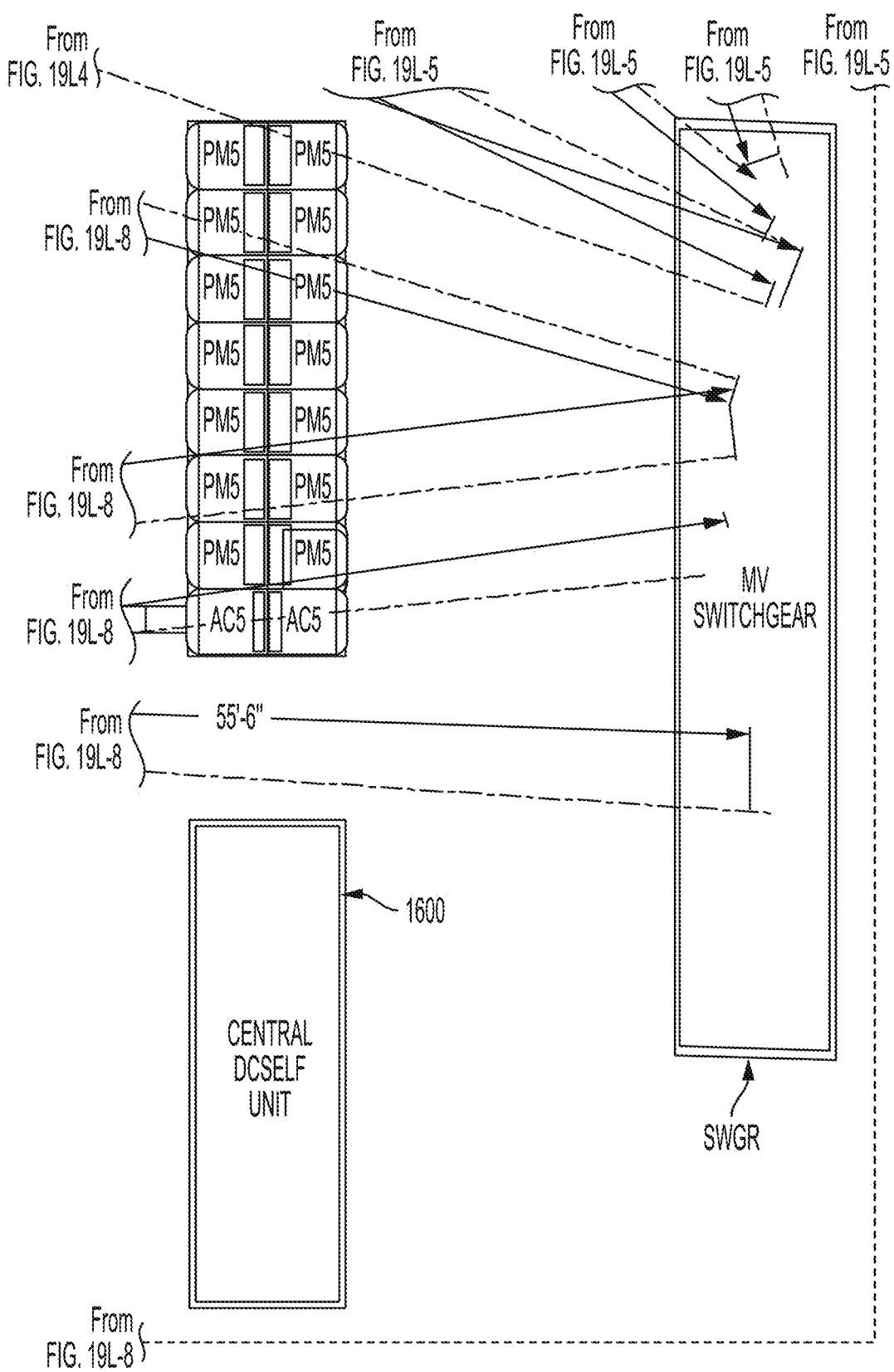

FIG. 19L shows the layout of a system of an alternative embodiment. The system includes eight blocks (with one of the blocks being larger block with two additional rows of power modules. The system includes sixty six 300 KW (6+1) power modules, one centralized desulfurizer module system, 16 GDMs, 16 WDMs, seven 3000 kVA Transformers, one 4000 kVA Transformer, fifteen 2000 Amp MPDS, two secondary 2500 Amp MPDS, and eight TCs. The system of FIG. 19L provides a compact layout of the modules, which reduces the length of the electrical connections (e.g., copper wires) between the modules. This reduces the cost of the system.

As shown in FIG. 19G, the central desulfurization system (e.g., module) 1600 replaces the separate desulfurizers in each row of power modules. The central desulfurization module 1600 is fluidly connected to the GDM, which is fluidly connected to the power modules 12 to provide fuel to the power modules 12. The power modules 12 are electrically connected to the MPDS, which is electrically connected to the electrical load (e.g., the power grid or a stand-alone load) 1901. The central desulfurization system (e.g., module) 1600 is shown in FIG. 19H. The central desulfurization system (e.g., module) 1600 contains one or more vessels 1602 (e.g., columns) filled with a sulfur adsorbent material (e.g., a sulfur adsorber bed). The GDM is shown in FIG. 19I. The GDM distributes fuel to four rows of power modules (which is referred to as a "stamp").

FIG. 19J illustrates flow diagram for the central desulfurization system 1600. The system 1600 may include a filter at the fuel inlet and two parallel fuel flow paths (e.g., fuel lines, i.e., fuel conduits) to each row of power modules (i.e., "stamp"). Furthermore, there may be two sets of two control valves 1603, such as mass flow control valves, located in parallel fuel flow paths to each "stamp". Pressure transducers (PRT) may be located on various lines and used to monitor the line pressure and take the necessary action during system operation. A gas sampling port 1604 may also be located on the main inlet line. In one embodiment, the system also includes a separate sulfur breakthrough detection line 1606 (shown in dashed box) which is used to detect sulfur breakthrough. The output of the detection line 1606 may be fluidly connected to a safety vent 1608. A sulfur detection sensor 1609 may be located on the detection line 1606 to detect the presence of sulfur in the fuel that is output from the desulfurization system 1600.

As shown in FIGS. 19B-19D, the plumbing 230 (e.g., fuel and water pipes 230A, 230B) may be provided from the respective utilities (e.g., gas and water pipes) to the respective GDM in each subsystem through pre-cast concrete trenches 1902. Likewise, the wires 232 may be provided between each MPDS and the system power distribution unit through the same pre-cast concrete trenches 1902. The pre-cast concrete trenches 1902 may have a "U" shape with two vertical sidewalls connected by a horizontal bottom wall or horizontal connecting bars. Openings may be provided in the horizontal bottom wall. The pre-cast concrete trenches

1902 are located below grade and are covered with cover plates, dirt, gravel and/or asphalt concrete paving.

As shown in FIGS. 19D and 19F, each module of the system, such as a power module 12 and/or power conditioning module 18 may be installed on a multi-layer support. The multi-layer support is formed on compacted soil 1910. The support includes a cellular concrete (aka concrete foam) base 1912, such as Confoam® cellular concrete base. A conventional (non-cellular) concrete pad 1914 is located on the base 1912. The concrete pad 1914 has a smaller area than the base 1912. U-shaped steel mesh formwork 1916, such as Novoform®, which surrounds a metal rebar cage, is provided on the sides of the concrete pad 1914. The base 1912 supports the bottom of the framework 1916. The top of the concrete pad 1914 is located between 1.5 and 2 inches above finished grade, which may comprise gravel or asphalt concrete paving 1918 located over the base 1912.

As shown in FIGS. 19A-19C, 19K and 19L each block of the fuel cell system may include at least one transformer. The at least one transformer may be isolated (i.e., physically separated from) the rows of power modules 12 and may be located on a separate pad from the power modules 12, the power conditioning modules 18, and optionally the GDMs, the WDMs, the TC units, and the MPDS modules. The at least one transformer may be located on a separate pad containing other components of the system power distribution unit, such as the system power distribution module(s) (PDS-1 and PDS-2) and the disconnect switch gear (SWGR). Wires 232 (i.e., "UE") may extend through trenches, such as pre-cast concrete trenches 1902, between the separate pad containing the at least one transformer and optionally other components of the system power distribution unit to the respective pads containing the rows of power modules 12, the power conditioning modules 18, and optionally the GDMs, the WDMs, the TC units, and the MPDS modules. In various embodiments, the at least one transformer (e.g., XFMR-1 and XFMR-2 in FIGS. 19A and 19B and XFMR in FIGS. 19K and 19L) may be in a central location of the block such that rows of power modules 12 may be located on at least two opposite sides of the transformer (i.e., the rows of power modules 12 are not arranged in-line with the transformer on a single side of the transformer). In some embodiments, the at least one transformer may be located between at least two rows of power modules 12 within the block.

In the embodiment shown in FIGS. 19A and 19B, XFMR-1 may be electrically coupled to a plurality of power modules 12, including all of the power modules 12, located on a first side (i.e., left side) of the block and XFMR-2 may be electrically coupled to a plurality of power modules 12, including all of the power modules 12, located on a second side (i.e., right side) of the block. In some embodiments, a third transformer (i.e., XFMR-3) may also be located in a central location of the block, such as on the same pad containing the first and second transformers, XFMR-1 and XFMR-2. The first and second transformers, XFMR-1 and XFMR-2, may feed power to the third transformer XFMR-3, which may have a higher power rating than either of the first and second transformers, XFMR-1 and XFMR-2. For example, the first and second transformers XFMR-1 and XFMR-2 may be 3000 kVA transformers, and the third transformer XFMR-3 may be a 5000 kVA transformer. The third transformer XFMR-3 may provide a single power output for the entire block.

In the embodiment shown in FIG. 19L, each transformer XFMR may service a respective block of the fuel cell system, and may provide a single power output that may be transmitted over a wire to a common switchgear (shown on the lower left-hand side of FIG. 19L) that may be coupled to the grid and/or load.

Providing one or more transformers in a central location of the block between respective rows of power modules 12 may significantly decrease the overall length of the electrical connections (e.g., copper wires) that need to be run for each block and within the fuel cell power system as a whole. This may greatly reduce the cost of the fuel cell system.

FIGS. 20A to 20J are perspective views of steps in a method of installing the large site fuel cell system of FIGS. 19A-19K.

Figure 20A:
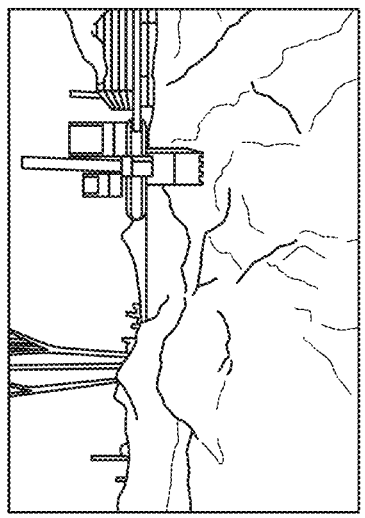
FIGS. 20A to 20J are perspective views of steps in a method of installing the large site fuel cell system of FIGS. 19A-19F.
Figure 20B:
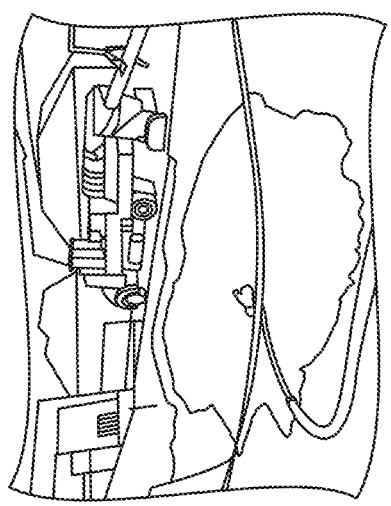
Figure 20C:
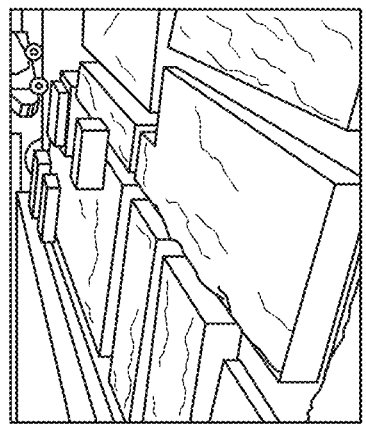
Figure 20D:
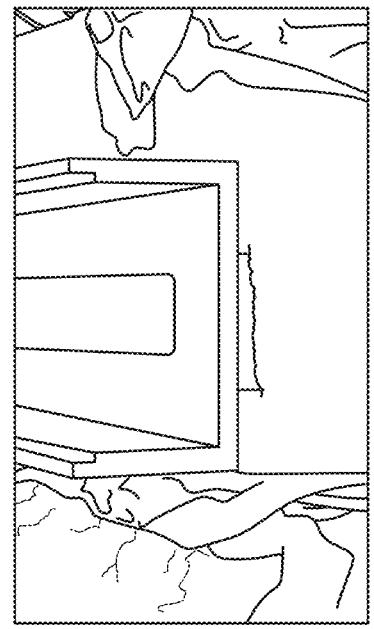
Figure 20E:
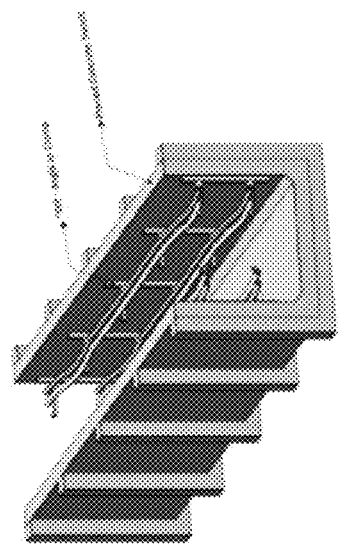
Figure 20F:
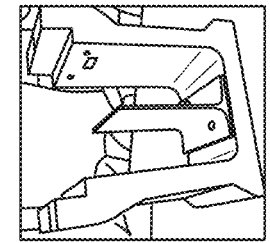
Figure 20H:
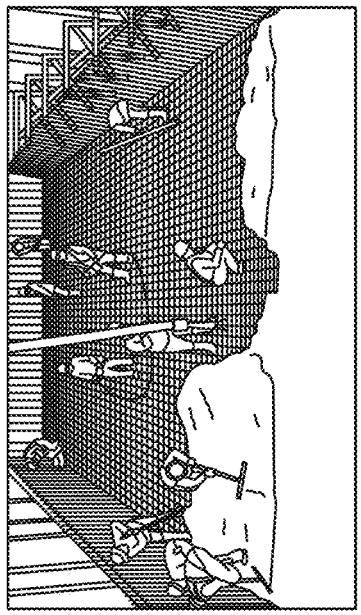
Figure 20J:
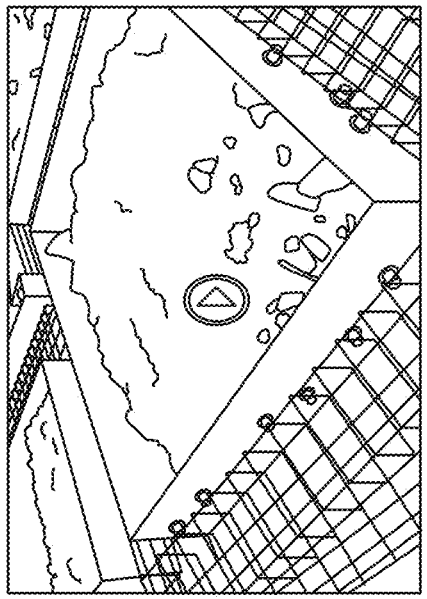
Figure 20G:
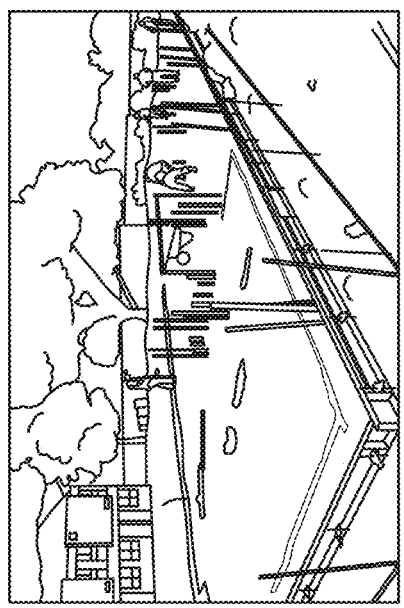

As shown in FIGS. 20A and 20G, trenches are formed in the soil and then compacted using heavy machinery, such as an excavator, and frames are placed into the trenches. As shown in FIGS. 20B and 20H, the cellular concrete base 1912 is filled into the trenches. The cellular concrete comprises a flowable fill material (e.g., foam concrete, such as Confoam fill 27) which is filled from a pipe or hose and then solidified into the base 1912.

Figure 20I:
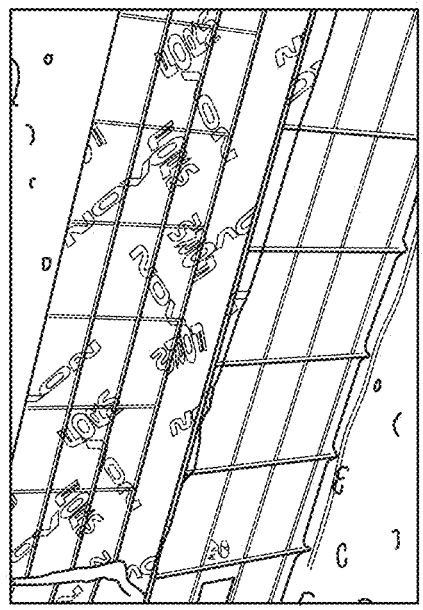

As shown in FIGS. 20C and 20I, the U-shaped steel mesh formwork 1916 and rebar cage are placed on top of the base 1912. The framework 1916 may include polymer sheets that cover the metal mesh. Rebar is located inside the framework, as shown in FIG. 20J. The concrete pad 1914 is then formed inside the bounds of the framework 1916. The modules are then placed on the concrete pad 1914.

As shown in FIGS. 20D and 20F, additional trenches are formed outside of the bases 1912. The pre-cast concrete trenches 1902 are then placed into the additional trenches.

As shown in FIG. 20E, the gas pipes 230A, water pipes 230B and wires 232 are then placed into the pre-cast concrete trenches 1902 and connected to the respective GDMs and power components, such as MPDS, PDS-1 and PDS-2. The pipes and wires may be attached or clamped (e.g., using clamps 1903 and/or support bars) inside the pre-cast concrete trenches 1902 at different vertical levels. The pre-cast concrete trenches 1902 are then covered with cover plates, dirt, gravel and/or asphalt concrete paving.

The method shown in FIGS. 20A to 20J achieves 100% consolidation with no mechanical vibration, which eliminates or reduces the need to brace walls during backfill operations. Finally, it is easily excavatable and may be removed with a shovel or cut out with a reciprocating saw or handsaw.

Figure 21:
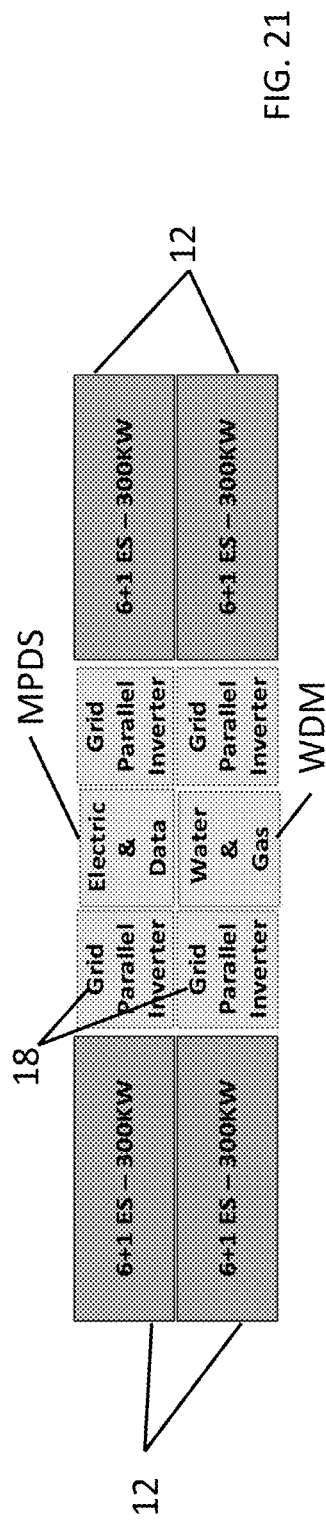
FIG. 21 is a schematic top view of a subsystem according to an embodiment.

FIG. 21 is a schematic view of one subsystem of the system shown in FIGS. 19A-19C. Each row of power modules 12 may comprise a 300 kW Energy Server® fuel cell power generator from Bloom Energy Corporation, labeled "ES". Thus, the subsystem includes four rows of 300 kW ES for a total of 1200 kW of power. The entire system containing four subsystems can deliver 4800 kW of power. The 1200 kW ES configuration is comprised of 4×300 kW ES that all converge the standard power, communication, water and gas interconnects into center sections for common tie-in during the installation process.

Figure 22A:
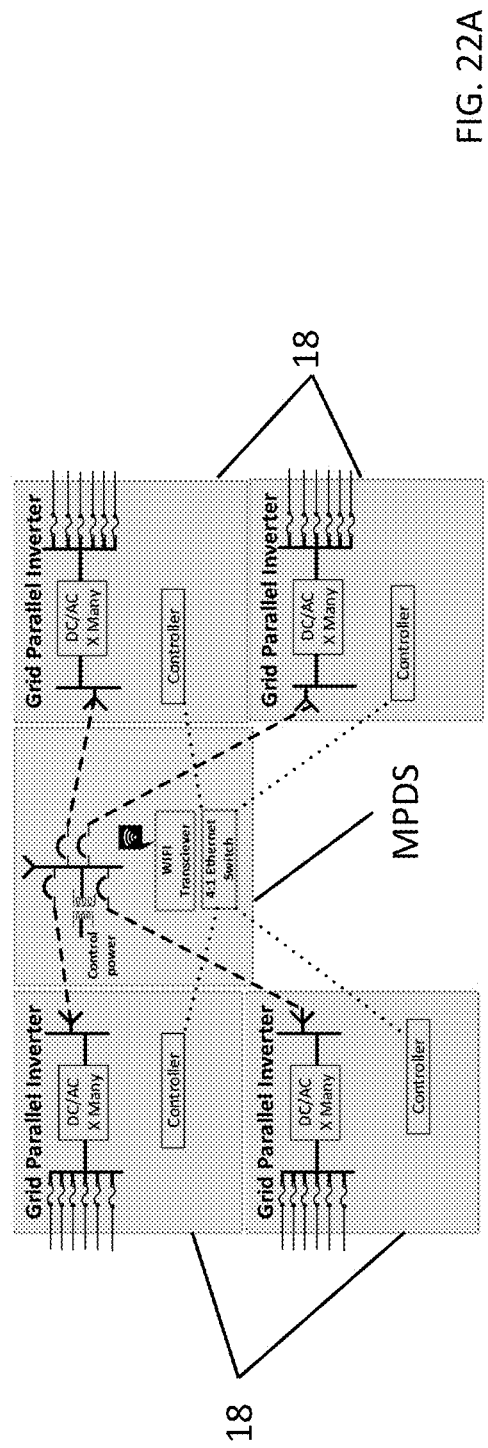
FIGS. 22A and 22B are circuit schematics of electrical components of the subsystem of FIG. 21.
Figures 1, 22B:
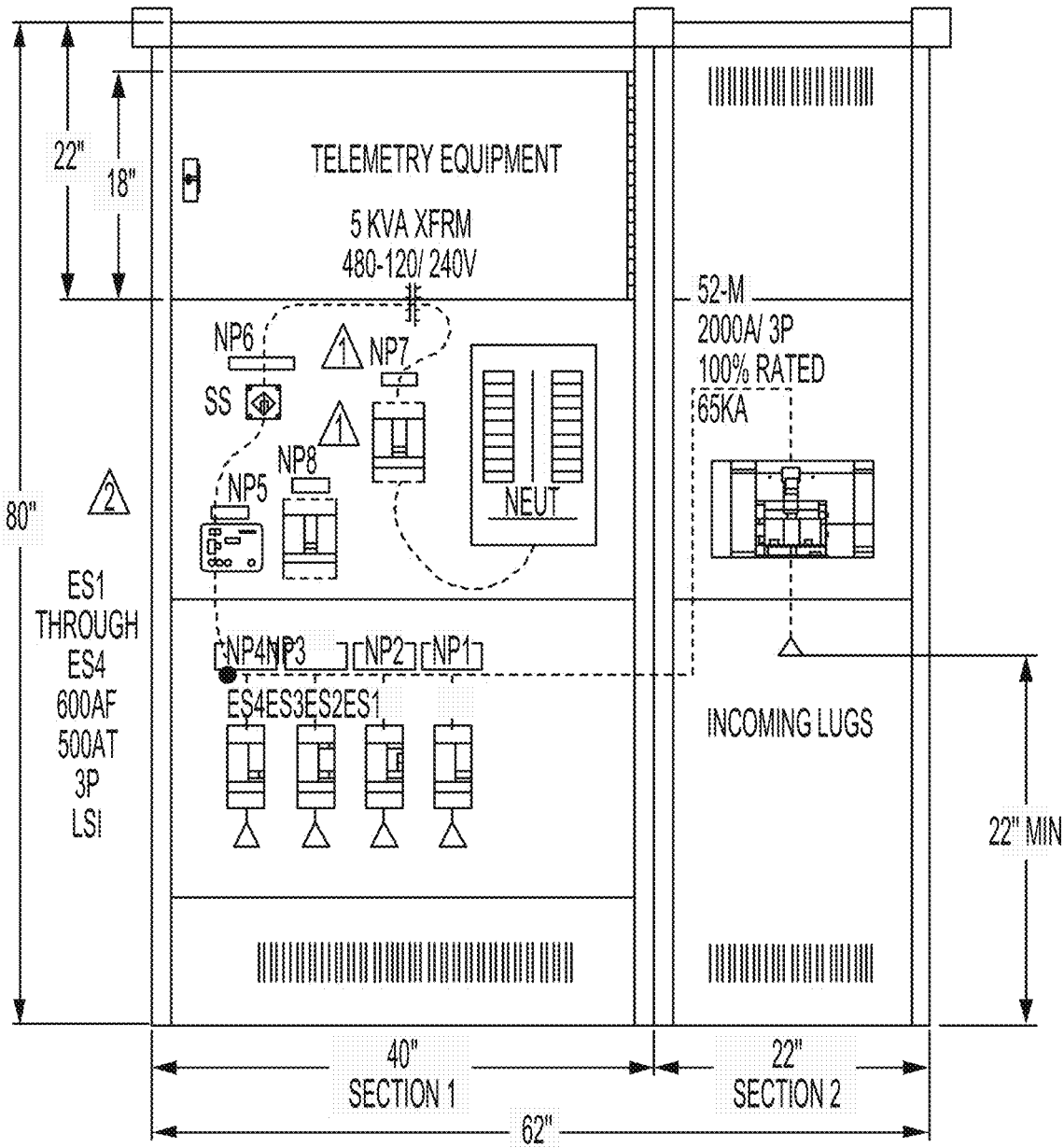
Figures 2, 22B:
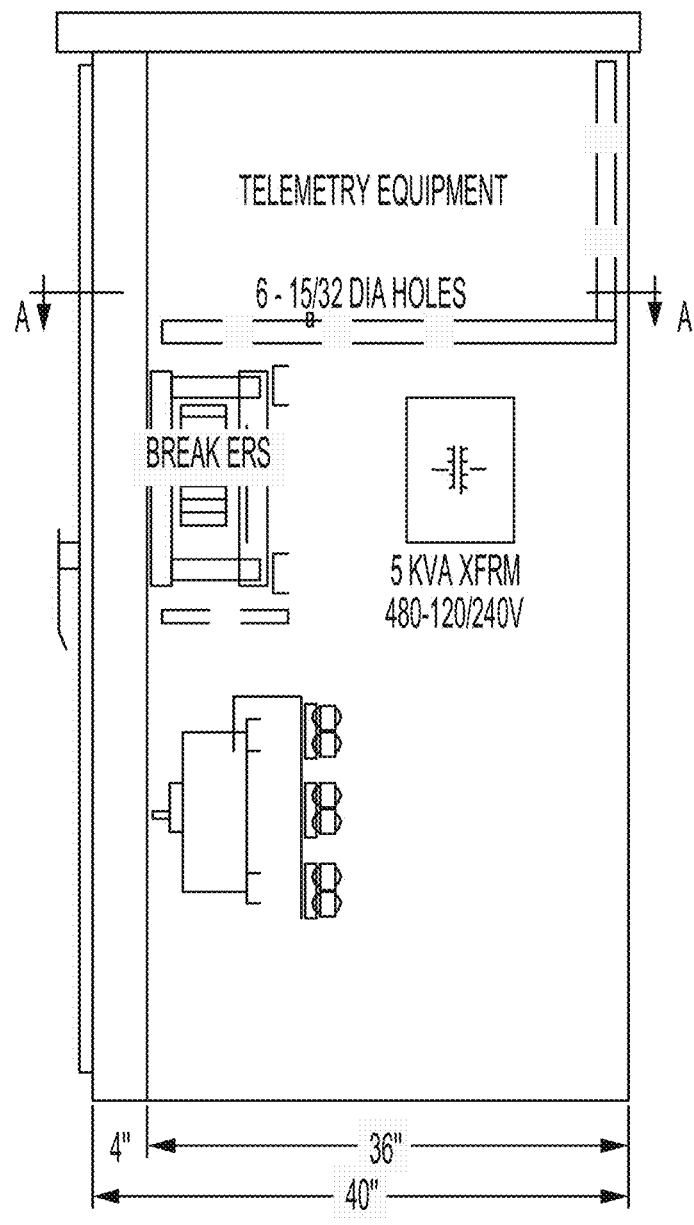

The MPDS in FIGS. 22A and 22B takes advantage of the install proximity in two ways. First, a single electrical tie-in to this module can in turn be distributed to the power conditioning modules 18 by suppling the interconnect cables as part of a site install kit. This reduces the installation from 4 sets of conduits and trenches into one. This configuration also allows omission an output circuit breaker and surge device in each power conditioning module 18 for a total of 4 breakers and 4 surge devices eliminated from the 1200 kW system. Additional beneficial features include the placement of the WIFI transmitter in the MPDS module and its communication interconnects to the separate ES. The WIFI system may service the entire installation and may lead to omission of 4 sets of conduits and wires, which reduces installation cost and complexity. Thus, reduces system and installation can be realized due to the collection of the separate units into the system. Inclusion of the main breaker into system allows transformers to be placed closer to the rows of power modules, which reduces install costs and requires less electrical lines.

Figure 23:
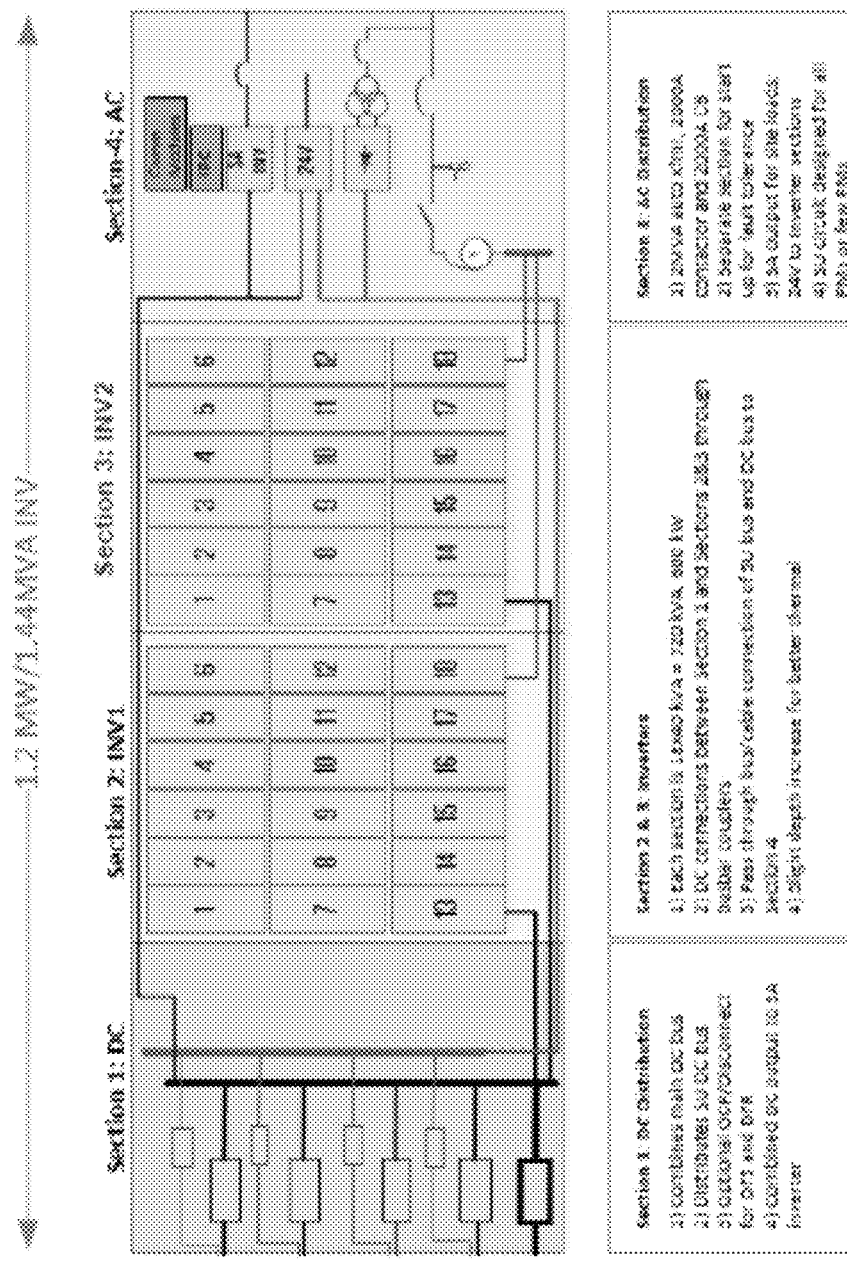
FIG. 23 is a circuit schematic of electrical components according to an embodiment of the present disclosure.

FIG. 23 shows alternative electronics modules according to another embodiment. The configuration in FIG. 23 shows 4 separate cabinets (i.e., housings) with each cabinet being fully populated for a dedicated purpose. The first cabinet is the location for landing the individual power module from the 4 ES while paralleling them on to a common DC bus. This module includes bussing, fuse protection and internal cabling landing locations. This module may support both 50 and 75 kW rated power modules and may include a fully rated interconnection of the collected output DC as an optional means to extend the DC bus to an adjacent 1200 kW system. The center modules 2 and 3 are populated with inverters units only that have large ampacity DC input and AC output. This embodiment may further reduce cost by eliminating the smaller inverter units and making a single monolithic inverter for implementation in the central system power distribution unit. The final module 4 provides further cost savings. This module houses the start-up and safety equipment for the fuel cell power modules. This reduces the quantity of these items from 4 to 1. This further serves as the collected output terminals for the system and the only location provided for external conduit entry.

In one embodiment, each subsystem includes 1200 kW/1200 kVA or 1420 kVA inverter. The subsystem will still retain the individual start-up and safety systems within the grid connected inverters. This will allow an individual safety shutdown within a single 300 kW ES (i.e., row of power modules 12). While a safety shutdown request coming from the GDM will shut down all 4 ES in the subsystem. This results in reduced product costs if the circuit breaker is removed within the 4 grid parallel inverters. The protection that these breakers provide may be moved to the integrated system PDS-1 or PDS-2. Thus, the 4 redundant surge protection devices and safety systems from each subsystem may be consolidated in the central system power distribution unit.

Figure 25A:
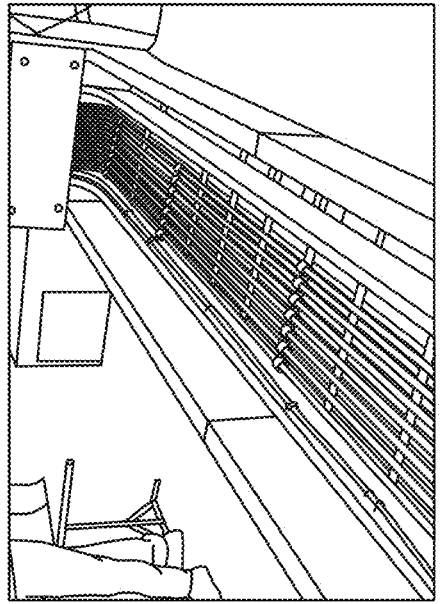
FIGS. 24, 25A and 25B are photographs of concrete curbs and raceways that may be used during the installation of the system of embodiments of the present disclosure.
Figure 24:
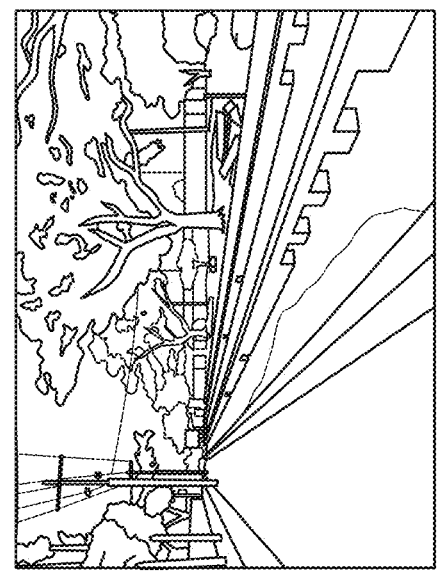
Figure 25B:
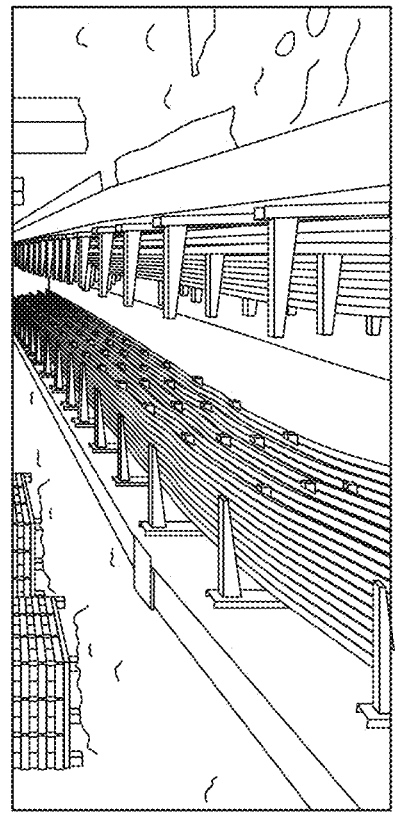

FIGS. 24, 25A and 25B are photographs of concrete curbs and raceways that may be used during the installation of the system of embodiments of the present disclosure. FIG. 24 illustrates concrete curbs which may be used instead of a pre-cast concrete pads. This allows the subsystems to be co-located in one area with a single electrical tie in location. The curbs provides pathways under the modules so that wires 232 and plumbing 230 can be installed on grade as opposed to below grade. This eliminates trench excavation.

Furthermore, excavation and the usage of separate conduits may be reduced or eliminated by using pre-manufactured concrete cable raceways shown in FIGS. 25A and 25B. The raceways may comprise the pre-cast concrete trenches described above with respect to FIGS. 20D and 20J. These can be installed on grade or in simple excavated trenches without the earthwork needed for conduit burial. Lastly, fixed cable raceways and improved site design can pre-determine actual conductor lengths allowing pre-manufactured conductor sets for each run of cables from the 1200 kW subsystems to the central electrical gear (i.e., to the system power distribution unit). This improves quality, reduces scrap and labor hours on site. In general, the installation is improved by increased quality, reduced site build time, reduced labor costs (e.g., electrical and plumbing), while still maintaining serviceability with lower overall height of components and simplified rigging. Thus, the open trenches shown in FIGS. 24 to 25B provide significant labor and material savings by avoiding to compact and close the trench with Class II/Engineered fill. A self compacting slurry, such as Confoam fill 27 (cellular concrete) is provided in lieu of Class II AB for subgrade and trench. It also provides better heat dissipation and eliminates RHO concrete, as well as easier servicing and upkeep.

Figures 1, 26A:
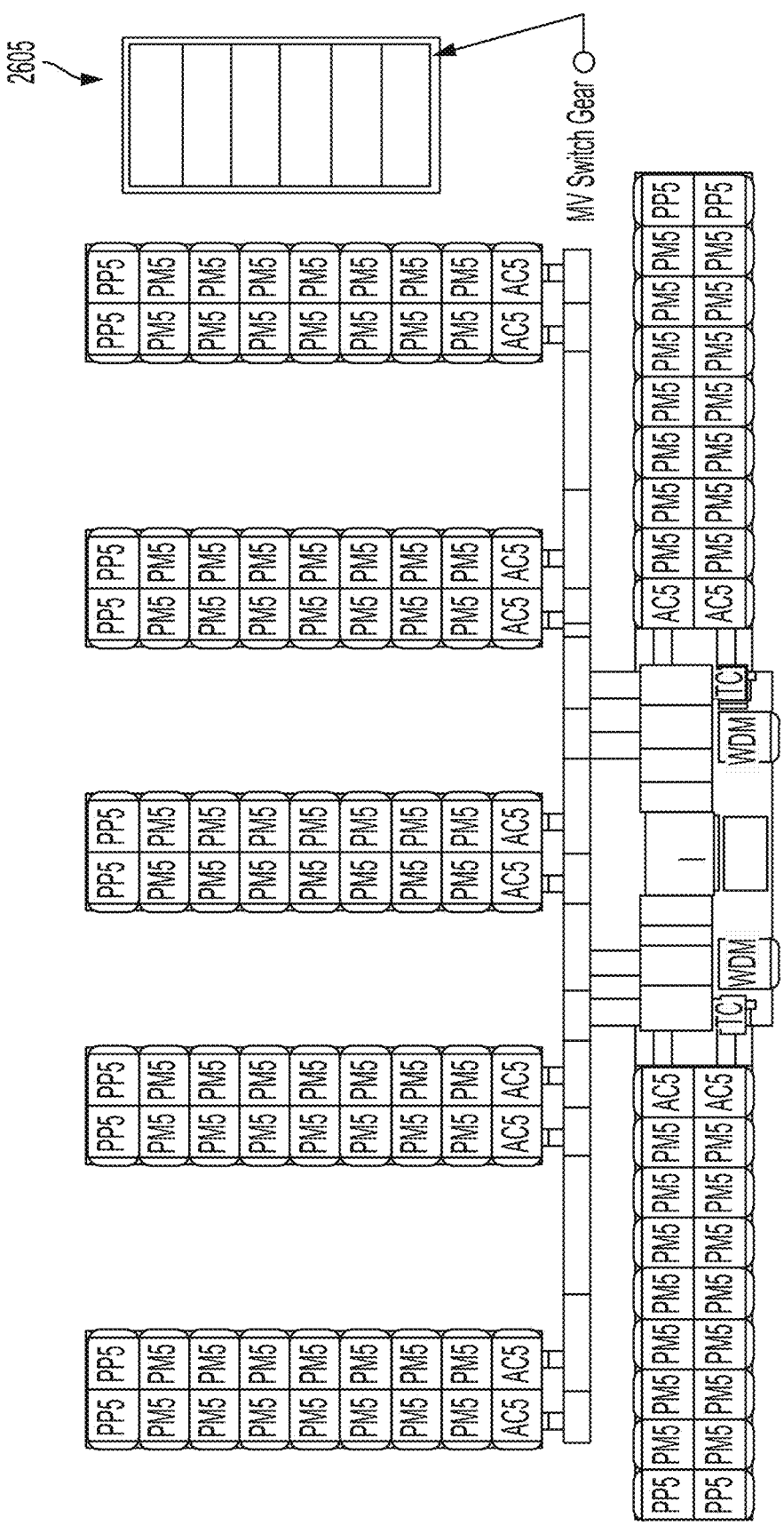
FIG. 26A is a top view of a large site fuel cell system according to another embodiment of the present disclosure.
Figures 2, 26A:
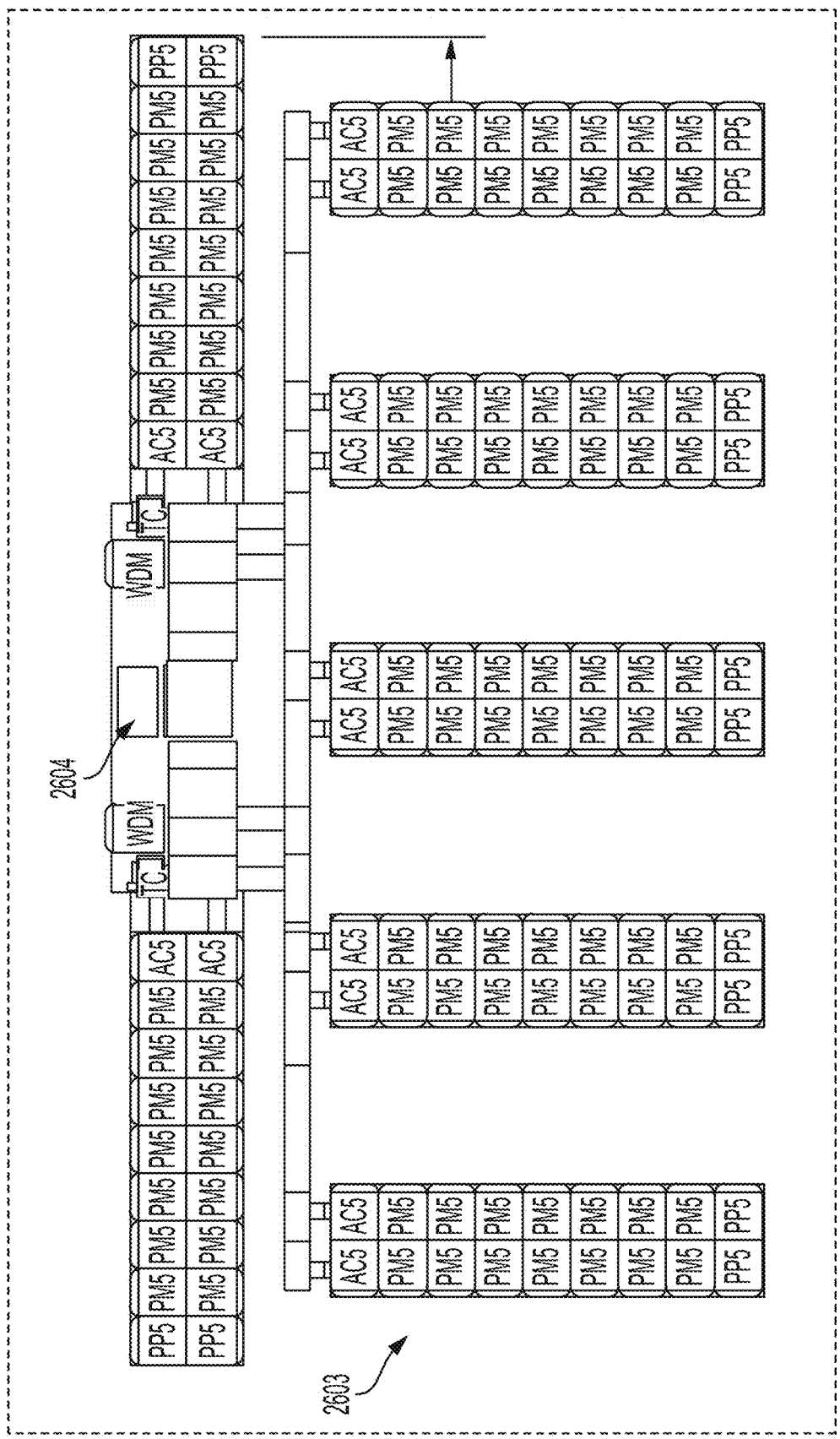
Figures 3, 26A:
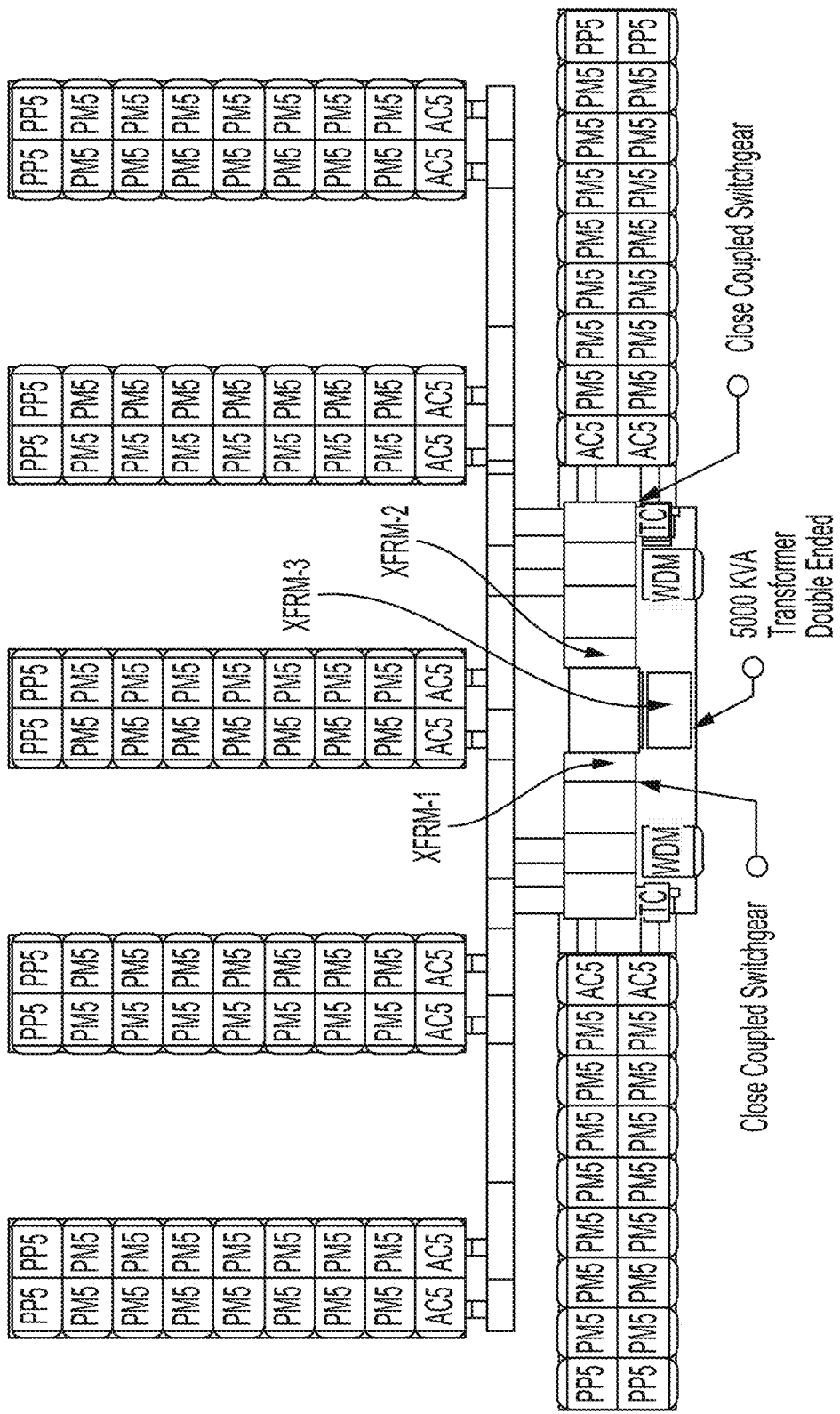
Figures 4, 26A:
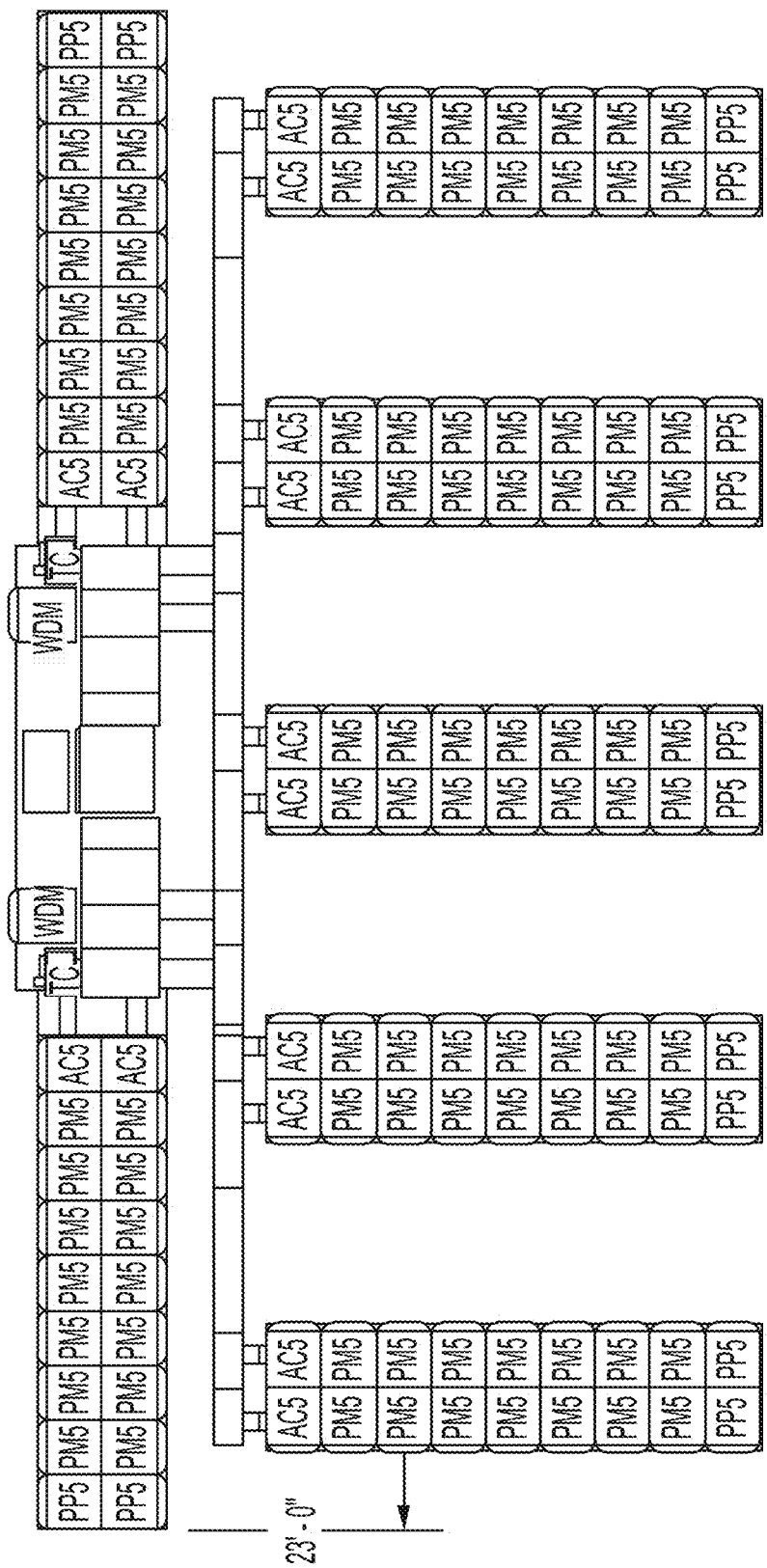
Figures 5, 26A:
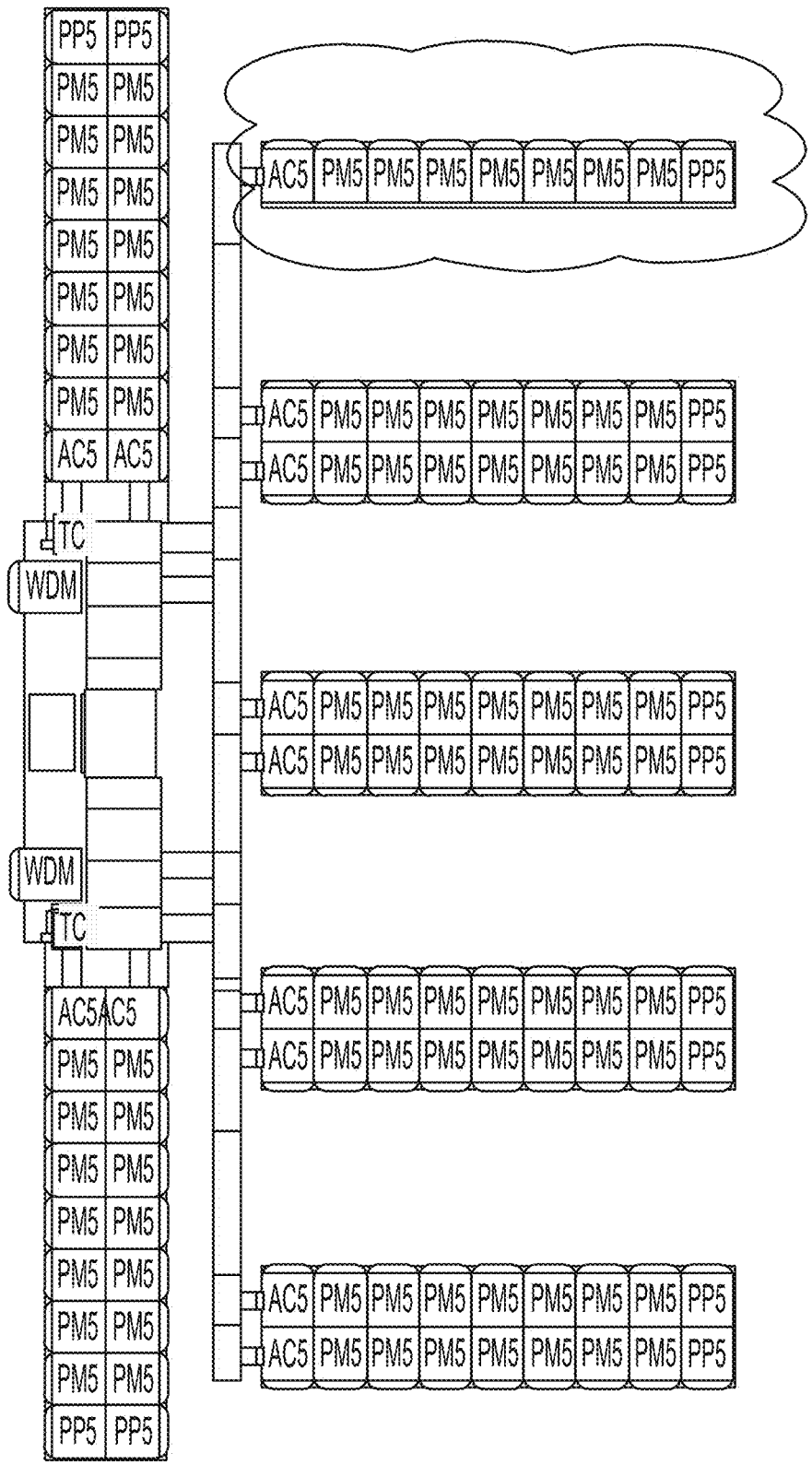
Figure 26B:
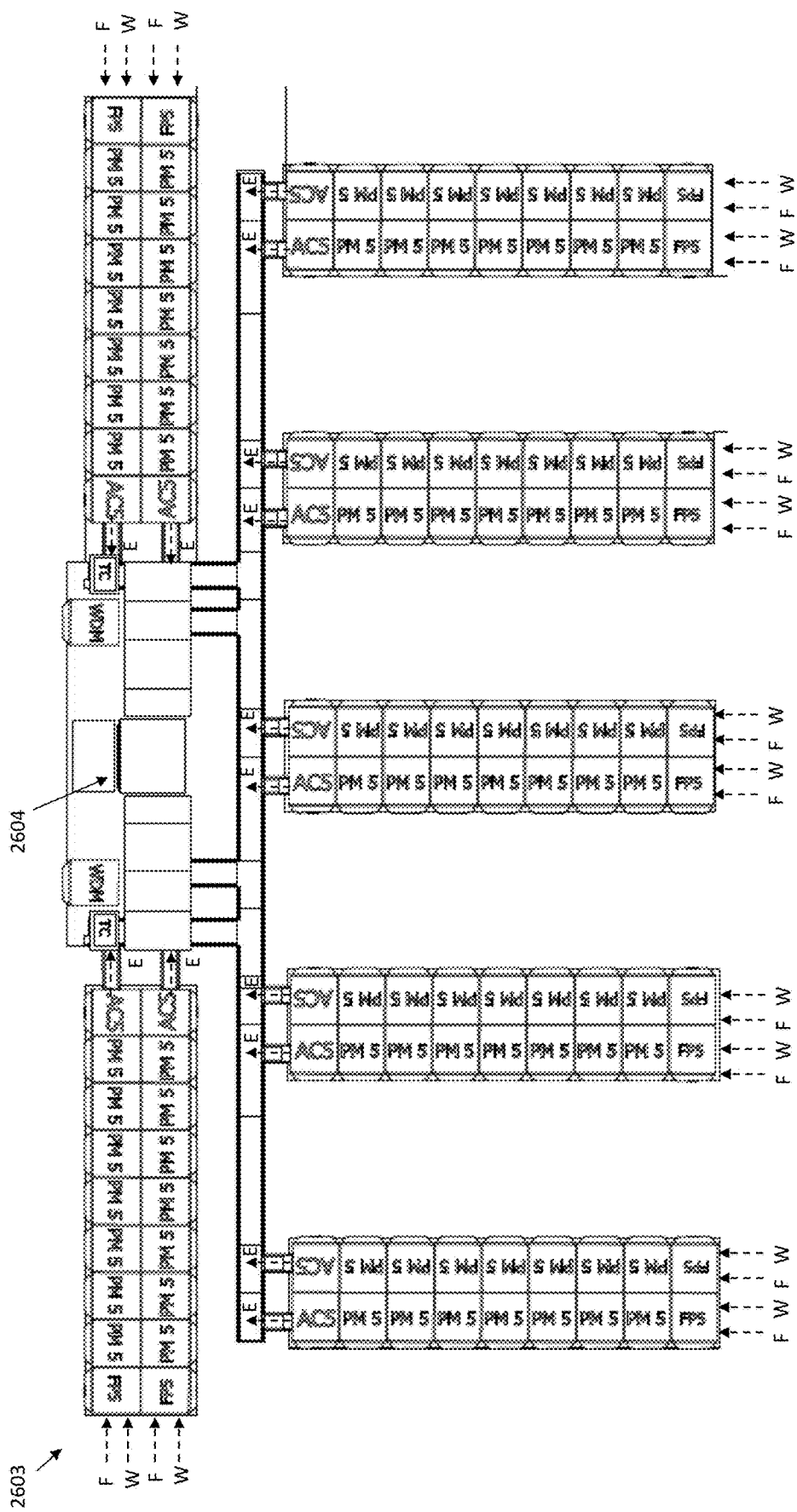
FIG. 26B is a top view of a block of the fuel cell system of FIG. 26A.
Figure 26C:
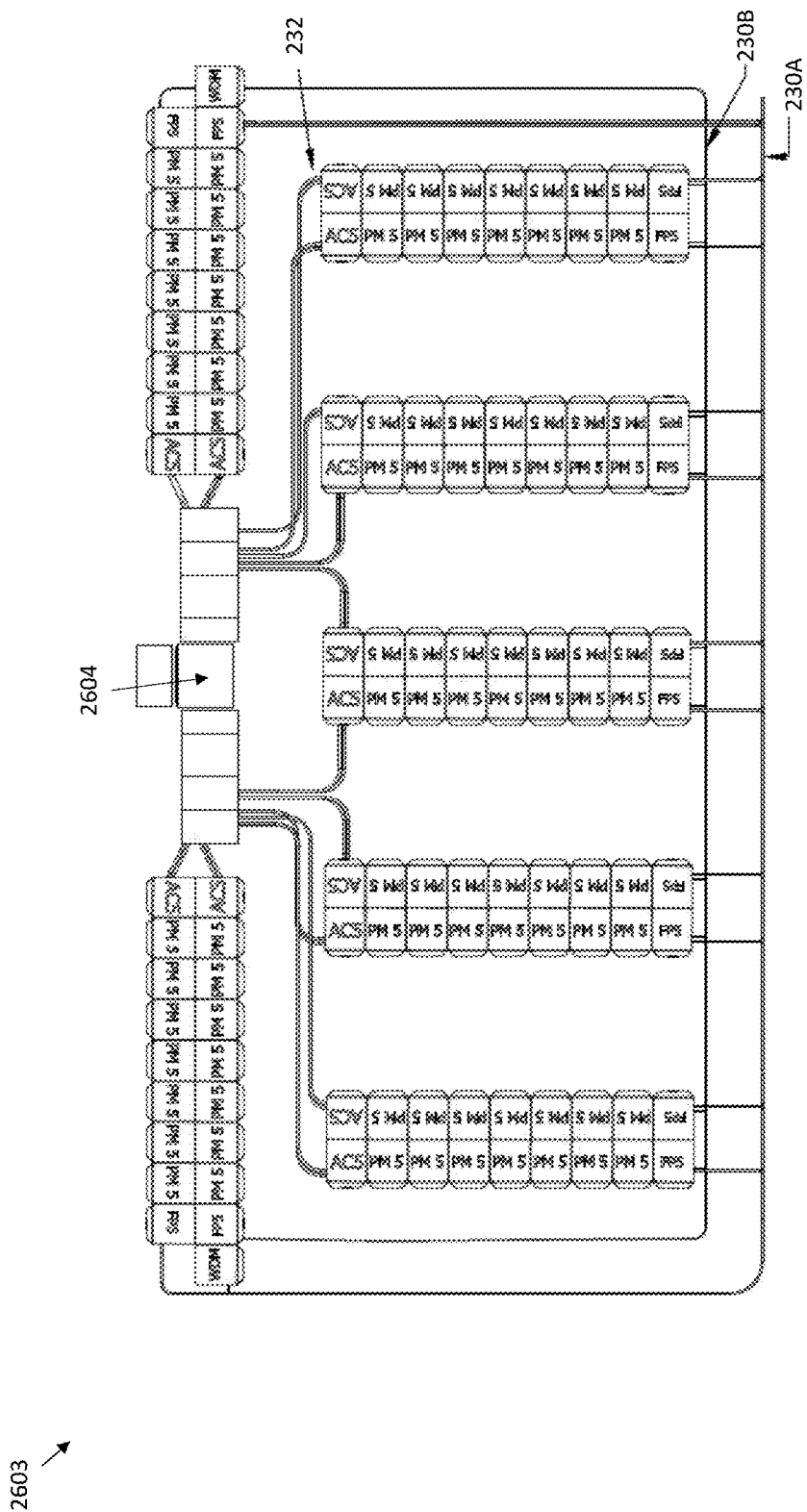
FIG. 26C is a top view of an alternative configuration of a block of the fuel cell system of FIG. 26A illustrating conduits for fuel and water and electrical wiring according to an embodiment of the present disclosure.
Figure 26D:
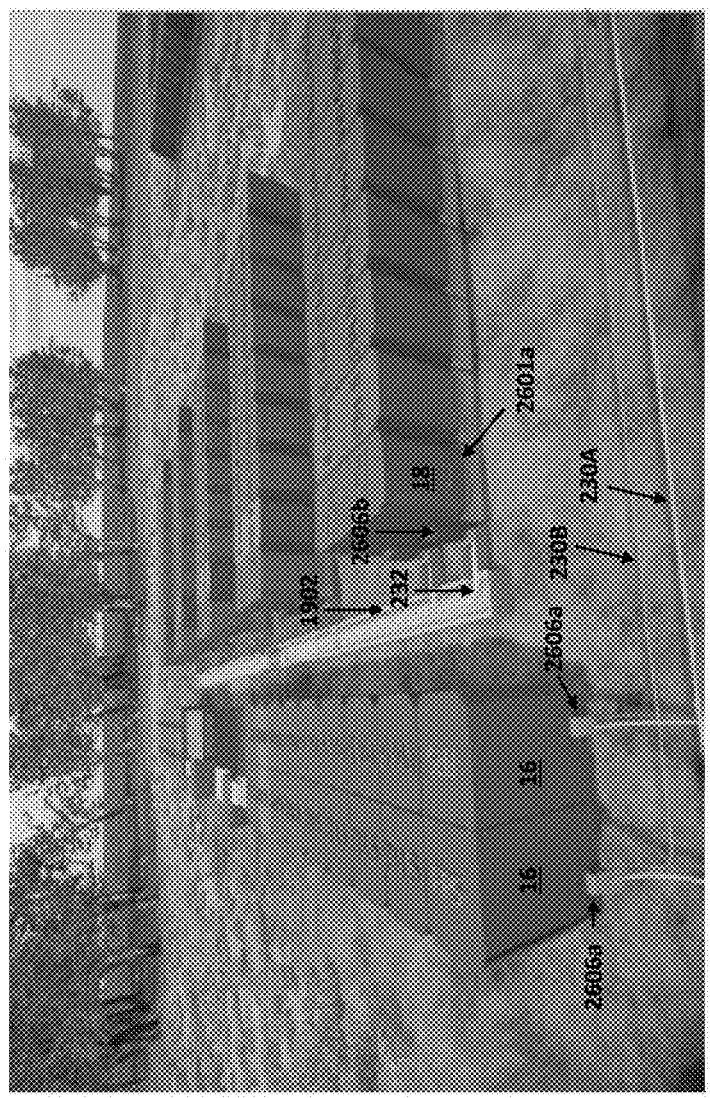
FIG. 26D is a perspective view of a block of the fuel cell system of FIG. 26A illustrating side entry of gas and water conduits at a first end of the rows of power modules and side entry of electrical wiring at a second end of the rows of power modules.
Figure 26E:
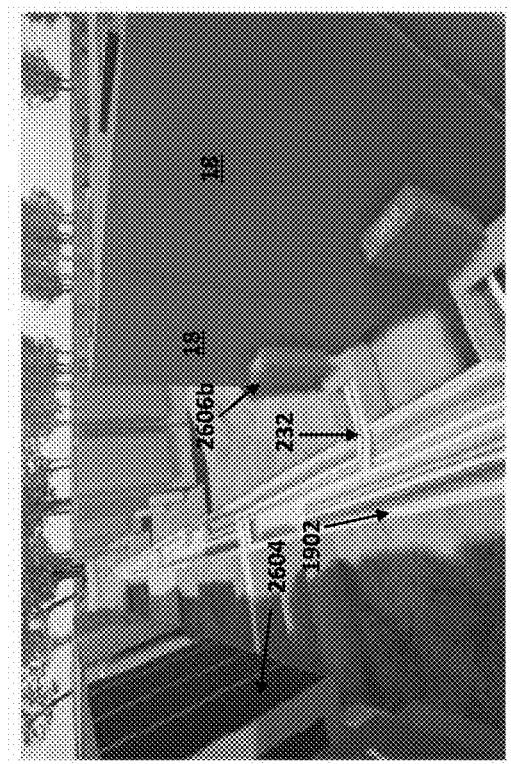
FIG. 26E is a perspective view of a concrete trench containing electrical wiring extending between the rows of power modules and a centralized system power distribution unit for a block of the fuel cell power system according to various embodiments of the present disclosure.

FIG. 26A is a top view of a large site fuel cell system according to yet another embodiment of the present disclosure. FIG. 26B is a top view of a block 2603 of the fuel cell system of FIG. 26A. FIG. 26C is a top view of an alternative configuration of a block 2603 of the fuel cell system of FIG. 26A illustrating fuel conduits 230A, water conduits 230B, and electrical wiring 232. FIG. 26D is a perspective view of a block 2603 of the fuel cell system of FIG. 26A illustrating side entry of fuel and water conduits 230A, 230B into a fuel processing module 16 located at a first end of the rows of power modules 12 and side entry of electrical wiring 232 into the powder conditioning module 18 located at a second end of the rows of power modules 12. Thus, in this embodiment, the fuel processing module 16 and the power conditioning module 18 are located on opposite ends of a row of power modules 12. FIG. 26E is a perspective view of a concrete trench 1902 containing electrical wiring 232 extending between the rows of power modules 12 and a centralized system power distribution unit 2604 for a block 2603 of the fuel cell power system. The fuel cell power system as shown in FIGS. 26A-26E may reduce the number of components, including the total amount of electrical wiring, and may simplify component installation, thus reducing the total system cost.

The large site fuel cell system shown in FIGS. 26A-26E may be similar to a system as described above with reference to FIGS. 19A-19L. In particular, the system may include multiple rows of power modules 12 (labeled PM5) arranged on pads 2601a (e.g., concrete pads) as shown in FIG. 26D. Each row of power modules 12 is electrically connected to a single above-described power conditioning module 18 (labeled AC5) which may include a DC to AC inverter and other electrical components. The fuel processing modules 16 (labeled FP5) and power conditioning modules 18 may be located on the same pads 2601a with the power modules 12. The system may be configured in a plurality of blocks 2603, where each block 2603 may include a plurality of rows of power modules 12 (and associated fuel processing modules 16 and power conditioning modules 18). The rows of power modules 12 are located on different sides of a central system power distribution unit 2604 of the respective block 2603. The system power distribution unit 2604 may include at least one transformer, such as first and second transformers, XFMR-1 and XFMR-2, that may each be electrically connected to a plurality of rows of power modules 12 on respective sides of the block 2603, and a third transformer XFMR-3 that is electrically connected to the first and second transformers XFMR-1 and XFMR-2, and may provide a single power output for the block 2603. The power outputs from each block 2603 may be provided over an electrical connection (e.g., copper wire) to a common switchgear 2605 that may couple the system to the grid and/or a load.

An above-described system power distribution module (PDS) may be electrically connected to a plurality of power conditioning modules 18 of the rows of power modules 12 and may also be electrically connected to a transformer (e.g., XFMR-1 or XFMR-2) of the system power distribution unit 2604 in each block 2603. For example, each block 2603 may include a pair of system power distribution modules, such as the above-described PDS-1 and PDS-2, in the system power distribution unit 2604, where each of the power distribution modules may be electrically connected to power conditioning modules 18 on respective sides (e.g., left and right sides) of the block 2603, and may provide power to a respective one of the first and second transformers XFMR-1 and XFMR-2. Each block 2603 of the system may optionally also include one or more above-described water distribution modules (WDMs), and one or more above-described telemetry modules (TCs).

The system shown in FIG. 26A includes five blocks 2603 each including a plurality of rows of power modules 12 and a system power distribution unit 2604. Each row includes seven power modules 12 and may form a 300 kW Energy Server® fuel cell power generator (ES) as described above with reference to FIG. 21. Four of the five blocks 2603 include fourteen rows of power modules 12 and may provide 4.2 MW of power. A fifth block 2603 (located on the right-hand side of FIG. 26A) includes thirteen rows of power modules 12. Thus, the system as a whole may provide 20.7 MW of power. It will be understood that various other configurations of the system are within the scope of the present disclosure, including variations in the number of blocks 2603 of the system, variations in the number of rows of power modules 12 per block 2603, variations in the number of power modules 12 per row, as well as variations in the layout(s) of the blocks 2603 and the rows of power modules 12 within each block 2603.

The system shown in FIGS. 26A-26E may differ from the system described above with reference to FIGS. 19A-19L in that the system of FIGS. 26A-26E may not include a central desulfurization system, and may also not include central gas and water distribution modules (GDMs) fluidly-connected to the rows of power modules 12. Rather, the system shown in FIGS. 26A-26E may include a plurality of the above-described fuel processing modules 16 (labeled FP5) including components for pre-processing of fuel, such as adsorption beds (e.g., desulfurizer and/or other impurity adsorption beds). Each row of power modules 12 may include a fuel processing module 16 fluidly coupled to each of the power modules 12 within the row. The fuel processing module 16 may be located on the same pad 2601a with the row of power modules 12 and the associated power conditioning module 18.

Referring again to FIGS. 26A-26E, in various embodiments, within each of the rows of power modules 12 of the system, a fuel processing module 16 (i.e., FP5) may be located on a first side of the row of power modules 12, and a power conditioning module 18 (i.e., AC5) may be located on a second side of the row of power modules 12, opposite to the first side. As shown in FIG. 26B, fuel (indicated by arrows labeled "F") and water (indicated by arrows labeled "W") may enter the fuel processing modules 16 via conduits 230A and 230B on one side of the rows, and external electrical connections (e.g., wires 232) to the power conditioning modules 18 (indicated by arrows labeled "E") may be located on the opposite side of the rows. Underground fuel conduits (e.g., pipes) 230A and water conduits (e.g., pipes) 230B may feed fuel and water, respectively, to the fuel processing module 16 in each row, as shown in FIGS. 26C and 26D. In embodiments that include at least one water distribution module (WDM), the water from a municipal water supply pipe may be initially provided to a WDM for treatment, and the treated water may be supplied from the WDM to the fuel processing modules 16 in each row via the water conduits 230B, as shown in FIG. 26C. The above-described wires 232 may couple the power conditioning module 18 in each row to the centralized system power distribution unit 2604 of the respective block 2603. In some embodiments, the wires 232 may be located within a pre-cast concrete trench 1902 as described above with reference to FIGS. 19B-19D and 20D-20E. The pre-cast concrete trench 1902 may extend between the power conditioning modules 18 of the respective rows to the centralized system power distribution unit 2604 in each block 2603 of the fuel cell system. Alternatively, the wires 232 may be located in a concrete curb or raceway as described in FIGS. 24, 25A and 25B. In other embodiments, such as shown in FIG. 26D, the wires 232 may be located in buried conduits that may optionally be encased in a suitable material, such as cement.

In various embodiments, separating the fuel processing modules 16 and the power conditioning modules 18 on opposite sides of the rows of power modules 12 may obviate the need to include utility connections (i.e., fuel and water conduits 230A and 230B) and electrical connections (e.g., copper wires) within the same trenches. Placing the utility and the electrical connections within the same trench may need a deeper trench (e.g., >3 feet, such as up to 5 feet deep) in order to maintain a sufficient vertical separation between the utility and electrical connections. Accordingly, by placing the fuel and water conduits 230A and 230B in separate trenches from the electrical connections (e.g., wires 232), the trenches do not need to be as deep, which can save on excavation time and cost.

In addition, the electrical connections may enter on the sides of the rows that are closest to the centralized system power distribution unit 2604 within each block 2603. Thus, the wires 232 connecting the power conditioning modules 18 of the rows to the centralized power distribution unit 2604 of each block 2603 may traverse shorter distances. This may result in less copper wiring and shorter runs of the trenches (e.g., pre-cast concrete trenches 1902) containing the electrical connections, which may provide significant savings in labor and materials cost. Further, the trenches 1902 containing the electrical connections (e.g., wires 232) shown in FIG. 26D may be relatively shallower compared to the trenches 1902 shown in FIGS. 19B-D and 20D-E since they only contain the electrical connections rather than stacked electrical and utility (e.g., gas and water) connections.

Referring to FIGS. 26B-26E, in various embodiments, the electrical connections (e.g., wires 232) and the utility connections (e.g., fuel and water conduits 230A and 230B) may enter the rows of power modules 12 from the sides of the rows rather than entering from beneath the rows as in the embodiments described above with reference to, for example, FIGS. 3A-3D, 4C, 5B, 5D, 6B, 7B, 8, 9B, 16, 17, 18A, 19A-D, 19K and 19L. In various embodiments, service relocation modules 2606a may be located on an external side surface of the fuel processing module 16 cabinets at the end of each row of power modules 12. Fuel and water conduits 230A and 230B may enter the service relocation modules 2606a from below and may enter the fuel processing module 16 cabinets from the side (e.g., above finished grade). Additional service relocation modules 2606b may be located on an external side surface of the power conditioning module 18 cabinets at the opposite end of each row of power modules 12. Electrical connections (e.g., wires 232) may enter the service relocation modules 2606b from below (e.g., from pre-cast concrete trenches 1902) and may enter the power conditioning module 18 cabinets from the side (e.g., above finished grade). In various embodiments, by providing side-entry of the electrical and utility connections to each of the rows of power modules 12, the use of "cut-outs" in the concrete pads 2601a (e.g., the above-described openings 214 and 216 through the concrete pads) may be avoided. This may simplify the design and installation of the concrete pads 2601a on which the rows of power modules 12 are supported, and may also reduce labor costs since the need to extend the trenches containing the electrical and/or utility connections beneath the concrete pads to the location (s) of the openings 214 and 216 may be eliminated.

Figure 27B:
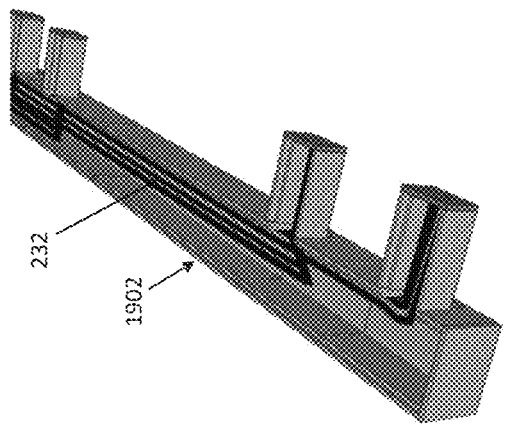
FIG. 27B is a perspective view of a pre-cast concrete trench containing electrical connections according to various embodiments of the present disclosure.
Figure 27A:
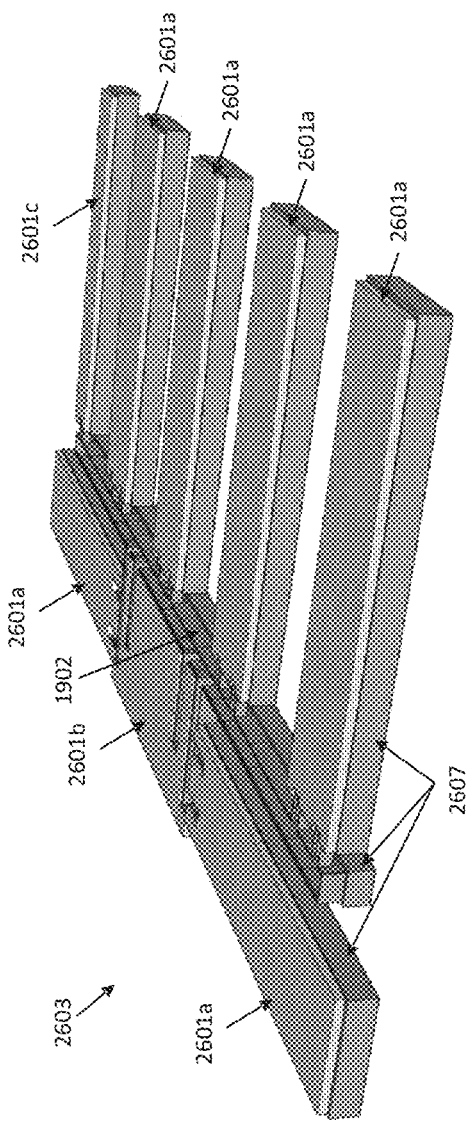
FIG. 27A is a perspective view of concrete pads and pre-cast concrete trenches of a block of a fuel cell power system as shown in FIGS. 26A-26E.
Figure 27C:
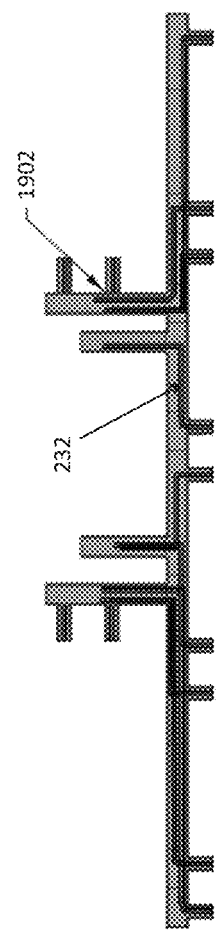
FIG. 27C is a top view of the pre-cast concrete trench of FIG. 27B.

FIG. 27A is a perspective view of concrete pads 2601a, 2601b and 2601c and pre-cast concrete trenches 1902 of a block 2603 of a fuel cell power system as shown in FIGS. 26A-26E. FIG. 27B is a perspective view of a pre-cast concrete trench 1902 containing electrical connections (i.e., wires 232). FIG. 27C is a top view of the pre-cast concrete trench 1902 of FIG. 27B.

Referring to FIG. 27A, the concrete pads 2601a and 2601c on which the rows of power modules 12 are located may be generally rectangular-shaped pads that do not include interior "cut-outs" or openings through the pad 2601a, 2601c through which utility and electrical connections enter the respective rows. Rather, as described above, the utility and electrical connections may be made through the sides of the module cabinets at opposite ends of the rows. Thus, the pads 2601a and 2601c may not include an interior opening (i.e., an opening surrounded on all sides by the pad 2601a, 2601b) extending through the pad. Concrete pads 2601a may each support two rows of power modules 12 and associated fuel processing modules 16 and power conditioning modules 18 at opposite ends of the respective rows. Concrete pad 2601c may support a single row of power modules 12 with an associated fuel processing module 16 and power conditioning module 18 on opposite ends of the row. Plumbing and electrical connections to and between the modules of the row may extend over the upper surface of the concrete pad 2601a and 2601c. In various embodiments described in further detail below, one or more overlay structures attached to the upper surface of the pads 2601a, 2601c may provide a space or separation between the upper surface of the pads 2601a and 2601c and the lower surface of the fuel cell system modules 12, 16, 18 supported on the pad 2601a, 2601c. The plumbing and electrical connections may extend within the space between the upper surface of the pads 2601a, 2601c and the lower surface of the fuel cell system modules 12, 16, 18. As in the embodiments described above with reference to FIGS. 13A-13B and 14, the upper surface of the base 1010 may be substantially planar, e.g., does not need to include recesses or other features for the plumbing and/or wiring and/or for installation of the fuel cell system modules 12, 16, 18. As such, the concrete pads 2601a and 2601c may be manufactured at a lower cost, since the pads 2601a, 2601b do not require cast features. Alternatively, the concrete pads 2601a and 2601c may include cast features for the plumbing and/or wiring and/or for installation of the fuel cell system modules 12, 16, 18.

The block 2603 shown in FIG. 27A may also include a separate concrete pad 2601b on which various components of the system power distribution unit 2604, such as the above-described power distribution modules (PDS-1, PDS-2) and transformers (XFMR-1, XFMR-2, XFMR-3) may be located. The pre-cast concrete trench 1902 may extend between concrete pad 2601b and each of the concrete pads 2601a, 2601b containing the fuel cell system modules 12, 16, 18.

In various embodiments, the fuel cell system modules 12, 16, 18 and the system power distribution unit 2604 may be supported on a multi-layer support that includes a base 2607 and a concrete pad 2601a, 2601b, 2601c located over the base 2607. The base 2607 may be a cellular concrete (aka concrete foam) base 2607, such as a Confoam® cellular concrete base that may be formed on compacted soil. The concrete pads 2601a, 2601b and 2601c may be conventional (non-cellular) concrete pads. The concrete pads 2601a, 2601b and 2601c may have a smaller area than the base 2607 on which the concrete pads 2601a, 2601b and 2601c are located. In some embodiments, the base 2607 may have a greater thickness than the concrete pads 2601a, 2601b and 2601c. For example, the base 2607 may have a thickness that is greater than 12 inches, such as between 18-30 inches (e.g., about 24 inches). The concrete pads 2601a, 2601b and 2601c may have a thickness that is less than 12 inches, such as between 6-12 inches (e.g., about 8 inches). In some embodiments, the pre-cast concrete trench 1902 containing the wires 232 may be located over a portion of a base 2607.

Figure 28A:
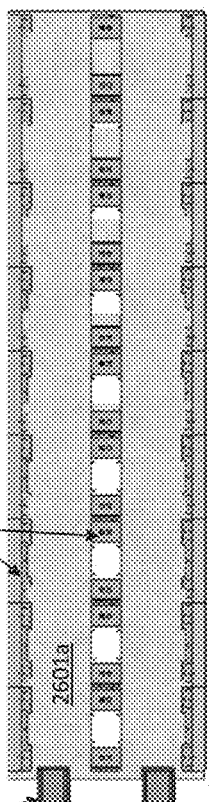
FIG. 28A is a perspective partially-transparent view of a concrete pad for supporting fuel cell system modules according to various embodiments of the present disclosure.
Figure 28B:
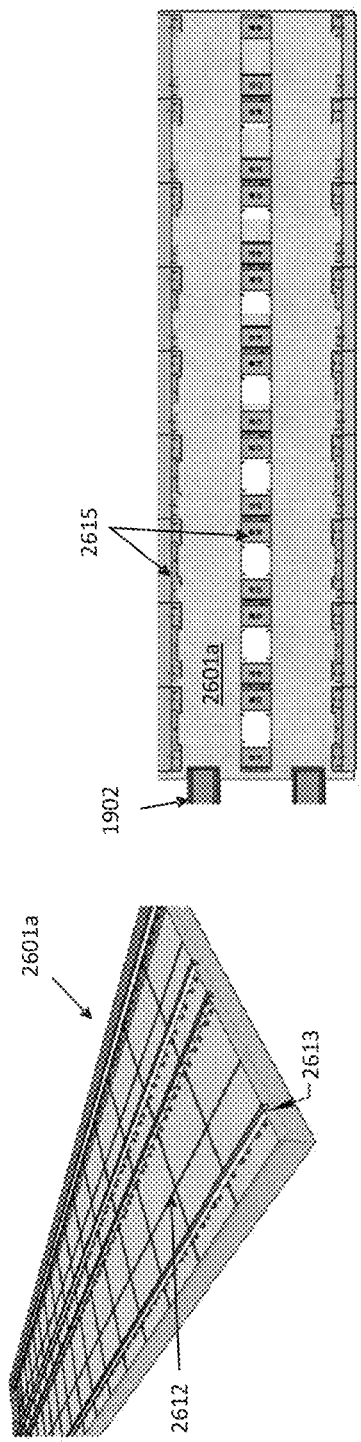
FIG. 28B is a top partially-transparent view of the concrete pad of FIG. 28A.
Figure 28C:
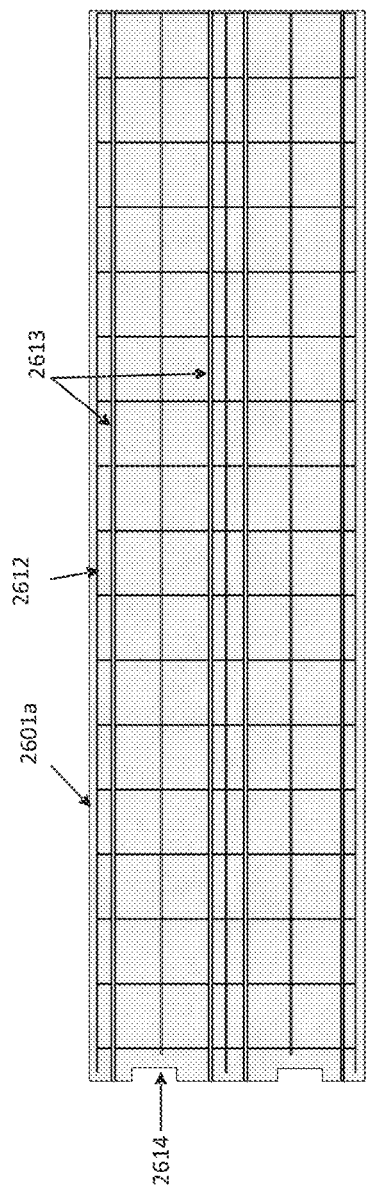
FIG. 28C is a top view of the concrete pad of FIG. 28A including overlay structures attached to the top surface of the concrete pad according to various embodiments of the present disclosure.
Figure 28D:
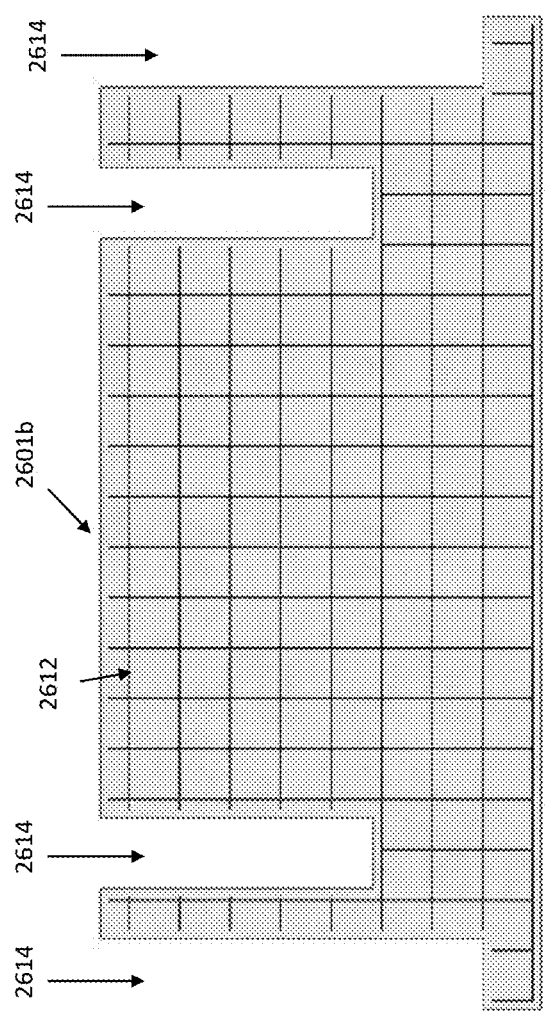
FIG. 28D is a top view of a concrete pad for supporting components of a system power distribution unit according to various embodiments of the present disclosure.

FIG. 28A is a perspective partially-transparent view of a concrete pad 2601a for supporting fuel cell system modules 12, 16, 18. FIG. 28B is a top partially-transparent view of the concrete pad 2601a of FIG. 28A. FIG. 28C is a top view of the concrete pad 2601a of FIG. 28A including overlay structures 2615 attached to the top surface of the concrete pad 2601a. FIG. 28D is a top view of a concrete pad 2601a for supporting components of a system power distribution unit 2604.

Referring to FIGS. 28A and 28B, the concrete pad 2601a may be 6 to 10 inches, such as 8 inches thick with a single layer of rebar 2612 reinforcement. In some embodiments, the concrete pad 2601a may include a plurality of embedded struts 2613 that may be used to attach overlay structures to the top surface of the concrete pad 2601a. In other embodiments, other attachment mechanisms, such as anchor bolts, may be used to attach overlay structures to the top surface of the concrete pad 2601a. The concrete pad 2601a may have cut-out portions along a peripheral side surface of the pad that may abut portions of a pre-cast concrete trench 1902 containing the electrical connections (e.g., wires 232) to the power conditioning modules 18 located on the concrete pad. FIG. 28C is a top view of the concrete pad 2601a with overlay structures 2615 attached to the top surface of the concrete pad 2601a. In some embodiments, the overlay structures 2615 may include, for example, the above-described frames 1014 configured to receive the power modules 12, the fuel processing modules 16 and/or the power conditioning modules 18, and the above-described separators 1012 configured to separate the frames 1014 from the upper surface of the concrete pad 2601a, as described above with reference to FIGS. 13A and 13B. Alternatively, or in addition, the overlay structures 2615 may include the above-described replicators 1420 that may form elevated structures for supporting the power modules 12, the fuel processing modules 16 and/or the power conditioning modules 18, as described above with reference to FIG. 14. Other suitable overlay structures 2615 are within the contemplated scope of the present disclosure.

Referring to FIGS. 28D, the concrete pad 2601b for the components of the system power distribution unit 2604 may include two layers of rebar 2612 reinforcement. The concrete pad 2601b may have a plurality of cut-out portions 2614 along peripheral side surface of the pad to accommodate portions of a pre-cast concrete trench 1902 containing the electrical connections (e.g., wires 232) to the system power distribution unit 2604.

Figure 29B:
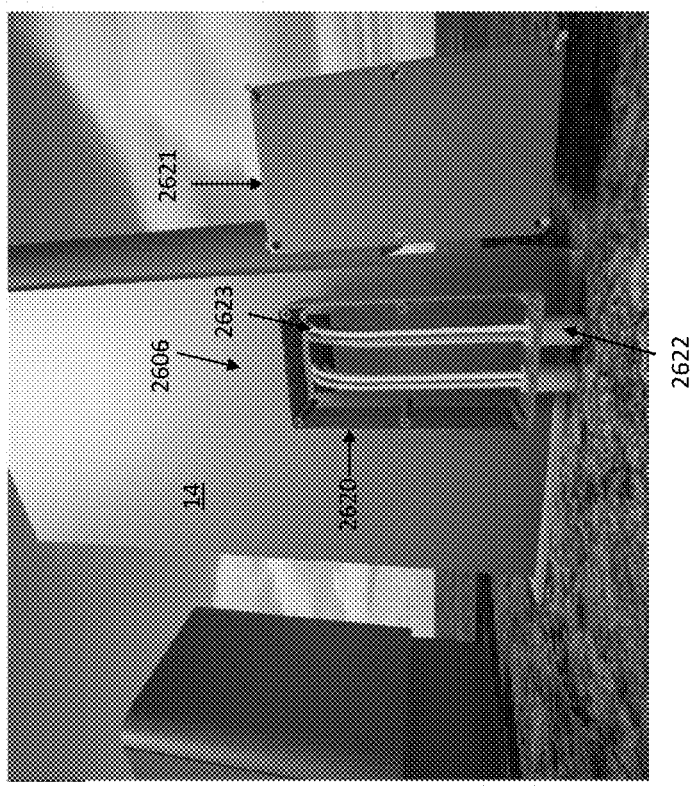
FIGS. 29A and 29B are perspective views of service relocation modules located adjacent to a side surface of a cabinet of a fuel cell system module according to various embodiments of the present disclosure.
Figure 29A:
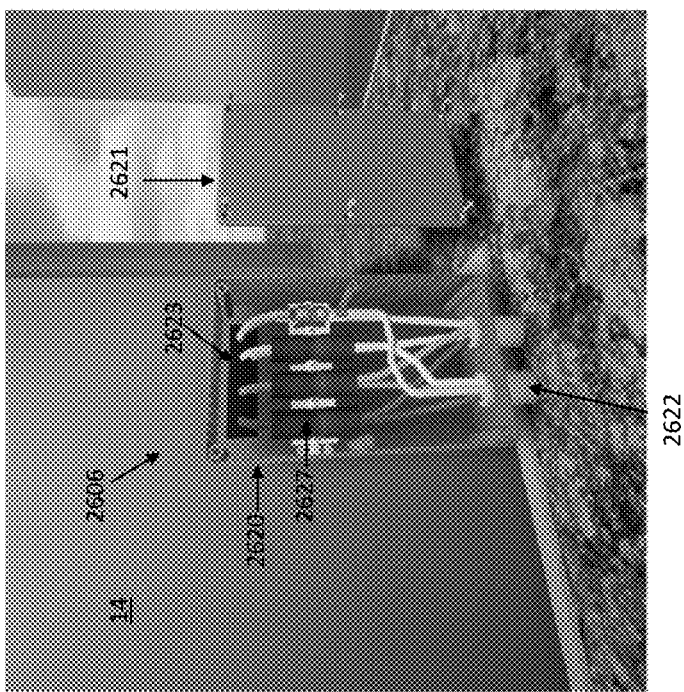

FIGS. 29A and 29B are perspective views of service relocation modules 2606 located adjacent to a side surface of a cabinet of the housing 14 of a fuel cell system module. As discussed above, the service relocation modules 2606 may allow side-entry of utility and/or electrical connections into the cabinets of the housing 14 of the fuel cell system modules (e.g., fuel processing modules 16 and/or power conditioning modules 18). The service relocation modules 2606 may include a housing 2620 having a removable cover 2621. Utility and/or electrical connections (e.g., gas and water conduits 230A and 230B in the case of utility connections and wires 232 in the case of electrical connections) may enter the housing 2620 from below ground-level through conduits (e.g., tubes) 2622. One or more openings 2623 in the side surface of the cabinet of the housing 14 allow the utility and/or electrical connections to enter the cabinet from the housing 2620. The embodiment in FIG. 29A includes a plurality of lug connectors 2627 located inside the housing 2620 of the service relocation module 2606. The lug connectors 2627 connect a first plurality of underground utility and/or electrical connections to a second set of connections to the interior of the cabinet of the housing 14. The embodiment of FIG. 29B illustrates a "pull"-type service relocation module 2620 in which the underground utility and/or electrical connections extend continuously through the housing 2620 into the interior of the cabinet of the housing 14.

Fuel cell systems of the embodiments of the present disclosure are designed to reduce greenhouse gas emissions and have a positive impact on the climate.

The arrangements of the fuel cell systems, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein.

Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present disclosure. Any one or more features of any embodiment may be used in any combination with any one or more other features of one or more other embodiments.

The invention claimed is:

1. A modular fuel cell subsystem, comprising:
multiple rows of modules, wherein each row comprises a plurality of fuel cell power modules, each of the fuel cell power modules containing one or more stacks or columns of fuel cells, and a power conditioning module containing a DC to AC inverter electrically connected to the power modules;
a single gas and water distribution module fluidly connected to the multiple rows of modules; and
a single mini power distribution module electrically connected to the power conditioning module in each row of the multiple rows of modules.

2. The modular fuel cell subsystem of claim 1, further comprising a single desulfurizer module fluidly connected to the multiple rows of modules.

3. A modular fuel cell subsystem, comprising:
multiple rows of modules, wherein each row comprises a plurality of fuel cell power modules and a power conditioning module containing a DC to AC inverter electrically connected to the power modules;
a single gas and water distribution module fluidly connected to multiple rows of power modules;
a single mini power distribution module electrically connected to the power conditioning module in each row of the multiple rows of modules;
a single desulfurizer module fluidly connected to the multiple rows of modules;
parallel fuel flow lines connecting a fuel inlet line to each respective row of power modules;
a control valve located on each of the parallel fuel flow lines;
a separate sulfur breakthrough detection line having an output fluidly connected to a safety vent; and
a sulfur detection sensor located on the sulfur breakthrough detection line configured to detect the presence of sulfur in a fuel.

4. A fuel cell system comprising:
a plurality of the modular fuel cell subsystems of claim 1;
a system power distribution unit which is electrically connected to the plurality of modular fuel cell subsystems; and
a plurality of precast concrete trenches containing plumbing and wires connecting the plurality of modular fuel cell subsystems with a utility fuel pipe, a utility water pipe and the system power distribution unit.

5. A fuel cell system, comprising:
a plurality of modular fuel cell subsystems, each modular fuel cell subsystem comprising:
multiple rows of modules, wherein each row comprises a plurality of fuel cell power modules and a power conditioning module containing a DC to AC inverter electrically connected to the power modules;
a single gas and water distribution module fluidly connected to multiple rows of power modules; and
a single mini power distribution module electrically connected to the power conditioning module in each row of the multiple rows of modules;
a system power distribution unit which is electrically connected to the plurality of modular fuel cell subsystems; and
a plurality of precast concrete trenches containing plumbing and wires connecting the plurality of modular fuel cell subsystems with a utility fuel pipe, a utility water pipe and the system power distribution unit,
wherein the system power distribution unit comprises at least one transformer electrically connected to at least one mini power distribution module of the plurality of modular fuel cell subsystems, and the plurality of modular fuel cell subsystems are located on at least two sides of the at least one transformer.

6. The fuel cell system of claim 5, wherein the system power distribution unit comprises a first transformer electrically connected to a first mini power distribution module of a first modular fuel cell subsystem and a second transformer electrically connected to a second mini power distribution module of a second modular fuel cell subsystem, and a third transformer electrically connected to the first transformer and the second transformer that provides a power output of the fuel cell system, wherein the first transformer, the second transformer and the third transformer are each located between pairs of rows of modules of the fuel cell system.

7. A fuel cell system, comprising:
multiple rows of fuel cell system modules, wherein each row comprises a plurality of fuel cell power modules, each of the fuel cell power modules containing one or more stacks or columns of fuel cells, a power conditioning module containing a DC to AC inverter electrically connected to the power modules, and a fuel processing module containing components for pre-processing of fuel fluidly connected to the power modules, wherein the power conditioning module is located on a first side of the plurality of fuel cell modules and the fuel processing module is located on a second side of the plurality of fuel cell modules that is opposite the first side in each row of the multiple rows of fuel cell system modules;
an electrical connection to the power conditioning module of each row located on the first side of the respective rows; and
at least one plumbing connection to the fuel processing module of each row located on the second side of the respective rows.

8. The fuel cell system of claim 7, wherein the fuel cell system modules are located in a plurality of cabinets, and the electrical connection and the at least one plumbing connection to each row enter through side surfaces of cabinets located on opposite sides of the row.

9. The fuel cell system of claim 8, further comprising:
a first service relocation module located adjacent to a side surface of a first cabinet containing the fuel processing module in each row, wherein plumbing connections for fuel and water enter a housing of the first service relocation module from below and exit the housing through an opening in the side surface of the first cabinet; and
a second service relocation module adjacent to a side surface of a second cabinet containing the power conditioning module in each row, wherein at least one electrical connection enters a housing of the second service relocation module from below and exits the housing through an opening in the side surface of the second cabinet.

10. The fuel cell system of claim 7, further comprising a precast concrete trench extending between the first sides of the rows of fuel cell system modules and a system power distribution unit, the precast concrete trench containing wires connecting the power conditioning modules of each row to the system power distribution unit.

11. A fuel cell system, comprising:
multiple rows of fuel cell system modules, wherein each row comprises a plurality of fuel cell power modules, a power conditioning module containing a DC to AC inverter electrically connected to the power modules, and a fuel processing module containing components for pre-processing of fuel fluidly connected to the power modules, wherein the power conditioning module is located on a first side of the plurality of fuel cell modules and the fuel processing module is located on a second side of the plurality of fuel cell modules that is opposite the first side in each row of the multiple rows of fuel cell system modules;
an electrical connection to the power conditioning module of each row located on the first side of the respective rows;
at least one plumbing connection to the fuel processing module of each row located on the second side of the respective rows; and
a precast concrete trench extending between the first sides of the rows of fuel cell system modules and a system power distribution unit, the precast concrete trench containing wires connecting the power conditioning modules of each row to the system power distribution unit,
wherein the system power distribution unit comprises at least one transformer, and the multiple rows of fuel cell system modules are located on at least two sides of the at least one transformer, and wherein the power conditioning modules are located on an end of each row that faces the system power distribution unit.

12. The fuel cell system of claim 11, wherein the system power distribution unit comprises a first transformer electrically connected to a first group of rows of fuel cell system modules, a second transformer electrically connected to a second group of rows of fuel cell system modules, and a third transformer electrically connected to the first transformer and to the second transformer.

13. The fuel cell system of claim 7, wherein the rows of fuel cell system modules are located on one or more pads that do not include interior openings extending through the respective pads.

14. The fuel cell system of claim 13, wherein each of the one or more pads has a thickness of less than twelve inches.

* * * * *